United States Patent
Brill et al.

(10) Patent No.: US 12,466,831 B2
(45) Date of Patent: Nov. 11, 2025

(54) SUBSTITUTED AMINO TRIAZOLOPYRIMIDINE AND AMINO TRIAZOLOPYRAZINE ADENOSINE RECEPTOR ANTAGONISTS, PHARMACEUTICAL COMPOSITIONS AND THEIR USE

(71) Applicant: Merck Sharp & Dohme LLC, Rahway, NJ (US)

(72) Inventors: Zachary G. Brill, Boston, MA (US); Amjad Ali, Freehold, NJ (US); Jared Cumming, Winchester, MA (US); Duane DeMong, Hanover, MA (US); Qiaolin Deng, Edison, NJ (US); Thomas H. Graham, Somerville, MA (US); Rongze Kuang, Green Brook, NJ (US); Yeon-Hee Lim, South San Francisco, CA (US); Christopher W. Plummer, Cranford, NJ (US); Jenny Lorena Rico Duque, Boston, MA (US); Huijun Wang, Westfield, NJ (US); Yonglian Zhang, East Brunswick, NJ (US); Kake Zhao, Westfield, NJ (US)

(73) Assignee: Merck Sharp & Dohme LLC, Rahway, NJ (US)

(*) Notice: Subject to any disclaimer, the term of this patent is extended or adjusted under 35 U.S.C. 154(b) by 1137 days.

(21) Appl. No.: 17/292,511

(22) PCT Filed: Nov. 15, 2019

(86) PCT No.: PCT/US2019/061622
§ 371 (c)(1),
(2) Date: May 10, 2021

(87) PCT Pub. No.: WO2020/106558
PCT Pub. Date: May 28, 2020

(65) Prior Publication Data
US 2021/0395255 A1    Dec. 23, 2021

Related U.S. Application Data

(60) Provisional application No. 62/769,843, filed on Nov. 20, 2018.

(51) Int. Cl.
*C07D 487/04* (2006.01)
*C07K 16/28* (2006.01)
(52) U.S. Cl.
CPC ........ *C07D 487/04* (2013.01); *C07K 16/2818* (2013.01)
(58) Field of Classification Search
CPC .............. C07D 487/04; C07K 16/2818
See application file for complete search history.

(56) References Cited

U.S. PATENT DOCUMENTS 8,436,003 B2    5/2013    Siegel et al.
11,117,899 B2   9/2021    Chen et al.
(Continued)

FOREIGN PATENT DOCUMENTS

CN    109535161 A       3/2019
DE    102008023801 A1   11/2009
(Continued)

OTHER PUBLICATIONS

PubChem-CID-10150228, Create Date: Oct. 25, 2006 (Oct. 25, 2006), p. 2, Fig (8 pages).
(Continued)

*Primary Examiner* — Clinton A Brooks
*Assistant Examiner* — Jerica Katlynn Wilson
(74) *Attorney, Agent, or Firm* — Sanjeev K. Mahanta; Andrew Custer

(57) ABSTRACT

In its many embodiments, the present invention provides certain substituted amino triazolopyrimidine and amino triazolopyrazine compounds of Formula (IA) and Formula (IB): or and pharmaceutically acceptable salts thereof, wherein, $R^1$, $R^2$, and $R^3$ are as defined herein, pharmaceutical compositions comprising one or more such compounds (alone and in combination with one or more other therapeutically active agents), and methods for their preparation and use, alone and in combination with other therapeutic agents, as antagonists of A2a and/or A2b receptors, and their use in the treatment of a variety of diseases, conditions, or disorders that are mediated, at least in part, by the adenosine A2a receptor and/or the adenosine A2b receptor.

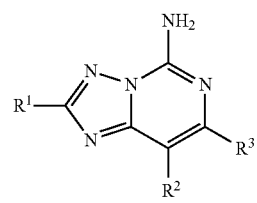

(IA)

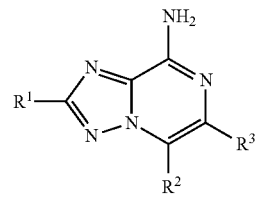

(IB)

14 Claims, No Drawings

(56) References Cited

U.S. PATENT DOCUMENTS

| | | |
|---|---|---|
| 2001/0016954 A1 | 8/2001 | Atkinson et al. |
| 2004/0012471 A1 | 1/2004 | Kojima et al. |
| 2004/0110826 A1 | 6/2004 | Jesaka et al. |
| 2006/0037003 A1 | 2/2006 | Long et al. |
| 2007/0010520 A1* | 1/2007 | Dowling .............. C07D 241/20 514/249 |

FOREIGN PATENT DOCUMENTS

| | | |
|---|---|---|
| EP | 0976753 A1 | 2/2000 |
| EP | 1544200 A1 | 6/2005 |
| WO | 2003032996 A1 | 4/2003 |
| WO | 03048165 A1 | 6/2003 |
| WO | 2003048164 A2 | 6/2003 |
| WO | WO-03048164 A2 * | 6/2003 ........... C07D 487/04 |
| WO | 2003068776 A1 | 8/2003 |
| WO | 2005044819 A1 | 5/2005 |
| WO | 2005103055 A1 | 11/2005 |
| WO | 2006068954 A2 | 6/2006 |
| WO | 2007035542 A1 | 3/2007 |
| WO | 2008002596 A2 | 1/2008 |
| WO | 2009077741 A2 | 6/2009 |
| WO | 2009111442 A1 | 9/2009 |
| WO | 2011060207 A1 | 5/2011 |
| WO | 2014101113 A1 | 7/2014 |
| WO | 2014101120 A1 | 7/2014 |
| WO | 2015027431 A1 | 3/2015 |
| WO | 2016081290 A1 | 5/2016 |
| WO | 2016089796 A1 | 6/2016 |
| WO | 2016126570 A1 | 8/2016 |
| WO | 2016200717 A1 | 12/2016 |
| WO | 2016209787 A1 | 12/2016 |
| WO | 2017011214 A1 | 1/2017 |
| WO | 2018184590 A1 | 10/2018 |
| WO | 2019118313 A1 | 6/2019 |
| WO | 2019168847 A1 | 9/2019 |
| WO | 2020010197 A1 | 1/2020 |
| WO | 2020106558 A1 | 5/2020 |
| WO | 2020106560 A1 | 5/2020 |
| WO | 2020112700 A1 | 6/2020 |
| WO | 2020112706 A1 | 6/2020 |

OTHER PUBLICATIONS

Matasi, Julius J. et al., 2-(2-Furanyl)-7-phenyl[1,2,4]triazolo[1,5-c]pyrimidin-5-amine analogs as adenosine A2A antagonists: The successful reduction of hERG activity. Part 2, Bioorganic & Medicinal Chemistry Letters, 2005, 3675-3678, 15.

Matasi, Julius J. et al., 2-(2-Furanyl)-7-phenyl[1,2,4]triazolo[1,5-c]pyrimidin-5-amine analogs: Highly potent, orally active, adenosine A2A antagonists. Part 1, Bioorganic & Medicinal Chemistry Letters, 2005, 3670-3674, 15.

* cited by examiner

SUBSTITUTED AMINO TRIAZOLOPYRIMIDINE AND AMINO TRIAZOLOPYRAZINE ADENOSINE RECEPTOR ANTAGONISTS, PHARMACEUTICAL COMPOSITIONS AND THEIR USE

CROSS REFERENCE TO RELATED APPLICATIONS

This application is a U.S. National Phase application under 35 U.S.C. § 371 of PCT Application No. PCT/US19/061622, filed Nov. 15, 2019, which published as WO 2020/106558 A1 on May 28, 2020 which claims priority under 35 U.S.C. § 365(b) from U.S. provisional patent application No. 62/769,843, filed Nov. 20, 2018.

FIELD OF THE INVENTION

The present invention relates to novel compounds that inhibit at least one of the A2a and A2b adenosine receptors, and pharmaceutically acceptable salts thereof, and compositions comprising such compound(s) and salts, methods for the synthesis of such compounds, and their use in the treatment of a variety of diseases, conditions, or disorders that are mediated, at least in part, by the adenosine A2a receptor and/or the adenosine A2b receptor. Such diseases, conditions, and disorders include but are not limited to cancer and immune-related disorders. The invention further relates to combination therapies, including but not limited to a combination comprising a compound of the invention and a PD-1 antagonist.

BACKGROUND OF THE INVENTION

Adenosine is a purine nucleoside compound comprised of adenine and ribofuranose, a ribose sugar molecule. Adenosine occurs naturally in mammals and plays important roles in various biochemical processes, including energy transfer (as adenosine triphosphate and adenosine monophosphate) and signal transduction (as cyclic adenosine monophosphate). Adenosine also plays a causative role in processes associated with vasodilation, including cardiac vasodilation. It also acts as a neuromodulator (e.g., it is thought to be involved in promoting sleep). In addition to its involvement in these biochemical processes, adenosine is used as a therapeutic antiarrhythmic agent to treat supraventricular tachycardia and other indications.

The adenosine receptors are a class of purinergic G protein-coupled receptors with adenosine as the endogenous ligand. The four types of adenosine receptors in humans are referred to as A1, A2a, A2b, and A3. Modulation of A1 has been proposed for the management and treatment of neurological disorders, asthma, and heart and renal failure, among others. Modulation of A3 has been proposed for the management and treatment of asthma and chronic obstructive pulmonary diseases, glaucoma, cancer, stroke, and other indications. Modulation of the A2a and A2b receptors are also believed to be of potential therapeutic use.

In the central nervous system, A2a antagonists are believed to exhibit antidepressant properties and to stimulate cognitive functions. A2a receptors are present in high density in the basal ganglia, known to be important in the control of movement. Hence, A2a receptor antagonists are believed to be useful in the treatment of depression and to improve motor impairment due to neurodegenerative diseases such as Parkinson's disease, senile dementia (as in Alzheimer's disease), and in various psychoses of organic origin.

In the immune system, adenosine signaling through A2a receptors and A2b receptors, expressed on a variety of immune cells and endothelial cells, has been established as having an important role in protecting tissues during inflammatory responses. In this way (and others), tumors have been shown to evade host responses by inhibiting immune function and promoting tolerance. (See, e.g., Fishman, P., et al., Handb. Exp. Pharmacol. (2009) 193:399-441). Moreover, A2a and A2b cell surface adenosine receptors have been found to be upregulated in various tumor cells. Thus, antagonists of the A2a and/or A2b adenosine receptors represent a new class of promising oncology therapeutics. For example, activation of A2a adenosine receptors results in the inhibition of the immune response to tumors by a variety of cell types, including but not limited to: the inhibition of natural killer cell cytotoxicity, the inhibition of tumor-specific CD4+/CD8+ activity, promoting the generation of LAG-3 and Foxp3+ regulatory T-cells, and mediating the inhibition of regulatory T-cells. Adenosine A2a receptor inhibition has also been shown to increase the efficacy of PD-1 inhibitors through enhanced anti-tumor T cell responses. As each of these immunosuppressive pathways has been identified as a mechanism by which tumors evade host responses, a cancer immunotherapeutic regimen that includes an antagonist of the A2a and/or A2b receptors, alone or together with one or more other therapeutic agents designed to mitigate immune suppression, may result in enhanced tumor immunotherapy. (See, e.g., P. Beavis, et al., Cancer Immunol. Res. DOI: 10.1158/2326-6066. CIR-14-0211, Feb. 11, 2015; Willingham, S B., et al., Cancer Immunol. Res., 6(10), 1136-49; and Leone R D, et al., Cancer Immunol. Immunother., August 2018, Vol. 67, Issue 8, 1271-1284).

Cancer cells release ATP into the tumor microenvironment when treated with chemotherapy and radiation therapy, which is subsequently converted to adenosine. (See Martins, I., et al., Cell Cycle, vol. 8, issue 22, pp. 3723 to 3728.) The adenosine can then bind to A2a receptors and blunt the anti-tumor immune response through mechanisms such as those described above. The administration of A2a receptor antagonists during chemotherapy or radiation therapy has been proposed to lead to the expansion of the tumor-specific T-cells while simultaneously preventing the induction of tumor-specific regulatory T-cells. (Young, A., et al., Cancer Discovery (2014) 4:879-888).

The combination of an A2a receptor antagonist with anti-tumor vaccines is believed to provide at least an additive therapeutic effect in view of their different mechanisms of action. Further, A2a receptor antagonists may be useful in combination with checkpoint blockers. By way of example, the combination of a PD-1 inhibitor and an adenosine A2a receptor inhibitor is thought to mitigate the ability of tumors to inhibit the activity of tumor-specific effector T-cells. (See, e.g., Willingham, S B., et al., Cancer Immunol. Res.; 6(10), 1136-49; Leone, R D., et al., Cancer Immunol. Immunother., August 2018, Vol. 67, Issue 8, pp. 1271-1284; Fishman, P., et al., Handb. Exp. Pharmacol. (2009) 193:399-441; and Sitkovsky, M V., et al., (2014) Cancer Immunol. Res 2:598-605.)

The A2b receptor is a G protein-coupled receptor found in various cell types. A2b receptors require higher concentrations of adenosine for activation than the other adenosine receptor subtypes, including A2a. (Fredholm, B B., et al., Biochem. Pharmacol. (2001) 61:443-448). Conditions which activate A2b have been seen, for example, in tumors where hypoxia is observed. The A2b receptor may thus play an important role in pathophysiological conditions associated with massive adenosine release. While the pathway(s) associated with A2b receptor-mediated inhibition are not well understood, it is believed that the inhibition of A2b receptors (alone or together with A2a receptors) may block pro-tumorigenic functions of adenosine in the tumor microenvironment, including suppression of T-cell function and angiogenesis, and thus expand the types of cancers treatable by the inhibition of these receptors.

A2b receptors are expressed primarily on myeloid cells. The engagement of A2b receptors on myeloid derived suppressor cells (MDSCs) results in their expansion in vitro (Ryzhov, S. et al., J. Immunol. 2011, 187:6120-6129). MDSCs suppress T-cell proliferation and anti-tumor immune responses. Selective inhibitors of A2b receptors and A2b receptor knockouts have been shown to inhibit tumor growth in mouse models by increasing MDSCs in the tumor microenvironment (Iannone, R., et al., Neoplasia Vol. 13 No. 12, (2013) pp. 1400-1409; Ryzhov, S., et al., Neoplasia (2008) 10: 987-995). Thus, A2b receptor inhibition has become an attractive biological target for the treatment of a variety of cancers involving myeloid cells. Examples of cancers that express A2b receptors can be readily obtained through analysis of the publicly available TCGA database. Such cancers include lung, colorectal, head and neck, and cervical cancer, among others, and are discussed in further detail below.

Angiogenesis plays an important role in tumor growth. The angiogenesis process is highly regulated by a variety of factors and is triggered by adenosine under particular circumstances that are associated with hypoxia. The A2b receptor is expressed in human microvascular endothelial cells, where it plays an important role in the regulation of the expression of angiogenic factors such as the vascular endothelial growth factor (VEGF). In certain tumor types, hypoxia has been observed to cause an upregulation of the A2b receptors, suggesting that inhibition of A2b receptors may limit tumor growth by limiting the oxygen supply to the tumor cells. Furthermore, experiments involving adenylate cyclase activation indicate that A2b receptors are the sole adenosine receptor subtype in certain tumor cells, suggesting that A2b receptor antagonists may exhibit effects on particular tumor types. (See, e.g., Feoktistov, I., et al., (2003) Circ. Res. 92:485-492; and P. Fishman, P., et al., Handb. Exp. Pharmacol. (2009) 193:399-441).

A2a/A2b inhibitors are known in the art, e.g. WO2019/168847. In view of their promising and varied therapeutic potential, there remains a need in the art for potent and selective inhibitors of the A2a and/or A2b adenosine receptors, for use alone or in combination with other therapeutic agents. The present invention addresses this and other needs.

SUMMARY OF THE INVENTION

In one aspect, the present invention provides compounds (hereinafter referred to as compounds of the invention) which, surprisingly and advantageously, have been found to be inhibitors of the adenosine A2a receptor and/or the adenosine A2b receptor. The compounds of the invention have a structure in accordance with Formula (IA) or Formula (IB):

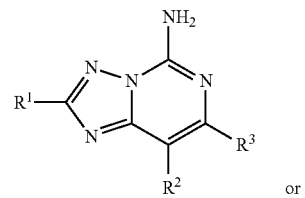

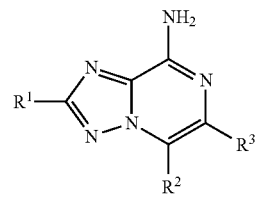

or a pharmaceutically acceptable salt thereof, wherein $R^1$, $R^2$, and $R^3$ are as defined below.

In another aspect, the present invention provides pharmaceutical compositions comprising at least one compound of the invention, or a pharmaceutically acceptable salt thereof, in a pharmaceutically acceptable carrier or diluent. Such compositions according to the invention may optionally further include one or more additional therapeutic agents as described herein.

In another aspect, the present invention provides a method for treating or preventing a disease, condition, or disorder that is mediated, at least in part, by the adenosine A2a receptor and/or the adenosine A2b receptor in a subject (e.g., an animal or human) in need thereof, said method comprising administering to the subject a therapeutically effective amount of at least one compound of the invention, or a pharmaceutically acceptable salt thereof, alone or in combination with one or more additional therapeutic agents. These and other aspects and embodiments of the invention are described more fully below.

DETAILED DESCRIPTION OF THE INVENTION

For each of the following embodiments, any variable not explicitly defined in the embodiment is as defined in Formula (IA) or (IB). In each of the embodiments described herein, each variable is selected independently of the other unless otherwise noted.

In one embodiment, the compounds of the invention have the structural Formula (IA) or Formula (IB):

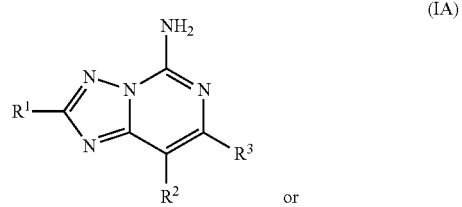

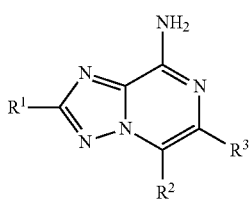

(IB)

or a pharmaceutically acceptable salt thereof, wherein:

$R^1$ is a moiety selected from $(C_3-C_7)$cycloalkyl, C-linked 4-7 membered monocyclic heterocycloalkyl comprising 1 or 2 ring nitrogen atoms, and phenyl, wherein said $(C_3-C_7)$cycloalkyl, said C-linked 4-6 membered monocyclic heterocycloalkyl comprising 1 or 2 ring nitrogen atoms, and said phenyl are unsubstituted or substituted with 1, 2, or 3 $R^{1A}$ groups, wherein each $R^{1A}$ group is independently selected from: F, Cl, OH, oxo, $(C_1-C_6)$alkyl, $O(C_1-C_6)$alkyl, $(C_1-C_6)$ alkyl-OH, $(C_1-C_6)$haloalkyl, —$O(C_1-C_6)$haloalkyl, $(C_3-C_6)$cycloalkyl, $C(O)(C_3-C_6)$cycloalkyl, phenyl, and heteroaryl, wherein said heteroaryl of $R^{1A}$ is unsubstituted or substituted with 1, 2, or 3 $R^{1A1}$ groups, wherein each $R^{1A1}$ group is independently selected from: F, Cl, oxo, $(C_1-C_6)$alkyl, $(C_1-C_6)$haloalkyl, $(C_1-C_6)$alkyl-OH, $O(C_1-C_6)$alkyl, $O(C_1-C_6)$ haloalkyl, $(C_1-C_6)$alkyl-CH$((C_3-C_6)$cycloalkyl)OH, $(C_1-C_6)$alkyl-C(O)N$(R^{1N})_2$, and $(C_4-C_6)$ heterocycloalkyl, wherein said $(C_1-C_6)$alkyl and the $(C_1-C_6)$alkyl portions of each of said O—$(C_1-C_6)$alkyl and said $(C_1-C_6)$alkyl-C(O)N$(R^{1N})_2$ are optionally further substituted with from 1 to 3 $R^{1A2}$ groups, wherein each $R^{1A2}$ group is independently selected from OH, $(C_3-C_6)$cycloalkyl, $(C_3-C_6)$ cycloalkyl-OH, heterocycloalkyl, heteroaryl, $N(R^{1N})_2$; and each $R^{1N}$ is independently selected from H and $(C_1-C_6)$ alkyl;

$R^2$ is selected from H, $(C_1-C_6)$alkyl, $(C_2-C_6)$alkenyl, and $(C_3-C_4)$cycloalkyl, wherein each said $(C_1-C_6)$alkyl and $(C_3-C_4)$cycloalkyl of $R^2$ is unsubstituted or substituted with 1, 2, or 3 $R^{2A}$ groups, wherein each $R^{2A}$ group is independently selected from F, Cl, OH, oxo, $(C_1-C_6)$alkyl, $O(C_1-C_6)$alkyl, $(C_1-C_6)$ alkyl-OH, and $(C_1-C_6)$haloalkyl, and $R^3$ is selected from phenyl and heteroaryl, wherein said phenyl and said heteroaryl are unsubstituted or substituted with 1, 2, or 3 $R^{3A}$ groups, wherein each $R^{3A}$ group is independently selected from the group consisting of F, Cl, OH, CN, $(C_1-C_6)$alkyl, $(C_1-C_6)$haloalkyl, O—$(C_1-C_6)$alkyl, and O—$(C_1-C_6)$ haloalkyl;

provided that, in Formula (IA), when $R^1$ is cyclopropyl which is substituted with phenyl, then each $R^{3A}$ group is independently selected from the group consisting of F, Cl, OH, $(C_1-C_6)$alkyl, $(C_1-C_6)$ haloalkyl, $O(C_1-C_6)$alkyl, and $O(C_1-C_6)$haloalkyl, and further provided that, in Formula (IA), $R^2$ is selected from H, $(C_1-C_6)$alkyl and $(C_2-C_6)$ alkenyl, wherein each said $(C_1-C_6)$alkyl of $R^2$ is unsubstituted or substituted with 1, 2, or 3 $R^{2A}$ groups.

In another embodiment, in each of Formulas (IA) and (IB):

$R^1$ is selected from pyrrolidinyl, piperidinyl, cyclopropyl, cyclobutyl, cyclopentyl, cyclohexyl, and phenyl, wherein each said group is unsubstituted or substituted with 1, 2, or 3 $R^{1A}$ groups, wherein $R^{1A}$ is as defined in Formulas (IA) and (IB).

In another embodiment, in each of Formulas (IA) and (IB):

$R^1$ is selected from pyrrolidinyl, piperidinyl, cyclopropyl, cyclobutyl, cyclopentyl, and cyclohexyl, wherein each said group is unsubstituted or substituted with 1, 2, or 3 $R^{1A}$ groups, wherein $R^{1A}$ is as defined in Formulas (IA) and (IB).

In another embodiment, in each of Formulas (IA) and (IB), and in each of the alternative embodiments of Formulas (IA) and (IB) described above, each $R^{1A}$ (when present) is independently selected from:

F, OH, oxo, $CH_3$, $CF_3$, $CHF_2$, $CH_2CHF_2$, $CH_2CF_3$, $C(CH_3)_2OH$, $OCHF_2$, $C(O)$cyclopropyl, pyrazolyl which is unsubstituted or substituted with 1, 2, or 3 substituents independently selected from $CH_3$, $CH_2CH_3$, $CH(CH_3)_2$, $CH_2CF_3$, $CH(CH_3)C(CH_3)_2OH$, $CH_2C(CH_3)_2OH$, $CH_2$ (cyclobutyl)OH, $C(CH_3)_2C(O)$ $NHCH_3$, tetrahydropyranyl, pyridinyl which is unsubstituted or substituted with 1, 2, or 3 substituents independently selected from F, Cl, $CH_3$, $OCHF_2$, oxo, $CHF_2$, $(C_1-C_6)$alkyl-OH and $(C_1-C_6)$alkyl-$NH_2$.

In another embodiment, in each of Formulas (IA) and (IB):

$R^1$ is selected from:

pyrrolidinyl which is unsubstituted or substituted with 1, 2, or 3 $R^{1A}$ groups, wherein each $R^{1A}$ group is independently selected from F, $CH_2CF_3$, —$C(O)$cyclopropyl, pyrazolyl, and pyrazolyl substituted with $CH_2C(CH_3)OH$, piperidinyl which is unsubstituted or substituted with 1, 2, or 3 $R^{1A}$ groups, wherein each $R^{1A}$ group is independently selected from $CH_3$, $CH_2CF_3$, pyrazolyl, and pyrazolyl substituted with 1, 2, or 3 substituents independently selected from —$CH_3$, —$CH_2CH_3$, —$CH(CH_3)_2$, tetrahydropyranyl, $CH_2CF_3$, $CH_2$ (cyclobutyl)OH, $CH_2C(CH_3)_2OH$, $CH(CH_3)C(CH_3)_2OH$, and $C(CH_3)_2C(O)NHCH_3$, cyclopropyl which is unsubstituted or substituted with 1 or 2 $R^{1A}$ groups, wherein each $R^{1A}$ group is independently selected from —$C(CH_3)_2OH$, pyridinyl, and pyridinyl substituted with 1, 2, or 3 substituents independently selected from F, Cl, and $CH_3$, cyclobutyl which is unsubstituted or substituted with 1, 2, or 3 $R^{1A}$ groups, wherein each $R^{1A}$ group is independently selected from OH, $CH_3$, and pyridyl, wherein said pyridyl is optionally substituted with $R^{1A1}$, wherein said $R^{1A1}$ is selected from $(C_1-C_6)$alkyl-OH and $(C_1-C_6)$ alkyl-$NH_2$, cyclopentyl which is unsubstituted or substituted with 1, 2, or 3 $R^{1A}$ groups, wherein each $R^{1A}$ group is independently selected from OH, and $CH_3$, and cyclohexyl which is unsubstituted or substituted with 1, 2, or 3 $R^{1A}$ groups, wherein each $R^{1A}$ group is independently selected from OH, and $CH_3$.

In another embodiment, in Formula (IA), and in each of the additional embodiments of $R^1$ described above:

$R^2$ is selected from H, methyl, propyl, and propenyl, wherein each said methyl, propyl, and propenyl are unsubstituted or substituted with 1, 2, or 3 $R^{2A}$ groups, wherein $R^{2A}$ is as defined in Formulas (IA) and (IB). In another alternative of each of the preceding embodiments, each $R^{2A}$ is selected from H, F, Cl, OH, oxo, $(C_1-C_6)$alkyl, $O(C_1-C_6)$ alkyl, $(C_1-C_6)$haloalkyl, $O(C_1-C_6)$haloalkyl, and $(C_1-C_6)$alkyl-OH.

In another embodiment, in Formula (IB), and in each of the additional embodiments of $R^1$ described above:
$R^2$ is selected from H, methyl, propyl, propenyl, and cyclopropyl, wherein each said methyl, propyl, propenyl, and cyclopropyl are unsubstituted or substituted with 1, 2, or 3 $R^{2A}$ groups, wherein $R^{2A}$ is as defined in Formulas (IA) and (IB). In another alternative of each of the preceding embodiments, each $R^{2A}$ is selected from H, F, Cl, OH, oxo, $(C_1-C_6)$alkyl, $O(C_1-C_6)$ alkyl, $(C_1-C_6)$haloalkyl, $O(C_1-C_6)$ haloalkyl, and $(C_1-C_6)$alkyl-OH.

In another embodiment, in Formula (IA), and in each of the additional embodiments of $R^1$ described above:
$R^2$ is selected from H, methyl, ethyl, propyl, and propenyl, wherein each said methyl, ethyl, propyl, and propenyl are unsubstituted or substituted with 1, 2, or 3 $R^{2A}$ groups,
wherein each $R^{2A}$ group is independently selected from H, F, Cl, OH, $CH_3$, and $CF_3$.

In another embodiment, in Formula (IB), and in each of the additional embodiments of $R^1$ described above:
$R^2$ is selected from H, methyl, ethyl, propyl, propenyl, and cyclopropyl, wherein each said methyl, ethyl, propyl, propenyl, and cyclopropyl are unsubstituted or substituted with 1, 2, or 3 $R^{2A}$ groups,
wherein each $R^{2A}$ group is independently selected from H, F, Cl, OH, $CH_3$, and $CF_3$.

In another embodiment, in Formula (IA), and in each of the additional embodiments of $R^1$ described above:
$R^2$ is selected from H, methyl, $C(CH_3)_2OH$, and propenyl.

In another embodiment, in each of Formula (IB), and in each of the additional embodiments of $R^1$ described above:
$R^2$ is selected from H, methyl, $C(CH_3)_2OH$, propenyl, and cyclopropyl.

In another embodiment, in each of Formulas (IA) and (IB), and in each of the additional embodiments of $R^1$ and of $R^2$ described above:
$R^3$ is selected from phenyl, oxazolyl, pyrazolyl, pyridinyl, and thiazoyl, wherein said phenyl, oxazolyl, pyrazolyl, pyridinyl, and thiazoyl are unsubstituted or substituted with 1, 2, or 3 $R^{3A}$ groups, wherein $R^{3A}$ is as defined in Formula (IA) and (IB).

In another embodiment, in each of Formulas (IA) and (IB), and in each of the additional embodiments of $R^1$ and $R^2$ described above:
each $R^{3A}$ group is independently selected from F, Cl, OH, CN, $CH_3$, $CF_3$, $OCH_3$, and $OCHF_2$.

In another embodiment, in each of Formulas (IA) and (IB), and in each of the additional embodiments of $R^1$ and $R^2$ described above:
each $R^{3A}$ group is independently selected from F, Cl, OH, $CH_3$, $CF_3$, $OCH_3$, and $OCHF_2$.

In another embodiment, in each of Formulas (IA) and (IB), and in each of the additional embodiments of $R^1$ and of $R^2$ described above:
$R^3$ is selected from phenyl, oxazolyl, and
phenyl substituted with 1, 2, or 3 substituents independently selected from F and Cl.

In another embodiment, in Formula (IA):
$R^1$ is selected from:
pyrrolidinyl which is unsubstituted or substituted with 1, 2 or 3 $R^{1A}$ groups, wherein each $R^{1A}$ group is independently selected from F, $CH_2CF_3$, C(O)cyclopropyl, pyrazolyl, and pyrazolyl substituted with $-CH_2C(CH_2)OH$,
piperidinyl which is unsubstituted or substituted with 1, 2, or 3 $R^{1A}$ groups, wherein each $R^{1A}$ group is independently selected from $CH_3$, $-CH_2CF_3$, pyrazolyl, pyrazolyl substituted with 1, 2, or 3 substituents independently selected from $-CH_3$, $-CH_2CH_3$, $-CH(CH_3)_2$, tetrahydropyranyl, $-CH_2CF_3$, $-CH_2$(cyclobutyl)OH, $-CH_2C(CH_3)_2OH$, $-CH(CH_3)C(CH_3)_2OH$, and $-C(CH_3)_2C(O)NHCH_3$,
cyclopropyl which is unsubstituted or substituted with 1, 2 or 3 $R^{1A}$ groups, wherein each $R^{1A}$ group is independently selected from $-C(CH_3)_2OH$, pyridinyl, and pyridinyl substituted with 1, 2, or 3 substituents independently selected from F, Cl, and $CH_3$,
cyclobutyl which is unsubstituted or substituted with 1, 2, or 3 $R^{1A}$ groups, wherein each $R^{1A}$ group is independently selected from OH, $CH_3$, and pyridyl, wherein said pyridyl is optionally substituted with $R^{1A1}$, wherein said $R^{1A1}$ is selected from $(C_1-C_6)$alkyl-OH and $(C_1-C_6)$alkyl-$NH_2$,
cyclopentyl which is unsubstituted or substituted with 1, 2, or 3 $R^{1A}$ groups, wherein each $R^{1A}$ group is independently selected from OH, and $CH_3$, and
cyclohexyl which is unsubstituted or substituted with 1, 2, or 3 $R^{1A}$ groups, wherein each $R^{1A}$ group is independently selected from OH, and $CH_3$;
$R^2$ is selected from H, methyl, $C(CH_3)_2OH$, and propenyl; and
$R^3$ is selected from phenyl and oxazolyl, wherein said phenyl is unsubstituted or substituted with 1, 2, or 3 substituents independently selected from F and Cl.

In another embodiment, in Formula (IB):
$R^1$ is selected from:
pyrrolidinyl which is unsubstituted or substituted with 1, 2 or 3 $R^{1A}$ groups, wherein each $R^{1A}$ group is independently selected from F, $CH_2CF_3$, C(O)cyclopropyl, pyrazolyl, and pyrazolyl substituted with $-CH_2C(CH_2)OH$,
piperidinyl which is unsubstituted or substituted with 1, 2, or 3 $R^{1A}$ groups, wherein each $R^{1A}$ group is independently selected from $CH_3$, $-CH_2CF_3$, pyrazolyl, pyrazolyl substituted with 1, 2, or 3 substituents independently selected from $-CH_3$, $-CH_2CH_3$, $-CH(CH_3)_2$, tetrahydropyranyl, $-CH_2CF_3$, $-CH_2$(cyclobutyl)OH, $-CH_2C(CH_3)_2OH$, $-CH(CH_3)C(CH_3)_2OH$, and $-C(CH_3)_2C(O)NHCH_3$,
cyclopropyl which is unsubstituted or substituted with 1, 2 or 3 $R^{1A}$ groups, wherein each $R^{1A}$ group is independently selected from $-C(CH_3)_2OH$, pyridinyl, and pyridinyl substituted with 1, 2, or 3 substituents independently selected from F, Cl, and $CH_3$,
cyclobutyl which is unsubstituted or substituted with 1, 2, or 3 $R^{1A}$ groups, wherein each $R^{1A}$ group is independently selected from OH, $CH_3$, and pyridyl, wherein said pyridyl is optionally substituted with $R^{1A1}$, wherein said $R^{1A1}$ is selected from $(C_1-C_6)$alkyl-OH and $(C_1-C_6)$alkyl-$NH_2$,
cyclopentyl which is unsubstituted or substituted with 1, 2, or 3 $R^{1A}$ groups, wherein each $R^{1A}$ group is independently selected from OH, and $CH_3$, and
cyclohexyl which is unsubstituted or substituted with 1, 2, or 3 $R^{1A}$ groups, wherein each $R^{1A}$ group is independently selected from OH, and $CH_3$;
$R^2$ is selected from H, methyl, $C(CH_3)_2OH$, propenyl, and cyclopropyl; and $R^3$ is selected from phenyl and oxazolyl, wherein said phenyl is unsubstituted or substituted with 1, 2, or 3 substituents independently selected from F and Cl.

In another embodiment, the compounds of the invention comprise those compounds identified herein as examples in the tables below, and pharmaceutically acceptable salts thereof.

In another aspect, the present invention provides pharmaceutical compositions comprising a pharmaceutically acceptable carrier and a compound of the invention or a pharmaceutically acceptable salt thereof. Such compositions according to the invention may optionally further include one or more additional therapeutic agents as described herein.

In another aspect, the present invention provides a method for the manufacture of a medicament or a composition which may be useful for treating diseases, conditions, or disorders that are mediated, at least in part, by the adenosine A2a receptor and/or the adenosine A2b receptor, comprising combining a compound of the invention with one or more pharmaceutically acceptable carriers.

In another aspect, the present invention provides a method for treating or preventing a disease, condition, or disorder that is mediated, at least in part, by the adenosine A2a receptor and/or the adenosine A2b receptor in a subject (e.g., an animal or human) in need thereof, said method comprising administering to the subject in need thereof a therapeutically effective amount of at least one compound of the invention, or a pharmaceutically acceptable salt thereof, alone or in combination with one or more additional therapeutic agents. Specific non-limiting examples of such diseases, conditions, and disorders are described herein.

Oncology

In some embodiments, the disease, condition or disorder is a cancer. Any cancer for which a PD-1 antagonist and/or an A2a and/or A2b inhibitor are thought to be useful by those of ordinary skill in the art are contemplated as cancers treatable by this embodiment, either as a monotherapy or in combination with other therapeutic agents discussed below. Cancers that express high levels of A2a receptors or A2b receptors are among those cancers contemplated as treatable by the compounds of the invention. Examples of cancers that express high levels of A2a and/or A2b receptors may be discerned by those of ordinary skill in the art by reference to The Cancer Genome Atlas (TCGA) database. Non-limiting examples of cancers that express high levels of A2a receptors include cancers of the kidney, breast, lung, and liver. Non-limiting examples of cancers that express high levels of the A2b receptor include lung, colorectal, head & neck cancer, and cervical cancer.

Thus, one embodiment provides a method of treating cancer comprising administering an effective amount of a compound of the invention, or a pharmaceutically acceptable salt thereof, to a subject in need of such treatment, wherein said cancer is a cancer that expresses a high level of A2a receptor. A related embodiment provides a method of treating cancer comprising administering an effective amount of a compound of the invention, or a pharmaceutically acceptable salt thereof, to a subject in need of such treatment, wherein said cancer is selected from kidney (or renal) cancer, breast cancer, lung cancer, and liver cancer.

Another embodiment provides a method of treating cancer comprising administering an effective amount of a compound of the invention, or a pharmaceutically acceptable salt thereof, to a subject in need of such treatment, wherein said cancer is a cancer that expresses a high level of A2b receptor. A related embodiment provides a method of treating cancer comprising administering an effective amount of a compound of the invention, or a pharmaceutically acceptable salt thereof, to a subject in need of such treatment, wherein said cancer is selected from lung cancer, colorectal cancer, head & neck cancer, and cervical cancer.

Additional non-limiting examples of cancers which may be treatable by administration of a compound of the invention (alone or in combination with one or more additional agents described below) include cancers of the prostate, colon, rectum, pancreas, cervix, stomach, endometrium, brain, liver, bladder, ovary, testis, head, neck, skin (including melanoma and basal carcinoma), mesothelial lining, white blood cell (including lymphoma and leukemia) esophagus, breast, muscle, connective tissue, lung (including small cell lung cancer and non-small cell lung cancer), adrenal gland, thyroid, kidney, or bone. Additional cancers treatable by a compound of the invention include glioblastoma, mesothelioma, renal cell carcinoma, gastric carcinoma, sarcoma, choriocarcinoma, cutaneous basocellular carcinoma, and testicular seminoma, and Kaposi's sarcoma.

CNS and Neurological Disorders

In other embodiments, the disease, condition or disorder is a central nervous system or a neurological disorder. Non-limiting examples of such diseases, conditions or disorders include movement disorders such as tremors, bradykinesias, gait disorders, dystonias, dyskinesias, tardive dyskinesias, other extrapyramidal syndromes, Parkinson's disease, and disorders associated with Parkinson's disease. The compounds of the invention also have the potential, or are believed to have the potential, for use in preventing or reducing the effect of drugs that cause or worsen such movement disorders.

Infections

In other embodiments, the disease, condition or disorder is an infective disorder. Non-limiting examples of such diseases, conditions or disorders include an acute or chronic viral infection, a bacterial infection, a fungal infection, or a parasitic infection. In one embodiment, the viral infection is human immunodeficiency virus. In another embodiment, the viral infection is cytomegalovirus.

Immune Disease

In other embodiments, the disease, condition or disorder is an immune-related disease, condition or disorder. Non-limiting examples of immune-related diseases, conditions, or disorders include multiple sclerosis and bacterial infections. (See, e.g., Safarzadeh, E. et al., Inflamm Res 2016 65(7):511-20; and Antonioli, L., et al., Immunol Lett S0165-2478 (18)30172-X 2018).

Additional Indications

Other diseases, conditions, and disorders that have the potential to be treated or prevented, in whole or in part, by the inhibition of the A2a and/or A2b adenosine receptor(s) are also candidate indications for the compounds of the invention and salts thereof. Non-limiting examples of other diseases, conditions or disorders in which a compound of the invention, or a pharmaceutically acceptable salt thereof, may be useful include the treatment of hypersensitivity reaction to a tumor antigen and the amelioration of one or more complications related to bone marrow transplant or to a peripheral blood stem cell transplant. Thus, in another embodiment, the present invention provides a method for treating a subject receiving a bone marrow transplant or a peripheral blood stem cell transplant by administering to said subject a therapeutically effective amount of a compound of the invention, or a pharmaceutically acceptable salt thereof, sufficient to increase the delayed-type hypersensitivity reaction to tumor antigen, to delay the time-to-relapse of post-transplant malignancy, to increase relapse-free survival time post-transplant, and/or to increase long-term post-transplant survival.

Combination Therapy

In another aspect, the present invention provides methods for the use of a compound of the invention, or a pharmaceutically acceptable salt thereof, (or a pharmaceutically acceptable composition comprising a compound of the invention or pharmaceutically acceptable salt thereof) in combination with one or more additional agents. Such additional agents may have some adenosine A2a and/or A2b receptor activity, or, alternatively, they may function through distinct mechanisms of action. The compounds of the invention may be used in combination with one or more other drugs in the treatment, prevention, suppression or amelioration of diseases or conditions for which the compounds of the invention or the other drugs described herein may have utility, where the combination of the drugs together are safer or more effective than either drug alone. The combination therapy may have an additive or synergistic effect. Such other drug(s) may be administered in an amount commonly used therefore, contemporaneously or sequentially with a compound of the invention or a pharmaceutically acceptable salt thereof. When a compound of the invention is used contemporaneously with one or more other drugs, the pharmaceutical composition may in specific embodiments contain such other drugs and the compound of the invention or its pharmaceutically acceptable salt in separate doses or in unit dosage form. However, the combination therapy may also include therapies in which the compound of the invention or its pharmaceutically acceptable salt and one or more other drugs are administered sequentially, on different or overlapping schedules. It is also contemplated that when used in combination with one or more other active ingredients, the compounds of the invention and the other active ingredients may be used in lower doses than when each is used singly. Accordingly, the pharmaceutical compositions comprising the compounds of the invention include those that contain one or more other active ingredients, in addition to a compound of the invention or a pharmaceutically acceptable salt thereof.

The weight ratio of the compound of the present invention to the second active ingredient may be varied and will depend upon the effective dose of each ingredient. Generally, an effective dose of each will be used. Thus, for example, when a compound of the invention is used in combination with another agent, the weight ratio of the compound of the present invention to the other agent may generally range from about 1000:1 to about 1:1000, in particular embodiments from about 200:1 to about 1:200. Combinations of a compound of the present invention and other active ingredients will generally also be within the aforementioned range, but in each case, an effective dose of each active ingredient should generally be used.

Given the immunosuppressive role of adenosine, the administration of an A2a receptor antagonist, an A2b receptor antagonist, and/or an A2a/A2b receptor dual antagonist according to the invention may enhance the efficacy of immunotherapies such as PD-1 antagonists. Thus, in one embodiment, the additional therapeutic agent comprises an anti-PD-1 antibody. In another embodiment, the additional therapeutic agent is an anti-PD-L1 antibody.

As noted above, PD-1 is recognized as having an important role in immune regulation and the maintenance of peripheral tolerance. PD-1 is moderately expressed on naive T-cells, B-cells and NKT-cells and up-regulated by T-cell and B-cell receptor signaling on lymphocytes, monocytes and myeloid cells (Sharpe et al., Nature Immunology (2007); 8:239-245).

Two known ligands for PD-1, PD-L1 (B7-H1) and PD-L2 (B7-DC) are expressed in human cancers arising in various tissues. In large sample sets of, for example, ovarian, renal, colorectal, pancreatic, and liver cancers, and in melanoma, it was shown that PD-L1 expression correlated with poor prognosis and reduced overall survival irrespective of subsequent treatment. (Dong et al., Nat Med. 8(8):793-800 (2002); Yang et al., Invest Ophthamol Vis Sci. 49: 2518-2525 (2008); Ghebeh et al., Neoplasia 8:190-198 (2006); Hamanishi et al., Proc. Natl. Acad. Sci. USA 104: 3360-3365 (2007); Thompson et al., Cancer 5: 206-211 (2006); Nomi et al., Clin. Cancer Research 13:2151-2157 (2007); Ohigashi et al., Clin. Cancer Research 11: 2947-2953; Inman et al., Cancer 109: 1499-1505 (2007); Shimauchi et al., Int. J. Cancer 121:2585-2590 (2007); Gao et al., Clin. Cancer Research 15: 971-979 (2009); Nakanishi J., Cancer Immunol Immunother. 56: 1173-1182 (2007); and Hino et al., Cancer 00: 1-9 (2010)).

Similarly, PD-1 expression on tumor infiltrating lymphocytes was found to mark dysfunctional T-cells in breast cancer and melanoma (Ghebeh et al., BMC Cancer. 2008 8:5714-15 (2008); and Ahmadzadeh et al., Blood 114: 1537-1544 (2009)) and to correlate with poor prognosis in renal cancer (Thompson et al., Clinical Cancer Research 15: 1757-1761 (2007)). Thus, it has been proposed that PD-L1 expressing tumor cells interact with PD-1 expressing T-cells to attenuate T-cell activation and to evade immune surveillance, thereby contributing to an impaired immune response against the tumor.

Immune checkpoint therapies targeting the PD-1 axis have resulted in groundbreaking improvements in clinical response in multiple human cancers (Brahmer, et al., N Engl J Med 2012, 366: 2455-65; Garon et al., N Engl J Med 2015, 372: 2018-28; Hamid et al., N Engl J Med 2013, 369: 134-44; Robert et al., Lancet 2014, 384: 1109-17; Robert et al., N Engl J Med 2015, 372: 2521-32; Robert et al., N Engl J Med 2015, 372: 320-30; Topalian et al., N Engl J Med 2012, 366: 2443-54; Topalian et al., J Clin Oncol 2014, 32: 1020-30; and Wolchok et al., N Engl J Med 2013, 369: 122-33).

"PD-1 antagonist" means any chemical compound or biological molecule that blocks binding of PD-L1 expressed on a cancer cell to PD-1 expressed on an immune cell (T-cell, B-cell or NKT cell) and preferably also blocks binding of PD-L2 expressed on a cancer cell to the immune-cell expressed PD-1. Alternative names or synonyms for PD-1 and its ligands include: PDCD1, PD1, CD279 and SLEB2 for PD-1; PDCD1L1, PDL1, B7H1, B7-4, CD274 and B7-H for PD-L1; and PDCD1L2, PDL2, B7-DC, Btdc and CD273 for PD-L2. In any of the treatment methods, medicaments and uses of the present invention in which a human individual is being treated, the PD-1 antagonist blocks binding of human PD-L1 to human PD-1, and preferably blocks binding of both human PD-L1 and PD-L2 to human PD-1. Human PD-1 amino acid sequences can be found in NCBI Locus No.: NP 005009. Human PD-L1 and PD-L2 amino acid sequences can be found in NCBI Locus No.: NP_054862 and NP_079515, respectively.

PD-1 antagonists useful in any of the treatment methods, medicaments and uses of the present invention include a monoclonal antibody (mAb), or antigen binding fragment thereof, which specifically binds to PD-1 or PD-L1, and preferably specifically binds to human PD-1 or human PD-L1. The mAb may be a human antibody, a humanized antibody or a chimeric antibody, and may include a human constant region. In some embodiments the human constant region is selected from the group consisting of IgG1, IgG2, IgG3 and IgG4 constant regions, and in preferred embodiments, the human constant region is an IgG1 or IgG4 constant region. In some embodiments, the antigen binding fragment is selected from the group consisting of Fab, Fab'-SH, F(ab')$_2$, scFv and Fv fragments. Examples of PD-1 antagonists include, but are not limited to, pembrolizumab (KEYTRUDA®, Merck and Co., Inc., Kenilworth, NJ., USA). "Pembrolizumab" (formerly known as MK-3475, SCH 900475 and lambrolizumab and sometimes referred to as "pembro") is a humanized IgG4 mAb with the structure described in WHO Drug Information, Vol. 27, No. 2, pages 161-162 (2013). Additional examples of PD-1 antagonists include nivolumab (OPDIVO®, Bristol-Myers Squibb Company, Princeton, NJ, USA), atezolizumab (MPDL3280A; TECENTRIQ®, Genentech, San Francisco, CA, USA), durvalumab (IMFINZI®, Astra Zeneca Pharmaceuticals, LP, Wilmington, DE, and avelumab (BAVENCIO®, Merck KGaA, Darmstadt, Germany and Pfizer, Inc., New York, NY).

Examples of monoclonal antibodies (mAbs) that bind to human PD-1, and useful in the treatment methods, medicaments and uses of the present invention, are described in U.S. Pat. Nos. 7,488,802, 7,521,051, 8,008,449, 8,354,509, 8,168,757, WO2004/004771, WO2004/072286, WO2004/056875, and US2011/0271358.

Examples of mAbs that bind to human PD-L1, and useful in the treatment methods, medicaments and uses of the present invention, are described in WO2013/019906, WO2010/077634 A1 and U.S. Pat. No. 8,383,796. Specific anti-human PD-L1 mAbs useful as the PD-1 antagonist in the treatment method, medicaments and uses of the present invention include MPDL3280A, BMS-936559, MEDI4736, MSB0010718C and an antibody which comprises the heavy chain and light chain variable regions of SEQ ID NO:24 and SEQ ID NO:21, respectively, of WO2013/019906.

Other PD-1 antagonists useful in any of the treatment methods, medicaments and uses of the present invention include an immunoadhesin that specifically binds to PD-1 or PD-L1, and preferably specifically binds to human PD-1 or human PD-L1, e.g., a fusion protein containing the extracellular or PD-1 binding portion of PD-L1 or PD-L2 fused to a constant region such as an Fc region of an immunoglobulin molecule. Examples of immunoadhesin molecules that specifically bind to PD-1 are described in WO2010/027827 and WO2011/066342. Specific fusion proteins useful as the PD-1 antagonist in the treatment methods, medicaments and uses of the present invention include AMP-224 (also known as B7-DCIg), which is a PD-L2-FC fusion protein that binds to human PD-1.

Thus, one embodiment provides for a method of treating cancer comprising administering an effective amount of a compound of the invention, or a pharmaceutically acceptable salt thereof, in combination with a PD-1 antagonist to a subject in need thereof. In such embodiments, the compounds of the invention, or a pharmaceutically acceptable salt thereof, and PD-1 antagonist are administered concurrently or sequentially.

Specific non-limiting examples of such cancers in accordance with this embodiment include melanoma (including unresectable or metastatic melanoma), head & neck cancer (including recurrent or metastatic head and neck squamous cell cancer (HNSCC)), classical Hodgkin lymphoma (cHL), urothelial carcinoma, gastric cancer, cervical cancer, primary mediastinal large-B-cell lymphoma, microsatellite instability-high (MSI-H) cancer, non-small cell lung cancer, hepatocellular carcinoma, clear cell kidney cancer, colorectal cancer, breast cancer, squamous cell lung cancer, basal carcinoma, sarcoma, bladder cancer, endometrial cancer, pancreatic cancer, liver cancer, gastrointestinal cancer, multiple myeloma, renal cancer, mesothelioma, ovarian cancer, anal cancer, biliary tract cancer, esophageal cancer, and salivary cancer.

In one embodiment, there is provided a method of treating cancer comprising administering an effective amount of a compound of the invention, or a pharmaceutically acceptable salt thereof, to a person in need thereof, in combination with a PD-1 antagonist, wherein said cancer is selected from unresectable or metastatic melanoma, recurrent or metastatic head and neck squamous cell cancer (HNSCC), classical Hodgkin lymphoma (cHL), urothelial carcinoma, gastric cancer, cervical cancer, primary mediastinal large-B-cell lymphoma, microsatellite instability-high (MSI-H) cancer, non-small cell lung cancer, and hepatocellular carcinoma. In one such embodiment, the agent is a PD-1 antagonist. In one such embodiment, the agent is pembrolizumab. In another such embodiment, the agent is nivolumab. In another such embodiment, the agent is atezolizumab.

Pembrolizumab is approved by the U.S. FDA for the treatment of patients with unresectable or metastatic melanoma and for the treatment of certain patients with recurrent or metastatic head and neck squamous cell cancer (HNSCC), classical Hodgkin lymphoma (cHL), urothelial carcinoma, gastric cancer, cervical cancer, primary mediastinal large-B-cell lymphoma, microsatellite instability-high (MSI-H) cancer, non-small cell lung cancer, and hepatocellular carcinoma, as described in the Prescribing Information for KEYTRUDA™ (Merck & Co., Inc., Whitehouse Station, NJ USA; initial U.S. approval 2014, updated November 2018). In another embodiment, there is provided a method of treating cancer comprising administering an effective amount of a compound of the invention, or a pharmaceutically acceptable salt thereof, to a person in need thereof, in combination with pembrolizumab, wherein said cancer is selected from unresectable or metastatic melanoma, recurrent or metastatic head and neck squamous cell cancer (HNSCC), classical Hodgkin lymphoma (cHL), urothelial carcinoma, gastric cancer, cervical cancer, primary mediastinal large-B-cell lymphoma, microsatellite instability-high (MSI-H) cancer, non-small cell lung cancer, and hepatocellular carcinoma.

In another embodiment, there is provided a method of treating cancer comprising administering an effective amount of a compound of the invention, or a pharmaceutically acceptable salt thereof, to a person in need thereof, in combination with a PD-1 antagonist, wherein said cancer is selected from melanoma, non-small cell lung cancer, head and neck squamous cell cancer (HNSCC), Hodgkin lymphoma, primary mediastinal large B-cell lymphoma, urothelial carcinoma, microsatellite instability-high cancer, gastric cancer, Merkel cell carcinoma, hepatocellular carcinoma, esophageal cancer and cervical cancer. In one such embodiment, the agent is a PD-1 antagonist. In one such embodiment, the agent is pembrolizumab. In another such embodiment, the agent is nivolumab. In another such embodiment, the agent is atezolizumab. In another such embodiment, the agent is durvalumab. In another such embodiment, the agent is avelumab.

In another embodiment, there is provided a method of treating cancer comprising administering an effective amount of a compound of the invention, or a pharmaceutically acceptable salt thereof, to a person in need thereof, in combination with a PD-1 antagonist, wherein said cancer is selected from melanoma, non-small cell lung cancer, small cell lung cancer, head and neck cancer, bladder cancer, breast cancer, gastrointestinal cancer, multiple myeloma, hepatocellular cancer, lymphoma, renal cancer, mesothelioma, ovarian cancer, esophageal cancer, anal cancer, biliary tract cancer, colorectal cancer, cervical cancer, thyroid cancer, and salivary cancer. In one such embodiment, the agent is a PD-1 antagonist. In one such embodiment, the agent is pembrolizumab. In another such embodiment, the agent is nivolumab. In another such embodiment, the agent is atezolizumab. In another such embodiment, the agent is durvalumab. In another such embodiment, the agent is avelumab.

In one embodiment, there is provided a method of treating unresectable or metastatic melanoma comprising administering an effective amount of a compound of the invention, or a pharmaceutically acceptable salt thereof, to a person in need thereof, in combination with a PD-1 antagonist. In one such embodiment, the agent is pembrolizumab. In another such embodiment, the agent is nivolumab. In another such embodiment, the agent is atezolizumab.

In one embodiment, there is provided a method of treating recurrent or metastatic head and neck squamous cell cancer (HNSCC) comprising administering an effective amount of a compound of the invention, or a pharmaceutically acceptable salt thereof, to a person in need thereof, in combination with a PD-1 antagonist. In one such embodiment, the agent is pembrolizumab. In another such embodiment, the agent is nivolumab. In another such embodiment, the agent is atezolizumab.

In one embodiment, there is provided a method of treating classical Hodgkin lymphoma (cHL) comprising administering an effective amount of a compound of the invention, or a pharmaceutically acceptable salt thereof, to a person in need thereof, in combination with a PD-1 antagonist. In one such embodiment, the agent is pembrolizumab. In another such embodiment, the agent is nivolumab. In another such embodiment, the agent is atezolizumab.

In one embodiment, there is provided a method of treating urothelial carcinoma comprising administering an effective amount of a compound of the invention, or a pharmaceutically acceptable salt thereof, to a person in need thereof, in combination with a PD-1 antagonist. In one such embodiment, the agent is pembrolizumab. In another such embodiment, the agent is nivolumab. In another such embodiment, the agent is atezolizumab.

In one embodiment, there is provided a method of treating gastric cancer comprising administering an effective amount of a compound of the invention, or a pharmaceutically acceptable salt thereof, to a person in need thereof, in combination with a PD-1 antagonist. In one such embodiment, the agent is pembrolizumab. In another such embodiment, the agent is nivolumab. In another such embodiment, the agent is atezolizumab.

In one embodiment, there is provided a method of treating cervical cancer comprising administering an effective amount of a compound of the invention, or a pharmaceutically acceptable salt thereof, to a person in need thereof, in combination with a PD-1 antagonist. In one such embodiment, the agent is pembrolizumab. In another such embodiment, the agent is nivolumab. In another such embodiment, the agent is atezolizumab.

In one embodiment, there is provided a method of treating primary mediastinal large-B-cell lymphoma comprising administering an effective amount of a compound of the invention, or a pharmaceutically acceptable salt thereof, to a person in need thereof, in combination with a PD-1 antagonist. In one such embodiment, the agent is pembrolizumab. In another such embodiment, the agent is nivolumab. In another such embodiment, the agent is atezolizumab.

In one embodiment, there is provided a method of treating microsatellite instability-high (MSI-H) cancer comprising administering an effective amount of a compound of the invention, or a pharmaceutically acceptable salt thereof, to a person in need thereof, in combination with a PD-1 antagonist. In one such embodiment, the agent is pembrolizumab. In another such embodiment, the agent is nivolumab. In another such embodiment, the agent is atezolizumab.

In one embodiment, there is provided a method of treating non-small cell lung cancer comprising administering an effective amount of a compound of the invention, or a pharmaceutically acceptable salt thereof, to a person in need thereof, in combination with a PD-1 antagonist. In one such embodiment, the agent is pembrolizumab. In another such embodiment, the agent is nivolumab. In another such embodiment, the agent is atezolizumab.

In one embodiment, there is provided a method of treating hepatocellular carcinoma comprising administering an effective amount of a compound of the invention, or a pharmaceutically acceptable salt thereof, to a person in need thereof, in combination with a PD-1 antagonist. In one such embodiment, the agent is pembrolizumab. In another such embodiment, the agent is nivolumab. In another such embodiment, the agent is atezolizumab.

In another embodiment, the additional therapeutic agent is at least one immunomodulator other than an A2a or A2b receptor inhibitor. Non-limiting examples of immunomodulators include CD40L, B7, B7RP1, anti-CD40, anti-CD38, anti-ICOS, 4-IBB ligand, dendritic cell cancer vaccine, IL2, IL12, ELC/CCL19, SLC/CCL21, MCP-1, IL-4, IL-18, TNF, IL-15, MDC, IFN-a/-13, M-CSF, IL-3, GM-CSF, IL-13, anti-IL-10 and indolamine 2,3-dioxygenase 1 (IDO1) inhibitors.

In another embodiment, the additional therapeutic agent comprises radiation. Such radiation includes localized radiation therapy and total body radiation therapy.

In another embodiment, the additional therapeutic agent is at least one chemotherapeutic agent. Non-limiting examples of chemotherapeutic agents contemplated for use in combination with the compounds of the invention include: pemetrexed, alkylating agents (e.g., nitrogen mustards such as chlorambucil, cyclophosphamide, isofamide, mechlorethamine, melphalan, and uracil mustard; aziridines such as thiotepa; methanesulphonate esters such as busulfan; nucleoside analogs (e.g., gemcitabine); nitroso ureas such as carmustine, lomustine, and streptozocin; topoisomerase 1 inhibitors (e.g., irinotecan); platinum complexes such as cisplatin, carboplatin and oxaliplatin; bioreductive alkylators such as mitomycin, procarbazine, dacarbazine and altretamine); anthracycline-based therapies (e.g., doxorubicin, daunorubicin, epirubicin and idarubicin); DNA strand-breakage agents (e.g., bleomycin); topoisomerase II inhibitors (e.g., amsacrine, dactinomycin, daunorubicin, idarubicin, mitoxantrone, doxorubicin, etoposide, and teniposide); DNA minor groove binding agents (e.g., plicamydin); antimetabolites (e.g., folate antagonists such as methotrexate and trimetrexate; pyrimidine antagonists such as fluorouracil, fluorodeoxyuridine, CB3717, azacitidine, cytarabine, and floxuridine; purine antagonists such as mercaptopurine, 6-thioguanine, fludarabine, pentostatin; asparaginase; and ribonucleotide reductase inhibitors such as hydroxyurea); tubulin interactive agents (e.g., vincristine, estramustine, vinblastine, docetaxol, epothilone derivatives, and paclitaxel); hormonal agents (e.g., estrogens; conjugated estrogens; ethynyl estradiol; diethylstilboesterol; chlorotrianisene; idenestrol; progestins such as hydroxyprogesterone caproate, medroxyprogesterone, and megestrol; and androgens such as testosterone, testosterone propionate, fluoxymesterone, and methyltestosterone); adrenal corticosteroids (e.g., prednisone, dexamethasone, methylprednisolone, and prednisolone); luteinizing hormone releasing agents or gonadotropin-releasing hormone antagonists (e.g., leuprolide acetate and goserelin acetate); and antihormonal antigens (e.g., tamoxifen, antiandrogen agents such as flutamide; and antiadrenal agents such as mitotane and aminoglutethimide).

In another embodiment, the additional therapeutic agent is at least one signal transduction inhibitor (STI). Non-limiting examples of signal transduction inhibitors include BCR/ABL kinase inhibitors, epidermal growth factor (EGF) receptor inhibitors, HER-2/neu receptor inhibitors, and farnesyl transferase inhibitors (FTIs).

In another embodiment, the additional therapeutic agent is at least one anti-infective agent. Non-limiting examples of anti-infective agents include cytokines, non-limiting examples of which include granulocyte-macrophage colony stimulating factor (GM-CSF) and an flt3-ligand.

In another embodiment, the present invention provides a method for treating or preventing a viral infection (e.g., a chronic viral infection) including, but not limited to, hepatitis C virus (HCV), human papilloma virus (HPV), cytomegalovirus (CMV), Epstein-Barr virus (EBV), varicella zoster virus, coxsackievirus, and human immunodeficiency virus (HIV).

In another embodiment, the present invention provides a method for the treatment of an infective disorder, said method comprising administering to a subject in need thereof an effective amount of a compound of the invention, or a pharmaceutically acceptable salt thereof, in combination with a vaccine. In some embodiments, the vaccine is an anti-viral vaccine, including, for example, an anti-HTV vaccine. Other antiviral agents contemplated for use include an anti-HIV, anti-HPV, anti HCV, anti HSV agents and the like. In other embodiments, the vaccine is effective against tuberculosis or malaria. In still other embodiments, the vaccine is a tumor vaccine (e.g., a vaccine effective against melanoma); the tumor vaccine may comprise genetically modified tumor cells or a genetically modified cell line, including genetically modified tumor cells or a genetically modified cell line that has been transfected to express granulocyte-macrophage stimulating factor (GM-CSF). In another embodiment, the vaccine includes one or more immunogenic peptides and/or dendritic cells.

In another embodiment, the present invention provides for the treatment of an infection by administering a compound of the invention, or a pharmaceutically acceptable salt thereof, and at least one additional therapeutic agent, wherein a symptom of the infection observed after administering both the compound of the invention (or a pharmaceutically acceptable salt thereof) and the additional therapeutic agent is improved over the same symptom of infection observed after administering either alone. In some embodiments, the symptom of infection observed can be reduction in viral load, increase in CD4+ T cell count, decrease in opportunistic infections, increased survival time, eradication of chronic infection, or a combination thereof.

Definitions

As used herein, unless otherwise specified, the following terms have the following meanings.

Unsatisfied valences in the text, schemes, examples, structural formulae, and any Tables herein are assumed to have a hydrogen atom or atoms of sufficient number to satisfy the valences.

When a variable appears more than once in any moiety or in any compound of the invention (e.g., aryl, heterocycle, $N(R)_2$), the selection of moieties defining that variable for each occurrence is independent of its definition at every other occurrence unless specified otherwise in the local variable definition.

As used herein, unless otherwise specified, the term "A2a receptor antagonist" (equivalently, A2a antagonist) and/or "A2b receptor antagonist" (equivalently, A2b antagonist) means a compound exhibiting a potency ($IC_{50}$) of less than about 1 µM with respect to the A2a and/or A2b receptors, respectively, when assayed in accordance with the procedures described herein. Preferred compounds exhibit at least 10-fold selectivity for antagonizing the A2a receptor and/or the A2b receptor over any other adenosine receptor (e.g., A1 or A3).

As described herein, unless otherwise indicated, the use of a compound in treatment means that an amount of the compound, generally presented as a component of a formulation that comprises other excipients, is administered in aliquots of an amount, and at time intervals, which provides and maintains at least a therapeutic serum level of at least one pharmaceutically active form of the compound over the time interval between dose administrations.

The phrase "at least one" used in reference to the number of components comprising a composition, for example, "at least one pharmaceutical excipient" means that one member of the specified group is present in the composition, and more than one may additionally be present. Components of a composition are typically aliquots of isolated pure material added to the composition, where the purity level of the isolated material added into the composition is the normally accepted purity level for a reagent of the type.

Whether used in reference to a substituent on a compound or a component of a pharmaceutical composition the phrase "one or more", means the same as "at least one".

"Concurrently" and "contemporaneously" both include in their meaning (1) simultaneously in time (e.g., at the same time); and (2) at different times but within the course of a common treatment schedule.

"Consecutively" means one following the other.

"Sequentially" refers to a series administration of therapeutic agents that awaits a period of efficacy to transpire between administering each additional agent; this is to say that after administration of one component, the next component is administered after an effective time period after the first component; the effective time period is the amount of time given for realization of a benefit from the administration of the first component.

"Effective amount" or "therapeutically effective amount" is meant to describe the provision of an amount of at least one compound of the invention or of a composition comprising at least one compound of the invention which is effective in treating or inhibiting a disease or condition described herein, and thus produce the desired therapeutic, ameliorative, inhibitory or preventative effect. For example, in treating a cancer as described herein with one or more of the compounds of the invention optionally in combination with one or more additional agents, "effective amount" (or "therapeutically effective amount") means, for example, providing the amount of at least one compound of the invention that results in a therapeutic response in a patient afflicted with the disease, condition, or disorder, including a response suitable to manage, alleviate, ameliorate, or treat the condition or alleviate, ameliorate, reduce, or eradicate one or more symptoms attributed to the condition and/or long-term stabilization of the condition, for example, as may be determined by the analysis of pharmacodynamic markers or clinical evaluation of patients afflicted with the condition.

"Patient" and "subject" means an animal, such as a mammal (e.g., a human being) and is preferably a human being.

"Prodrug" means compounds that are rapidly transformed, for example, by hydrolysis in blood, in vivo to the parent compound, e.g., conversion of a prodrug of a compound of the invention to a compound of the invention, or to a salt thereof. A thorough discussion is provided in T. Higuchi and V. Stella, Pro-drugs as Novel Delivery Systems, Vol. 14 of the A.C.S. Symposium Series, and in Edward B. Roche, ed., Bioreversible Carriers in Drug Design, American Pharmaceutical Association and Pergamon Press, 1987, both of which are incorporated herein by reference; the scope of this invention includes prodrugs of the novel compounds of this invention.

The term "substituted" means that one or more of the moieties enumerated as substituents (or, where a list of substituents are not specifically enumerated, the substituents specified elsewhere in this application) for the particular type of substrate to which said substituent is appended, provided that such substitution does not exceed the normal valence rules for the atom in the bonding configuration presented in the substrate, and that the substitution ultimate provides a stable compound, which is to say that such substitution does not provide compounds with mutually reactive substituents located geminal or vicinal to each other; and wherein the substitution provides a compound sufficiently robust to survive isolation to a useful degree of purity from a reaction mixture.

Where optional substitution by a moiety is described (e.g. "optionally substituted") the term means that if substituents are present, one or more of the enumerated (or default) moieties listed as optional substituents for the specified substrate can be present on the substrate in a bonding position normally occupied by the default substituent, for example, a hydrogen atom on an alkyl chain can be substituted by one of the optional substituents, in accordance with the definition of "substituted" presented herein.

"Alkyl" means an aliphatic hydrocarbon group, which may be straight or branched, comprising 1 to 10 carbon atoms. "($C_1$-$C_6$)alkyl" means an aliphatic hydrocarbon group, which may be straight or branched, comprising 1 to 6 carbon atoms. Branched means that one or more lower alkyl groups such as methyl, ethyl or propyl, are attached to a linear alkyl chain. Non-limiting examples of alkyl groups include methyl, ethyl, n-propyl, isopropyl, n-butyl, i-butyl, and t-butyl.

"Haloalkyl" means an alkyl as defined above wherein one or more hydrogen atoms on the alkyl (up to and including each available hydrogen group) is replaced by a halogen atom. As appreciated by those of skill in the art, "halo" or "halogen" as used herein is intended to include chloro (Cl), fluoro (F), bromo (Br) and iodo (I). Chloro (Cl) and fluoro (F) halogens are generally preferred.

"Aryl" means an aromatic monocyclic or multicyclic ring system comprising 6 to 14 carbon atoms, preferably 6 to 10 carbon atoms. The aryl group can be optionally substituted with one or more "ring system substituents" which may be the same or different, and are as defined herein. Non-limiting examples of suitable aryl groups include phenyl and naphthyl. "Monocyclic aryl" means phenyl.

"Heteroaryl" means an aromatic monocyclic or multicyclic ring system comprising 5 to 14 ring atoms, preferably 5 to 10 ring atoms, in which one or more of the ring atoms is an element other than carbon, for example nitrogen, oxygen or sulfur, alone or in combination. Preferred heteroaryls contain 5 to 6 ring atoms. The "heteroaryl" can be optionally substituted by one or more substituents, which may be the same or different, as defined herein. The prefix aza, oxa or thia before the heteroaryl root name means that at least a nitrogen, oxygen or sulfur atom respectively, is present as a ring atom. A nitrogen atom of a heteroaryl can be optionally oxidized to the corresponding N-oxide. "Heteroaryl" may also include a heteroaryl as defined above fused to an aryl as defined above. Non-limiting examples of suitable heteroaryls include pyridyl, pyrazinyl, furanyl, thienyl (which alternatively may be referred to as thiophenyl), pyrimidinyl, pyridone (including N-substituted pyridones), isoxazolyl, isothiazolyl, oxazolyl, oxadiazolyl, thiazolyl, thiadiazolyl, pyrazolyl, furazanyl, pyrrolyl, pyrazolyl, triazolyl, 1,2,4-thiadiazolyl, pyrazinyl, pyridazinyl, quinoxalinyl, phthalazinyl, oxindolyl, imidazo[1,2-a]pyridinyl, imidazo[2,1-b]thiazolyl, benzofurazanyl, indolyl, azaindolyl, benzimidazolyl, benzothienyl, quinolinyl, imidazolyl, thienopyridyl, quinazolinyl, thienopyrimidyl, pyrrolopyridyl, imidazopyridyl, isoquinolinyl, benzoazaindolyl, 1,2,4-triazinyl, benzothiazolyl and the like. The term "heteroaryl" also refers to partially saturated heteroaryl moieties such as, for example, tetrahydroisoquinolyl, tetrahydroquinolyl, pyridinone, and the like. The term "monocyclic heteroaryl" refers to monocyclic versions of heteroaryl as described above and includes 4- to 7-membered monocyclic heteroaryl groups comprising from 1 to 4 ring heteroatoms, said ring heteroatoms being independently selected from the group consisting of N, O, and S, and oxides thereof. The point of attachment to the parent moiety is to any available ring carbon or ring heteroatom. Non-limiting examples of monocyclic heteroaryl moieties include pyridyl, pyrazinyl, furanyl, thienyl, pyrimidinyl, pyridazinyl, pyridinyl, thiazolyl, isothiazolyl, oxazolyl, oxadiazolyl, isoxazolyl, pyrazolyl, furazanyl, pyrrolyl, pyrazolyl, triazolyl, thiadiazolyl (e.g., 1,2,4-thiadiazolyl), imidazolyl, and triazinyl (e.g., 1,2,4-triazinyl), and oxides thereof.

"Cycloalkyl" means a non-aromatic fully saturated monocyclic or multicyclic ring system comprising 3 to 10 carbon atoms, preferably 3 to 6 carbon atoms. The cycloalkyl can be optionally substituted with one or more substituents, which may be the same or different, as described herein. Monocyclic cycloalkyl refers to monocyclic versions of the cycloalkyl moieties described herein. Non-limiting examples of suitable monocyclic cycloalkyls include cyclopropyl, cyclopentyl, cyclohexyl, cycloheptyl and the like. Non-limiting examples of multicyclic cycloalkyls include [1.1.1]-bicyclopentane, 1-decalinyl, norbornyl, adamantyl and the like.

"Heterocycloalkyl" (or "heterocyclyl") means a non-aromatic saturated monocyclic or multicyclic ring system comprising 3 to 10 ring atoms, preferably 5 to 10 ring atoms, in which one or more of the atoms in the ring system is an element other than carbon, for example nitrogen, oxygen or sulfur, alone or in combination. There are no adjacent oxygen and/or sulfur atoms present in the ring system. Preferred heterocycloalkyl groups contain 4, 5 or 6 ring atoms. The prefix aza, oxa or thia before the heterocyclyl root name means that at least a nitrogen, oxygen or sulfur atom respectively is present as a ring atom. Any —NH in a heterocyclyl ring may exist protected such as, for example, as an —N(Boc), —N(CBz), —N(Tos) group and the like;

such protections are also considered part of this invention. The heterocyclyl can be optionally substituted by one or more substituents, which may be the same or different, as described herein. The nitrogen or sulfur atom of the heterocyclyl can be optionally oxidized to the corresponding N-oxide, S-oxide or S,S-dioxide. Thus, the term "oxide," when it appears in a definition of a variable in a general structure described herein, refers to the corresponding N-oxide, S-oxide, or S,S-dioxide. "Heterocyclyl" also includes rings wherein =O replaces two available hydrogens on the same carbon atom (i.e., heterocyclyl includes rings having a carbonyl group in the ring). Such =O groups may be referred to herein as "oxo." An example of such a moiety is pyrrolidinone (or pyrrolidone):

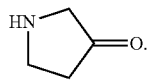

As used herein, the term "monocyclic heterocycloalkyl" refers to monocyclic versions of the heterocycloalkyl moieties described herein and include a 4- to 7-membered monocyclic heterocycloalkyl groups comprising from 1 to 4 ring heteroatoms, said ring heteroatoms being independently selected from the group consisting of N, N-oxide, O, S, S-oxide, S(O), and S(O)$_2$. The point of attachment to the parent moiety is to any available ring carbon or ring heteroatom. Non-limiting examples of monocyclic heterocycloalkyl groups include piperidyl, oxetanyl, pyrrolyl, piperazinyl, morpholinyl, thiomorpholinyl, thiazolidinyl, 1,4-dioxanyl, tetrahydrofuranyl, tetrahydrothiophenyl, beta lactam, gamma lactam, delta lactam, beta lactone, gamma lactone, delta lactone, and pyrrolidinone, and oxides thereof. Non-limiting examples of lower alkyl-substituted oxetanyl include the moiety:

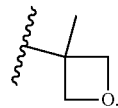

It is noted that in hetero-atom containing ring systems of this invention, there are no hydroxyl groups on carbon atoms adjacent to a N, O or S, as well as there are no N or S groups on carbon adjacent to another heteroatom.

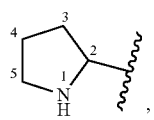

there is no —OH attached directly to carbons marked 2 and 5.

The line ———, as a bond generally indicates a mixture of, or either of, the possible isomers, e.g., containing (R)- and (S)-stereochemistry. For example:

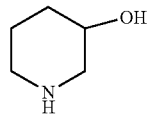

means containing both

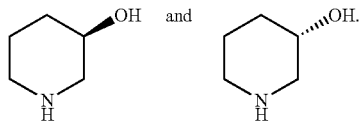

The wavy line ∼∼∼, as used herein, indicates a point of attachment to the rest of the compound. Lines drawn into the ring systems, such as, for example:

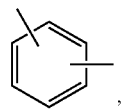

indicate that the indicated line (bond) may be attached to any of the substitutable ring atoms.

"Oxo" is defined as an oxygen atom that is double bonded to a ring carbon in a cycloalkyl, cycloalkenyl, heterocyclyl, heterocyclenyl, or other ring described herein, e.g.,

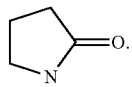

As well known in the art, a bond drawn from a particular atom wherein no moiety is depicted at the terminal end of the bond indicates a methyl group bound through that bond to the atom, unless stated otherwise. For example:

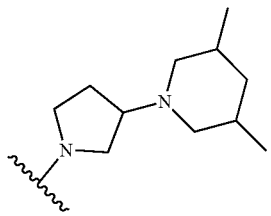 [SMILES: *N1CCC(N2CC(C)CC(C)C2)C1]

represents

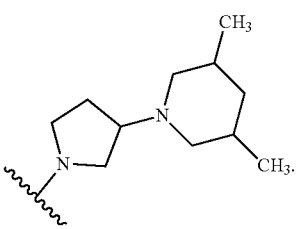 [SMILES: *N1CCC(N2CC(C)CC(C)C2)C1]

One or more compounds of the invention may also exist as, or optionally be converted to, a solvate. Preparation of solvates is generally known. Thus, for example, M. Caira et al., J. Pharmaceutical Sci., 93(3), 601-611 (2004) describe the preparation of the solvates of the antifungal fluconazole in ethyl acetate as well as from water. Similar preparations of solvates, and hemisolvate, including hydrates (where the solvent is water or aqueous-based) and the like are described by E. C. van Tonder et al., AAPS PharmSciTech., 5 (1), article 12 (2004); and A. L. Bingham et al., Chem. Commun., 603-604 (2001). A typical, non-limiting, process involves dissolving the inventive compound in desired amounts of the desired solvent (for example, an organic solvent, an aqueous solvent, water or mixtures of two or more thereof) at a higher than ambient temperature, and cooling the solution, with or without an antisolvent present, at a rate sufficient to form crystals which are then isolated by standard methods. Analytical techniques such as, for example I.R. spectroscopy, show the presence of the solvent (including water) in the crystals as a solvate (or hydrate in the case where water is incorporated into the crystalline form).

The term "purified", "in purified form" or "in isolated and purified form" for a compound refers to the physical state of said compound after being isolated from a synthetic process or natural source or combination thereof. Thus, the term "purified", "in purified form" or "in isolated and purified form" for a compound refers to the physical state of said compound after being obtained from a purification process or processes described herein or well known to the skilled artisan, and in sufficient purity to be characterized by standard analytical techniques described herein or well known to the skilled artisan.

This invention also includes the compounds of the invention in isolated and purified form obtained by routine techniques. Polymorphic forms of the compounds of the invention, and of the salts, solvates and prodrugs of the thereof, are intended to be included in the present invention. Certain compounds of the invention may exist in different isomeric forms (e.g., enantiomers, diastereoisomers, atropisomers). The inventive compounds include all isomeric forms thereof, both in pure form and admixtures of two or more, including racemic mixtures.

In similar manner, unless indicated otherwise, presenting a structural representation of any tautomeric form of a compound which exhibits tautomerism is meant to include all such tautomeric forms of the compound. Accordingly, where compounds of the invention, their salts, and solvates and prodrugs thereof, may exist in different tautomeric forms or in equilibrium among such forms, all such forms of the compound are embraced by, and included within the scope of the invention. Examples of such tautomers include, but are not limited to, ketone/enol tautomeric forms, imine-enamine tautomeric forms, and for example heteroaromatic forms such as the following moieties:

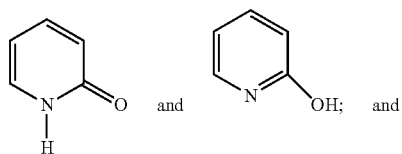

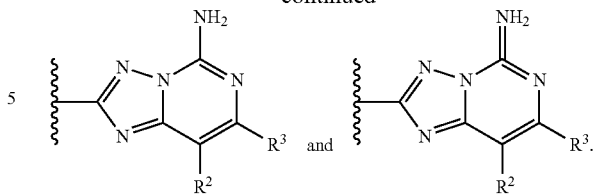

All stereoisomers of the compounds of the invention (including salts and solvates of the inventive compounds and their prodrugs), such as those which may exist due to asymmetric carbons present in a compound of the invention, and including enantiomeric forms (which may exist even in the absence of asymmetric carbons), rotameric forms, atropisomers, and diastereomeric forms, are contemplated within the scope of this invention. Individual stereoisomers of the compounds of the invention may be isolated in a pure form, for example, substantially free of other isomers, or may be isolated as an admixture of two or more stereoisomers or as a racemate. The chiral centers of the present invention can have the S or R configuration as defined by the IUPAC 1974 Recommendations. The use of the terms "salt", "solvate" "prodrug" and the like, is intended to equally apply to salts, solvates and prodrugs of isolated enantiomers, stereoisomer pairs or groups, rotamers, tautomers, or racemates of the inventive compounds.

Where diastereomeric mixtures can be separated into their individual diastereomers on the basis of their physical chemical differences by known methods, for example, by chiral chromatography and/or fractional crystallization, simple structural representation of the compound contemplates all diastereomers of the compound. As is known, enantiomers may also be separated by converting the enantiomeric mixture into a diastereomeric mixture by reaction with an appropriate optically active compound (e.g., chiral auxiliary such as a chiral alcohol or Mosher's acid chloride), separating the diastereomers and converting (e.g., hydrolyzing) the individually isolated diastereomers to the corresponding purified enantiomers.

As the term is employed herein, salts of the inventive compounds, whether acidic salts formed with inorganic and/or organic acids, basic salts formed with inorganic and/or organic bases, salts formed which include zwitterionic character, for example, where a compound contains both a basic moiety, for example, but not limited to, a nitrogen atom, for example, an amine, pyridine or imidazole, and an acidic moiety, for example, but not limited to a carboxylic acid, are included in the scope of the inventive compounds described herein. The formation of pharmaceutically useful salts from basic (or acidic) pharmaceutical compounds are discussed, for example, by S. Berge et al., Journal of Pharmaceutical Sciences (1977) 66 (1) 1-19; P. Gould, International J. of Pharmaceutics (1986) 33 201-217; Anderson et al., The Practice of Medicinal Chemistry (1996), Academic Press, New York; in The Orange Book (Food & Drug Administration, Washington, D.C. on their website); and P. Heinrich Stahl, Camille G. Wermuth (Eds.), Handbook of Pharmaceutical Salts: Properties, Selection, and Use, (2002) Int'l. Union of Pure and Applied Chemistry, pp. 330-331. These disclosures are incorporated herein by reference.

The present invention contemplates all available salts, including salts which are generally recognized as safe for use in preparing pharmaceutical formulations and those which may be formed presently within the ordinary skill in the art and are later classified as being "generally recognized as safe" for use in the preparation of pharmaceutical formulations, termed herein as "pharmaceutically acceptable salts". Examples of pharmaceutically acceptable acid addition salts include, but are not limited to, acetates, including trifluoroacetate salts, adipates, alginates, ascorbates, aspartates, benzoates, benzenesulfonates, bisulfates, borates, butyrates, citrates, camphorates, camphorsulfonates, cyclopentanepropionates, digluconates, dodecylsulfates, ethanesulfonates, fumarates, glucoheptanoates, glycerophosphates, hemisulfates, heptanoates, hexanoates, hydrochlorides, hydrobromides, hydroiodides, 2-hydroxyethanesulfonates, lactates, maleates, methanesulfonates, methyl sulfates, 2-naphthalenesulfonates, nicotinates, nitrates, oxalates, pamoates, pectinates, persulfates, 3-phenylpropionates, phosphates, picrates, pivalates, propionates, salicylates, succinates, sulfates, sulfonates (such as those mentioned herein), tartarates, thiocyanates, toluenesulfonates (also known as tosylates) undecanoates, and the like.

Examples of pharmaceutically acceptable basic salts include, but are not limited to, ammonium salts, alkali metal salts such as sodium, lithium, and potassium salts, alkaline earth metal salts such as calcium and magnesium salts, aluminum salts, zinc salts, salts with organic bases (for example, organic amines) such as benzathines, diethylamine, dicyclohexylamines, hydrabamines (formed with N,N-bis(dehydroabietyl)ethylenediamine), N-methyl-D-glucamines, N-methyl-D-glucamides, t-butyl amines, piperazine, phenylcyclohexyl-amine, choline, tromethamine, and salts with amino acids such as arginine, lysine and the like. Basic nitrogen-containing groups may be converted to an ammonium ion or quarternized with agents such as lower alkyl halides (e.g. methyl, ethyl, propyl, and butyl chlorides, bromides and iodides), dialkyl sulfates (e.g. dimethyl, diethyl, dibutyl, and diamyl sulfates), long chain halides (e.g. decyl, lauryl, myristyl and stearyl chlorides, bromides and iodides), arylalkyl halides (e.g. benzyl and phenethyl bromides), and others.

All such acid and base salts are intended to be pharmaceutically acceptable salts within the scope of the invention and all acid and base salts are considered equivalent to the free forms of the corresponding compounds for purposes of the scope of the invention.

A functional group in a compound termed "protected" means that the group is in modified form to preclude undesired side reactions at the protected site when the protected compound is subjected to particular reaction conditions aimed at modifying another region of the molecule. Suitable protecting groups are known, for example, as by reference to standard textbooks, for example, T. W. Greene et al., Protective Groups in organic Synthesis (1991), Wiley, New York.

In the compounds of the invention, the atoms may exhibit their natural isotopic abundances, or one or more of the atoms may be artificially enriched in a particular isotope having the same atomic number, but an atomic mass or mass number different from the atomic mass or mass number predominantly found in nature. The present invention is meant to include all suitable isotopic variations of the compounds of the invention. For example, different isotopic forms of hydrogen (H) include protium ($^{1}$H) and deuterium ($^{2}$H). Protium is the predominant hydrogen isotope found in nature. Enriching for deuterium may afford certain therapeutic advantages, such as increasing in vivo half-life or reducing dosage requirements, or may provide a compound useful as a standard for characterization of biological samples. Isotopically-enriched compounds of the invention can be prepared without undue experimentation by conventional techniques well known to those skilled in the art or by processes analogous to those described in the Schemes and Examples herein using appropriate isotopically-enriched reagents and/or intermediates.

The present invention also embraces isotopically-labeled compounds of the present invention which are structurally identical to those recited herein, but for the fact that a statistically significant percentage of one or more atoms in that form of the compound are replaced by an atom having an atomic mass or mass number different from the atomic mass or mass number of the most abundant isotope usually found in nature, thus altering the naturally occurring abundance of that isotope present in a compound of the invention. Examples of isotopes that can be preferentially incorporated into compounds of the invention include isotopes of hydrogen, carbon, nitrogen, oxygen, phosphorus, iodine, fluorine and chlorine, for example, but not limited to: $^{2}$H, $^{3}$H, $^{11}$C, $^{13}$C, $^{14}$C, $^{13}$N, $^{15}$N, $^{15}$O, $^{17}$O, $^{18}$O, $^{31}$P, $^{32}$P, $^{35}$S, $^{18}$F, and $^{36}$Cl, $^{123}$I and $^{125}$I. It will be appreciated that other isotopes also may be incorporated by known means.

Certain isotopically-labeled compounds of the invention (e.g., those labeled with $^{3}$H, and $^{14}$C) are recognized as being particularly useful in compound and/or substrate tissue distribution assays using a variety of known techniques. Tritiated (i.e., $^{3}$H) and carbon-14 (i.e., $^{14}$C) isotopes are particularly preferred for their ease of preparation and detection. Further, substitution of a naturally abundant isotope with a heavier isotope, for example, substitution of protium with deuterium (i.e., $^{2}$H) may afford certain therapeutic advantages resulting from greater metabolic stability (e.g., increased in vivo half-life or reduced dosage requirements) and hence may be preferred in some circumstances. Isotopically labeled compounds of the invention can generally be prepared by following procedures analogous to those disclosed in the reaction Schemes and/or in the Examples herein below, by substituting an appropriate isotopically labeled reagent for a non-isotopically labeled reagent, or by well-known reactions of an appropriately prepared precursor to the compound of the invention which is specifically prepared for such a "labeling" reaction. Such compounds are included also in the present invention.

The term "composition" is intended to encompass a product comprising the specified ingredients in the specified amounts, and any product which results, directly or indirectly, from combination of the specified ingredients in the specified amounts.

The term "pharmaceutical composition" as used herein encompasses both the bulk composition and individual dosage units comprised of one, or more than one (e.g., two), pharmaceutically active agents such as, for example, a compound of the present invention (optionally together with an additional agent as described herein), along with any pharmaceutically inactive excipients. As will be appreciated by those of ordinary skill in the art, excipients are any constituent which adapts the composition to a particular route of administration or aids the processing of a composition into a dosage form without itself exerting an active pharmaceutical effect. The bulk composition and each individual dosage unit can contain fixed amounts of the aforesaid one, or more than one, pharmaceutically active agents. The bulk composition is material that has not yet been formed into individual dosage units.

It will be appreciated that pharmaceutical formulations of the invention may comprise more than one compound of the invention (or a pharmaceutically acceptable salt thereof), for example, the combination of two or three compounds of the invention, each present in such a composition by adding to the formulation the desired amount of the compound in a pharmaceutically acceptably pure form. It will be appreciated also that in formulating compositions of the invention, a composition may comprise, in addition to one or more of compounds of the invention, one or more other agents which also have pharmacological activity, as described herein.

While formulations of the invention may be employed in bulk form, it will be appreciated that for most applications the inventive formulations will be incorporated into a dosage form suitable for administration to a patient, each dosage form comprising an amount of the selected formulation which contains an effective amount of one or more compounds of the invention. Examples of suitable dosage forms include, but are not limited to, dosage forms adapted for: (i) oral administration, e.g., a liquid, gel, powder, solid or semi-solid pharmaceutical composition which is loaded into a capsule or pressed into a tablet and may comprise additionally one or more coatings which modify its release properties, for example, coatings which impart delayed release or formulations which have extended release properties; (ii) a dosage form adapted for intramuscular administration (IM), for example, an injectable solution or suspension, and which may be adapted to form a depot having extended release properties; (iii) a dosage form adapted for intravenous administration (IV), for example, a solution or suspension, for example, as an IV solution or a concentrate to be injected into a saline IV bag; (iv) a dosage form adapted for administration through tissues of the oral cavity, for example, a rapidly dissolving tablet, a lozenge, a solution, a gel, a sachets or a needle array suitable for providing intramucosal administration; (v) a dosage form adapted for administration via the mucosa of the nasal or upper respiratory cavity, for example a solution, suspension or emulsion formulation for dispersion in the nose or airway; (vi) a dosage form adapted for transdermal administration, for example, a patch, cream or gel; (vii) a dosage form adapted for intradermal administration, for example, a microneedle array; and (viii) a dosage form adapted for delivery via rectal or vaginal mucosa, for example, a suppository.

For preparing pharmaceutical compositions comprising compounds of the invention, generally the compounds of the invention will be combined with one or more pharmaceutically acceptable excipients. These excipients impart to the composition properties which make it easier to handle or process, for example, lubricants or pressing aids in powdered medicaments intended to be tableted, or adapt the formulation to a desired route of administration, for example, excipients which provide a formulation for oral administration, for example, via absorption from the gastrointestinal tract, transdermal or transmucosal administration, for example, via adhesive skin "patch" or buccal administration, or injection, for example, intramuscular or intravenous, routes of administration. These excipients are collectively termed herein "a carrier". Typically formulations may comprise up to about 95 percent active ingredient, although formulations with greater amounts may be prepared.

Pharmaceutical compositions can be solid, semi-solid or liquid. Solid form preparations can be adapted to a variety of modes of administration, examples of which include, but are not limited to, powders, dispersible granules, mini-tablets, beads, which can be used, for example, for tableting, encapsulation, or direct administration. Liquid form preparations include, but are not limited to, solutions, suspensions and emulsions which for example, but not exclusively, can be employed in the preparation of formulations intended for parenteral injection, for intranasal administration, or for administration to some other mucosal membrane. Formulations prepared for administration to various mucosal membranes may also include additional components adapting them for such administration, for example, viscosity modifiers.

Aerosol preparations, for example, suitable for administration via inhalation or via nasal mucosa, may include solutions and solids in powder form, which may be in combination with a pharmaceutically acceptable propellant, for example, an inert compressed gas, e.g. nitrogen. Also included are solid form preparations which are intended to be converted, shortly before use, to a suspension or a solution, for example, for oral or parenteral administration. Examples of such solid forms include, but are not limited to, freeze dried formulations and liquid formulations adsorbed into a solid absorbent medium.

The compounds of the invention may also be deliverable transdermally or transmucosally, for example, from a liquid, suppository, cream, foam, gel, or rapidly dissolving solid form. It will be appreciated that transdermal compositions can take also the form of creams, lotions, aerosols and/or emulsions and can be provided in a unit dosage form which includes a transdermal patch of any know in the art, for example, a patch which incorporates either a matrix comprising the pharmaceutically active compound or a reservoir which comprises a solid or liquid form of the pharmaceutically active compound.

Examples of pharmaceutically acceptable carriers and methods of manufacture for various compositions mentioned above may be found in A. Gennaro (ed.), Remington: The Science and Practice of Pharmacy, $20^{th}$ Edition, (2000), Lippincott Williams & Wilkins, Baltimore, MD.

Preferably, the pharmaceutical preparation is in a unit dosage form. In such form, the preparations subdivided into suitably sized unit doses containing appropriate quantities of the active component, e.g., an effective amount to achieve the desired purpose.

The actual dosage employed may be varied depending upon the requirements of the patient and the severity of the condition being treated. Determination of the proper dosage regimen for a particular situation is within the skill in the art. For convenience, the total daily dosage may be divided and administered in portions during the day as required.

In accordance with the present invention, antagonism of adenosine A2a and/or A2b receptors is accomplished by administering to a patient in need of such therapy an effective amount of one or more compounds of the invention, or a pharmaceutically acceptable salt thereof.

In some embodiments it is preferred for the compound to be administered in the form of a pharmaceutical composition comprising the compound of the invention, or a salt thereof, and at least one pharmaceutically acceptable carrier (described herein). It will be appreciated that pharmaceutically formulations of the invention may comprise more than one compound of the invention, or a salt thereof, for example, the combination of two or three compounds of the invention, or, additionally or alternatively, another therapeutically active agent such as those described herein, each present by adding to the formulation the desired amount of the compound or a salt thereof (or agent, where applicable) which has been isolated in a pharmaceutically acceptably pure form.

As mentioned above, administration of a compound of the invention to effect antagonism of A2a and/or A2b receptors is preferably accomplished by incorporating the compound into a pharmaceutical formulation incorporated into a dosage form, for example, one of the above-described dosage forms comprising an effective amount of at least one compound of the invention (e.g., 1, 2 or 3, or 1 or 2, or 1, and usually 1 compound of the invention), or a pharmaceutically acceptable salt thereof. Methods for determining safe and effective administration of compounds which are pharmaceutically active, for example, a compound of the invention, are known to those skilled in the art, for example, as described in the standard literature, for example, as described in the "Physicians' Desk Reference" (PDR), e.g., 1996 edition (Medical Economics Company, Montvale, NJ 07645-1742, USA), the Physician's Desk Reference, 56$^{th}$ Edition, 2002 (published by Medical Economics company, Inc. Montvale, NJ 07645-1742), or the Physician's Desk Reference, 57$^{th}$ Edition, 2003 (published by Thompson P D R, Montvale, NJ 07645-1742); the disclosures of which is incorporated herein by reference thereto. The amount and frequency of administration of the compounds of the invention and/or the pharmaceutically acceptable salts thereof will be regulated according to the judgment of the attending clinician considering such factors as age, condition and size of the patient as well as severity of the symptoms being treated. Compounds of the invention can be administered at a total daily dosage of up to 1,000 mg, which can be administered in one daily dose or can be divided into multiple doses per 24 hour period, for example, two to four doses per day.

As those of ordinary skill in the art will appreciate, an appropriate dosage level for a compound (or compounds) of the invention will generally be about 0.01 to 500 mg per kg patient body weight per day which can be administered in single or multiple doses. A suitable dosage level may be about 0.01 to 250 mg/kg per day, about 0.05 to 100 mg/kg per day, or about 0.1 to 50 mg/kg per day. Within this range the dosage may be 0.05 to 0.5, 0.5 to 5 or 5 to 50 mg/kg per day. For oral administration, the compositions may be provided in the form of tablets containing 1.0 to 1000 milligrams of the active ingredient, particularly 1.0, 5.0, 10.0, 15.0, 20.0, 25.0, 50.0, 75.0, 100.0, 150.0, 200.0, 250.0, 300.0, 400.0, 500.0, 600.0, 750.0, 800.0, 900.0, and 1000.0 milligrams of the active ingredient for the symptomatic adjustment of the dosage to the patient to be treated. The compounds may be administered on a regimen of 1 to 4 times per day, or may be administered once or twice per day.

Those skilled in the art will appreciate that treatment protocols utilizing at least one compound of the invention can be varied according to the needs of the patient. Thus, compounds of the invention used in the methods of the invention can be administered in variations of the protocols described above. For example, compounds of the invention can be administered discontinuously rather than continuously during a treatment cycle.

In general, in whatever form administered, the dosage form administered will contain an amount of at least one compound of the invention, or a salt thereof, which will provide a therapeutically effective serum level of the compound in some form for a suitable period of time such as at least 2 hours, more preferably at least four hours or longer. In general, as is known in the art, dosages of a pharmaceutical composition providing a therapeutically effective serum level of a compound of the invention can be spaced in time to provide serum level meeting or exceeding the minimum therapeutically effective serum level on a continuous basis throughout the period during which treatment is administered. As will be appreciated the dosage form administered may also be in a form providing an extended release period for the pharmaceutically active compound which will provide a therapeutic serum level for a longer period, necessitating less frequent dosage intervals. As mentioned above, a composition of the invention can incorporate additional pharmaceutically active components or be administered simultaneously, contemporaneously, or sequentially with other pharmaceutically active agents as may be additionally needed or desired in the course of providing treatment. As will be appreciated, the dosage form administered may also be in a form providing an extended release period for the pharmaceutically active compound which will provide a therapeutic serum level for a longer period, necessitating less frequent dosage intervals.

Biological Assays

The IC$_{50}$ values reported for each of the compounds of the invention shown in the tables below were measured in accordance with the methods described below. Method (A) describes the procedure used to measure A2a binding affinity using radioligand binding. Method (B) describes the procedure used to measure A2a binding affinity using SPA technology. The method used to measure A2b binding affinity is also described below. The method used to determine the A2a IC$_{50}$ value reported for each compound in the table is indicated next to the reported value. The A2b IC$_{50}$ value measured using the A2b binding affinity assay is shown in the table next to the compound under the corresponding A2a value. An asterisk (*) indicates that the IC$_{50}$ value was not available.

The A2a receptor affinity binding assay measured the amount of binding of a tritiated ligand with high affinity for the A2a adenosine receptor to membranes made from HEK293 or CHO cells recombinantly expressing the human A2a adenosine receptor, in the presence of varying concentrations of a compound of the invention. The data were generated using either filtration binding or a homogenous scintillation proximity assay (SPA). In both assay formats, the tested compounds of the invention were solubilized in 100% DMSO and further diluted in 100% DMSO to generate, typically, a 10-point titration at half-log intervals such that the final assay concentrations did not exceed 10 µM of compound or 1% DMSO.

Method (A): Measurement of A2a Binding Affinity Using Radioligand Binding

148 µL (5 µg/mL) membranes (Perkin Elmer, Cat. No. RBHA2aM400UA) and 2 µL compounds of the invention to be tested (test compound) were transferred to individual wells of a 96-well polypropylene assay plate and incubated for 15 to 30 minutes at room temperature. [$^3$H] SCH58261 ((7-(2-phenylethyl)-5-amino-2-(2-furyl)-pyrazolo-[4,3-e]-1,2,4-triazolo[1,5-c]pyrimidine)) was diluted in assay buffer (50 mM Tris pH 7.4, 10 mM MgCl$_2$, 0.005% Tween20) to a concentration of 4 nM and 50 µL transferred to each well of the assay plate. To define total and non-specific binding, wells containing 1% DMSO and 1 µM ZM241385 (Tocris Bioscience, Cat. No. 1036) respectively, were also included. The assay plate was incubated at room temperature for 60 minutes with agitation. Using a FilterMate Harvester® (Perkin Elmer), the contents of the assay plate were filtered through a UniFilter-96® PEI coated plate (Perkin Elmer Cat. No. 6005274 or 6005277). Filtering was achieved by aspirating the contents of the assay plate for 5 seconds, then washing and aspirating the contents three times with ice-cooled wash buffer (50 mM Tris-HCl pH 7.4, 150 mM NaCl) and allowing the vacuum manifold to dry the plate for 30 seconds. The filter plate was incubated for at least 1 hour at 55° C. and allowed to dry. The bottom of the filter plate was sealed with backing tape. 40 µL Ultima Gold™ (Perkin Elmer, Cat. No. 6013329) was added to each well of the filter plate and the top of the plate was sealed with TopSeal-A PLUS® clear plate seal (Perkin Elmer, Cat. No. 6050185). The plate was incubated for at least 20 minutes, and then the amount of radioactivity remaining in each well was determined using a TopCount® (Perkin Elmer) scintillation counter. After normalization to total and non-specific binding, the percent effect at each compound concentration was calculated. The plot of percent effect versus the log of compound concentration was analyzed electronically using a 4-parameter logistic fit based on the Levenberg-Marquardt algorithm to generate $IC_{50}$ values.

Method (B): Measurement of A2a Binding Affinity Using SPA

Binding affinity using SPA was conducted as follows. Test compounds (50 nL) were dispensed into individual wells of a 384-well OptiPlate™ well (Perkin Elmer) by Echo® acoustic liquid transfer (Labcyte). 20 µL of 1.25 nM [$^3$H] SCH58261 ((7-(2-phenylethyl)-5-amino-2-(2-furyl)-pyrazolo-[4,3-e]-1,2,4-triazolo[1,5-c]pyrimidine)) in DPBS assay buffer (Dulbecco's phosphate buffered saline without calcium and magnesium, ThermoFisher Scientific, Cat. No. A1285601) supplemented with 10 mM $MgCl_2$ was added. A2a receptor-expressing membranes were incubated with 20 µg/mL adenosine deaminase (Roche, Cat. No. 10 102 105 001) for 15 minutes at room temperature. The receptor-expressing membranes were then combined with wheat germ agglutinin-coated yttrium silicate SPA beads (GE Healthcare, Cat. No. RPNQ0023) in a ratio of 1:1000 (w/w) and incubated for 30 minutes at room temperature. 30 µL of the membrane/bead mixture (0.25 µg and 25 µg per well respectively) were added to the 384-well OptiPlate™ well. To define total and non-specific binding, wells containing 1% DMSO or 1 µM CGS15943 (Tocris Bioscience, Cat. No. 1699) respectively were also included in the experiment. The plate was incubated for one hour at room temperature with agitation. The assay plate was then incubated for an hour to allow the beads to settle before data were collected using a TopCount® (Perkin Elmer) scintillation counter. After normalization to total and non-specific binding, the percent effect at each compound concentration was calculated. The plot of percent effect versus the log of compound concentration was analyzed electronically using a 4-parameter logistic fit based on the Levenberg-Marquardt algorithm to generate $IC_{50}$ values.

Measurement of A2b Binding Affinity

The reported affinity of the compounds of the invention for the human A2b adenosine receptor was determined experimentally using a radioligand filtration binding assay. This assay measures the amount of binding of a tritiated proprietary A2b receptor antagonist, in the presence and absence of a compound of the invention, to membranes made from HEK293 cells recombinantly expressing the human A2b adenosine receptor (Perkin Elmer, Cat. No. ES-013-C).

To perform the assay, compounds of the invention to be tested were first solubilized in 100% DMSO and further diluted in 100% DMSO to generate, typically, a 10-point titration at half-log intervals such that the final assay concentrations did not exceed 10 µM of compound or 1% DMSO. 148 µL (135 µg/mL) membranes and 2 µL test compounds were transferred to individual wells of a 96-well polypropylene assay plate and incubated for 15 to 30 minutes at room temperature with agitation. Tritiated radioligand was diluted to a concentration of 14 nM in assay buffer (phosphate buffered saline without Magnesium and Calcium, pH 7.4; GE Healthcare Life Sciences, Cat. No. SH30256.01) and then 50 µL of the solution were transferred to each well of the assay plate. To define total and non-specific binding, wells containing 1% DMSO and 20 µM N-ethylcarboxamidoadenosine (Tocris Bioscience, Cat. No. 1691) respectively, were also included. The wells of the assay plate were incubated at room temperature for 60 minutes with agitation, then filtered using a FilterMate Harvester® (Perkin Elmer) or similar equipment through a UniFilter-96® PEI coated plate (Perkin Elmer Cat. No. 6005274 or 6005277). Filtering was achieved by aspirating the contents of the assay plate for 5 seconds, then washing and aspirating the contents three times with ice-cooled wash buffer (assay buffer supplemented with 0.0025% Brij58) and allowing the vacuum manifold to dry the plate for 30 seconds. The filter plate was incubated for at least 1 hour at 55° C. and allowed to dry. The bottom of the filter plate was then sealed with backing tape. 40 µL Ultima Gold™ (Perkin Elmer, Cat. No. 6013329) was added to each well of the filter plate and the top of the plate was sealed with TopSeal-A PLUS® clear plate seal (Perkin Elmer, Cat. No. 6050185). The plates were then incubated for at least 20 minutes, and then the amount of radioactivity remaining in each well was determined using a TopCount® (Perkin Elmer) scintillation counter. After normalization to total and non-specific binding, the percent effect at each compound concentration was calculated. The plot of percent effect versus the log of compound concentration was analyzed electronically using a 4-parameter logistic fit based on the Levenberg-Marquardt algorithm to generate $IC_{50}$ values.

PREPARATIVE EXAMPLES

The compounds of the present invention can be prepared readily according to the following schemes and specific examples, or modifications thereof, using readily available starting materials, reagents and conventional synthetic procedures. In these reactions, it is also possible to make use of variants which are themselves known to those of ordinary skill in this art but are not mentioned in detail. The general procedures for making the compounds claimed in this invention can be readily understood and appreciated by one skilled in the art from viewing the following Schemes and descriptions.

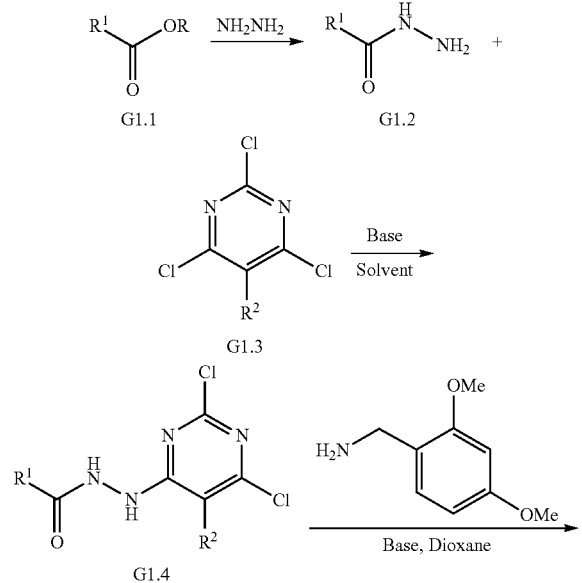

General Scheme 1

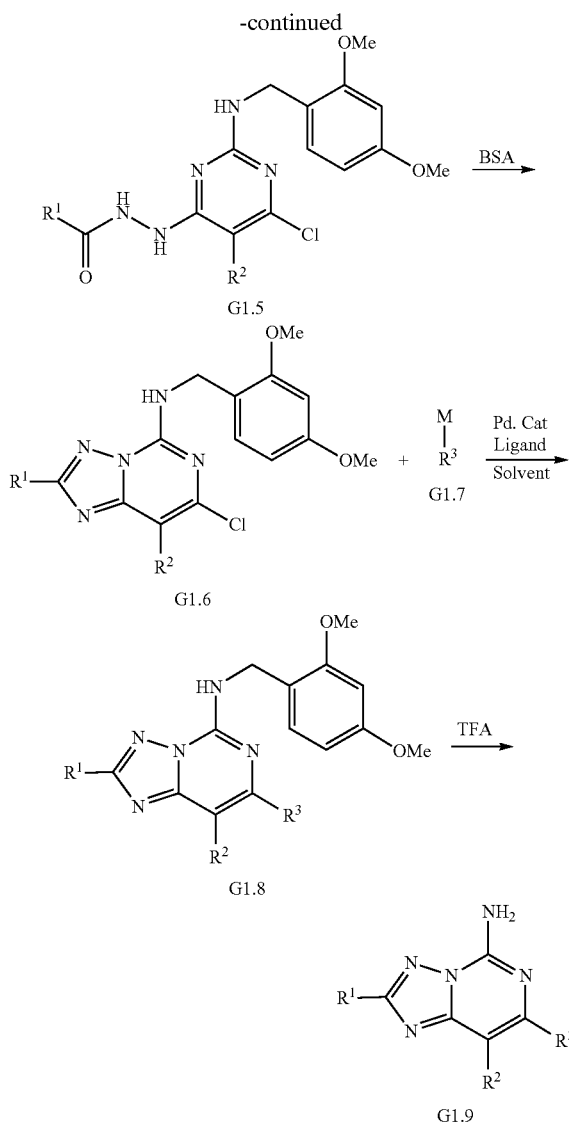

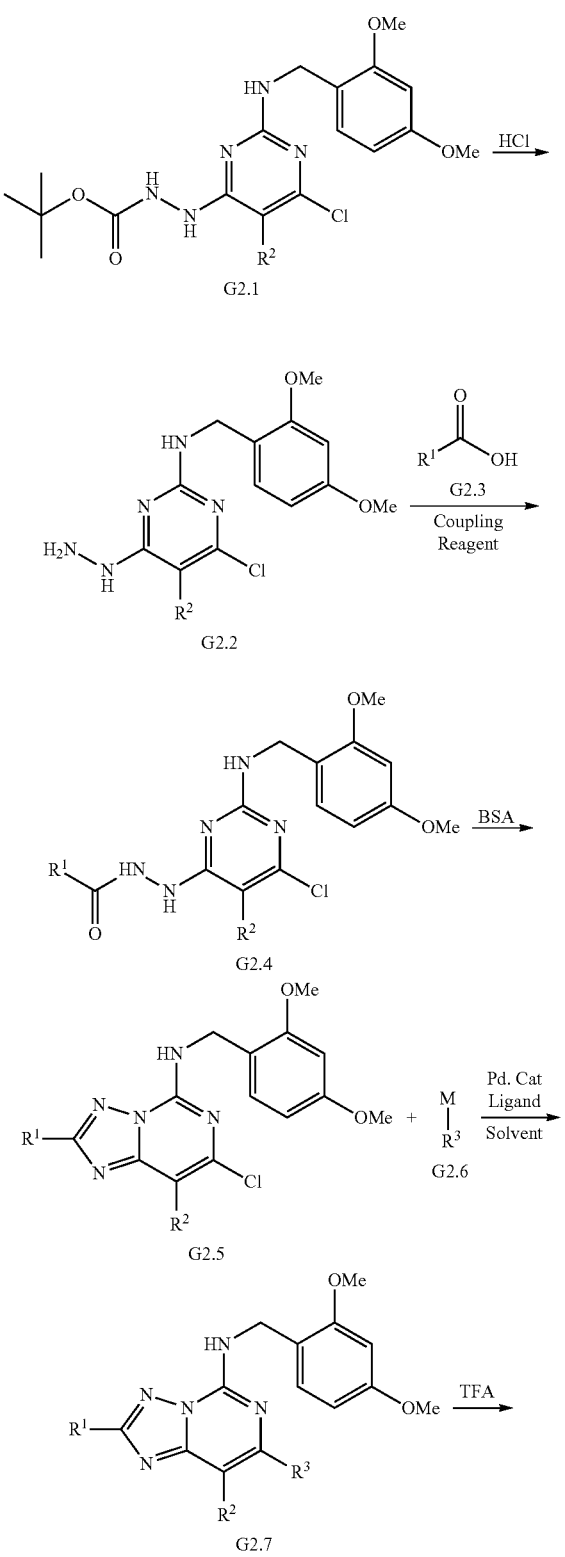

treated with TFA in the absence of solvent, heating at 60° C., to provide products of type G1.9. Products of type G1.9 can be purified by silica gel chromatography, preparative reversed-phase HPLC, and/or chiral SFC.

One general strategy for the synthesis of compounds of type G1.9 is via the six-step procedure shown in General Scheme 1, wherein M is either a boronic acid or ester or a trialkylstannane, OR is an alkoxy group and $R^1$, $R^2$, and $R^3$ are as defined in Formula (IA) or (IB). Esters G1.1 can be treated with hydrazine hydrate in solvents such as MeOH to form intermediate hydrazides G1.2. In the second step, these hydrazides can then be combined with trichloropyrimidines G1.3 in the presence of a base such as DIPEA in a solvent such as dioxane to produce the coupled products G1.4. In the third step, 2,4-dimethoxybenzyl amine is added in along with a base such as DIPEA in a solvent such as dioxane to generate mono-chloro pyrimidines G1.5. In the fourth step, pyrimidines G1.5 are heated in BSA to generate bicyclic chlorides G1.6. In the fifth step, bicyclic chlorides G1.6 can be combined with coupling partners G1.7 under deoxygenated conditions with the appropriate palladium catalyst, solvent, and base (when necessary) to form intermediates of type G1.8. Bases such as, cesium carbonate and tripotassium phosphate, catalysts such as, XPhos Pd G2, Pd(PPh$_3$)$_4$, and (dppf)PdCl$_2$—CH$_2$Cl$_2$, and solvents such as, dioxane, DMF, THF, and combinations thereof, with water, can be used. In the sixth and final step, intermediates of type G1.8 can be -continued

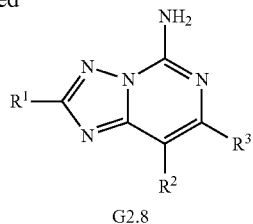

G2.8

One general strategy for the synthesis of compounds of type G2.8 is via the five-step procedure shown in General Scheme 2, wherein M is either a boronic acid or ester or a trialkylstannane and $R^1$, $R^2$, and $R^3$ are as defined in Formula (IA) and (IB). In the first step, Boc-protected hydrazides G2.1 are treated with HCl in a solvent such as MeOH to form intermediate hydrazides G2.2. In the second step, these hydrazides can then be combined with acids G2.3 in the presence of a coupling reagent such as T3P (propanephosphonic acid anhydride) in a solvent such as EtOAc to produce the coupled products G2.4. In the third step, pyrimidines G2.4 are heated in BSA to generate bicyclic chlorides G2.5. In the fourth step, bicyclic chlorides G2.5 can be combined with coupling partners G2.6 under deoxygenated conditions with the appropriate palladium catalyst, and solvent, and base (when necessary) to form intermediates of type G2.7. Bases such as, cesium carbonate and tripotassium phosphate, catalysts such as, XPhos Pd G2 and (dppf)PdCl$_2$—CH$_2$Cl$_2$, and solvents such as, dioxane, THF, and combinations thereof with water, can be used. In the fifth and final step, intermediates of type G2.7 can be treated with TFA in the absence of solvent, heating at 60° C., to provide products of type G2.8. Products of type G2.8 can be purified by silica gel chromatography, preparative reversed-phase HPLC, and/or chiral SFC.

General Scheme 3

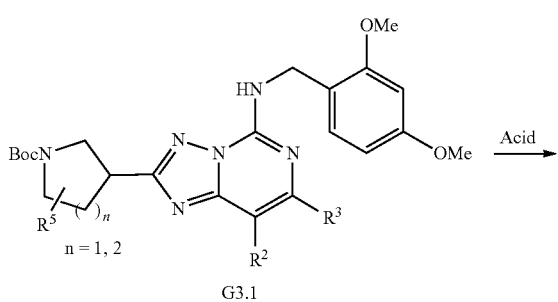

G3.1

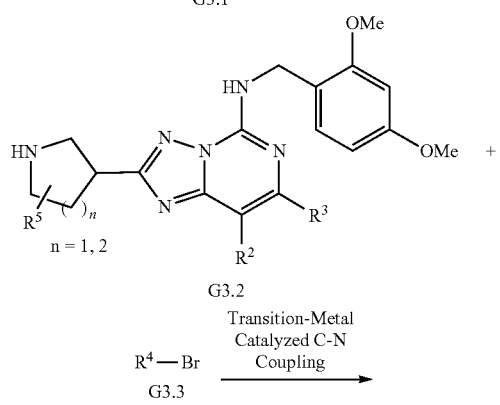

G3.2

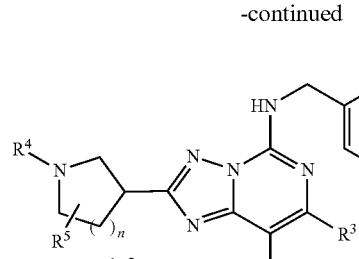

G3.4

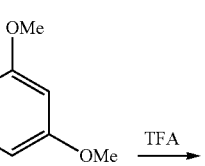

G3.5

One general strategy for the synthesis of compounds of type G3.5 is via a three-step procedure shown in General Scheme 3, wherein $R^2$ and $R^3$, are as defined in Formula (IA) and (IB), $R^4$ is a heteroaryl group, and $R^5$ is H, F, F2 or CH$_3$. In the first step, protected cyclic amines G3.1 can be converted into unprotected amines G3.2 through carefully controlled treatment with acid. Acids such as, formic acid in the absence of solvent or hydrochloric acid in the presence of MeOH or DCM, can be used. In the second step, intermediates of type G3.2 can be converted into intermediates of type G3.4 through a transition-metal catalyzed C—N coupling reaction with aryl bromides G3.3. The reaction is performed under deoxygenated conditions with palladium catalysts such as t-BuXPhos Pd G3 or Pd$_2$(dba)$_3$, a ligand such as 2-(di-tert-butylphosphino)biphenyl, a base such as sodium tert-butoxide, and a solvent such as THF or dioxane, at the appropriate temperature. In the third step, intermediates of type G3.4 can be treated with TFA in the absence of solvent followed by heating to 50° C. to provide products of type G3.5. Products of type G3.5 can be purified by silica gel chromatography, preparative reversed-phase HPLC, and/or chiral SFC.

General Scheme 4

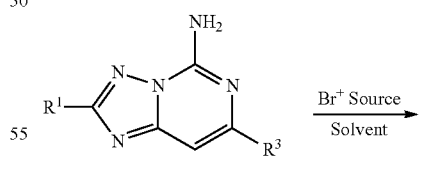

G4.1

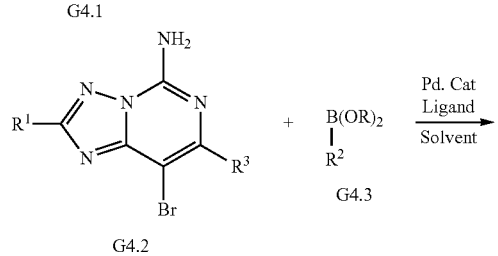

G4.2

-continued

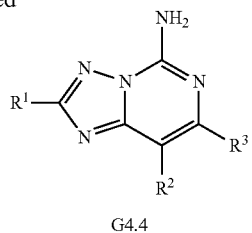

G4.4

One general strategy for the synthesis of compounds of type G4.4 is via a two-step procedure outlined in General Scheme 4, wherein $R^1$, $R^2$ and $R^3$ are defined in Formula (IA) and (IB). Amino heterocycles G4.1 can be converted to brominated intermediates G4.2 in the presence of brominating agents such as NBS or 1,3-dibromo-5,5-dimethylimidazolidine-2,4-dione in solvents such as dichloromethane, acetonitrile, or acetonitrile in the presence of TFA, at ambient temperature. In the second step, intermediates of type G4.2 can be combined with boronic acids or their respective esters G4.3 under deoxygenated conditions in the presence of the appropriate palladium catalyst, base, and solvent to provide products of type G4.4 after heating at the appropriate temperature. Palladium catalysts such as, (dppf)PdCl$_2$·CH$_2$Cl$_2$ and Pd(PPh$_3$)$_4$, bases such as, potassium carbonate and cesium carbonate, and solvents such as, dioxane or a mixture of dioxane and water, can be used. The products G4.4 can be purified by silica gel chromatography, preparative reversed-phase HPLC, and/or chiral SFC.

General Scheme 5

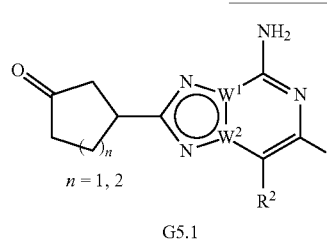

G5.1

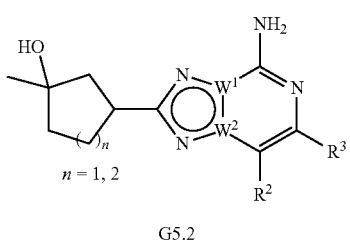

G5.2

One general strategy for the synthesis of compounds of type G5.2 is via a one-step procedure outlined in General Scheme 5, wherein one, but not both, of $W^1$ and $W^2$ are nitrogen, and the other is carbon, and $R^2$ and $R^3$ are defined in Formula (IA) and (IB). Cyclic ketones G5.1 are converted into tertiary alcohols G5.2 through treatment with methylmagnesium bromide in THF at the appropriate temperature. Products of type G5.2 can be purified by preparative reversed-phase HPLC and chiral SFC.

Experimentals

Abbreviations used herein have the following meaning:

| | |
|---|---|
| ° C. | Degrees Celsius |
| μL | Microliter |
| AcOH | Acetic acid |
| aq. | Aqueous |
| atm | Atmospheres |
| BHT | Butylated hydroxytoluene |
| Boc | Tert-butoxycarbonyl |
| BSA | N,O-Bis(trimethylsilyl)acetamide |
| CPME | Cyclopentyl methyl ether |
| dba | dibenzylideneacetone |
| DCE | 1,2-Dichloroethane |
| DCM | Dichloromethane |
| DIBAL | Diisobutylaluminium hydride |
| DIPEA | N,N-Diisopropylethylamine |
| DIPA | N,N-Diisopropylamine |
| DMA | N,N-Dimethylacetamide |
| DMF | N,N-Dimethylformamide |
| DMF-DMA | 1,1-dimethoxy-N,N-dimethylmethanamine |
| DMP | Dess-Martin periodinane |
| DMSO | Dimethyl sulfoxide |
| DMSO-d$_6$ | Deuterated dimethyl sulfoxide |
| DPP | Diphenylphosphine |
| dppf | Bis(diphenylphosphino)ferrocene |
| ESI | Electrospray Ionization |
| Et$_2$O | Diethyl ether |
| Et$_3$N | Triethylamine |
| EtOAc | Ethyl acetate |
| EtOH | Ethanol |
| g | Grams |
| h | Hour/Hours |
| HPLC | High Performance Liquid Chromatography |
| i-PrOH | 2-Propanol |
| JohnPhos | 2-(di-tert-butylphosphino)biphenyl |
| LED | Light-emitting diode |
| LiHMDS | Lithium bis(trimethylsilyl)amide |
| M | Molar |
| MeCN | Acetonitrile |
| MeLi | Methyllithium |
| MeMgBr | Methylmagnesium bromide |
| MeOD-d$_4$ | Deuterated methanol |
| MeOH | Methanol |
| Mes | Mesityl = 2,4,6-trimethylphenyl |
| mg | Milligrams |
| MHz | Megahertz |
| min | Minutes |
| mL | Milliliters |
| mmol | Millimoles |
| MP TMT resin | Macroporous polystyrene-bound trimercaptotriazine, a resin bound equivalent of 2,4,6-trimercaptotriazine |
| MS | Mass Spectroscopy |
| MsCl | Methanesulfonyl chloride |
| NBS | N-Bromosuccinimide |
| nM | Nanomolar |
| nm | Nanometers |
| NMR | Nuclear magnetic resonance |
| N-XantPhos | 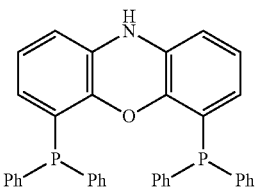 [SMILES: c1ccc(P(c2ccccc2)c2cccc3c2Oc2c(cccc2P(c2ccccc2)c2ccccc2)N3)cc1] 4,6-Bis(diphenylphosphino)-10H-phenoxazine CAS# 261733-18-0 |
| Pd/C | Palladium on carbon |
| Pd(PPh$_3$)$_4$ | Tetrakis(triphenylphosphine)palladium(0) |
| Prep SFC | Preparative Supercritical Fluid (CO$_2$) Chromatography |
| p-TsOH | 4-Methylbenzenesulfonic acid monohydrate |
| RT | Retention Time |

| | |
|---|---|
| sat. | Saturated |
| T3P | Propanephosphonic acid anhydride |
| TBAI | Tetrabutylammonium iodide |
| TBME | Methyl tert-butyl ether |
| t-BuXPhos Pd G3 | |

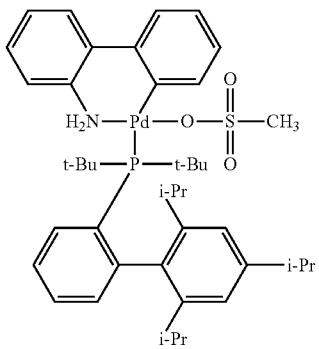

| | |
|---|---|
| | [(2-Di-tert-butylphosphino-2',4',6'-triisopropyl-1,1'-biphenyl)-2-(2'-amino-1,1'-biphenyl)] palladium(II) methanesulfonate CAS# 1447963-75-8 |
| TFA | Trifluoroacetic acid |
| THF | Tetrahydrofuran |
| TLC | Thin Layer Chromatography |
| TMSN₃ | Trimethylsilyl azide |
| XPhos Pd G2 | |

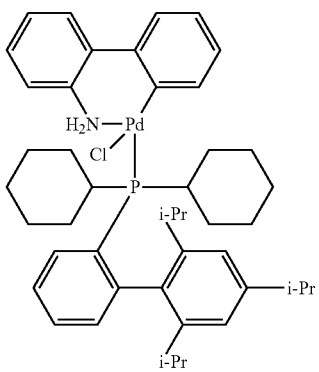

Chloro(2-dicyclohexylphosphino-2',4',6'-triisopropyl-1,1'-biphenyl)[2-(2'-amino-1,1'-biphenyl)]palladium(II) CAS# 1310584-14-5

General Experimental Information:

Unless otherwise noted, all reactions were magnetically stirred and performed under an inert atmosphere such as nitrogen or argon.

Unless otherwise noted, diethyl ether used in the experiments described below was Fisher ACS certified material and stabilized with BHT.

Unless otherwise noted, "concentrated" means evaporating the solvent from a solution or mixture using a rotary evaporator or vacuum pump.

Unless otherwise noted, flash chromatography was carried out on an ISCO®, Analogix®, or Biotage® automated chromatography system using a commercially available cartridge as the column. Columns were usually filled with silica gel as the stationary phase. Reversed phase preparative HPLC conditions ("Method A" and "Method B") can be found at the end of the experimental section. Aqueous solutions were concentrated on a Genevac® evaporator or were lyophilized.

Unless otherwise noted, "degassed" refers to a solvent from which oxygen has been removed, generally by bubbling an inert gas such as nitrogen or argon through the solution for 10 to 15 minutes with an outlet needle to normalize pressure. When indicated, "Method C" for degassing refers to bubbling argon through a solution for 15 minutes while the solution is submerged in an ultrasonic bath.

Unless otherwise noted, proton nuclear magnetic resonance ($^1$H NMR) spectra and proton-decoupled carbon nuclear magnetic resonance ($^{13}$C{$^1$H} NMR) spectra were recorded on 400, 500, or 600 MHz Bruker or Varian NMR spectrometers at ambient temperature. All chemical shifts (δ) were reported in parts per million (ppm). Proton resonances were referenced to residual protium in the NMR solvent, which can include, but is not limited to, CDCl₃, DMSO-d₆, and MeOD-d₄. Carbon resonances are referenced to the carbon resonances of the NMR solvent. Data are represented as follows: chemical shift, multiplicity (br=broad, br s=broad singlet, s=singlet, d=doublet, dd=doublet of doublets, ddd=doublet of doublet of doublets, t=triplet, q=quartet, m=multiplet), coupling constants (J) in Hertz (Hz), integration.

Preparation of Intermediate A.3, 1-(4-bromo-1H-pyrazol-1-yl)-2-methylpropan-2-ol Scheme A

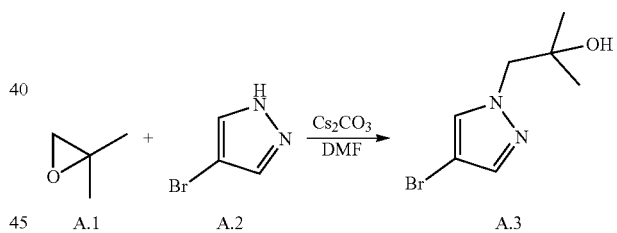

A mixture of 4-bromo-1H-pyrazole (5.00 g, 34.0 mmol) in DMF (4.5 mL) was treated with cesium carbonate (16.6 g, 51.0 mmol) and the resulting mixture was stirred at 10° C. for 10 min. 2,2-dimethyloxirane (7.36 g, 102 mmol) was added, and the resulting mixture was stirred at 10° C. for 14 h. Upon completion, the reaction mixture was diluted with water (10 mL) and extracted with EtOAc (2×40 mL). The combined organic layers were washed with brine (40 mL), dried over anhydrous Na₂SO₄, filtered, and concentrated. The resulting crude residue was purified by silica gel chromatography (gradient elution: 0-15% EtOAc/petroleum ether) to provide 1-(4-bromo-1H-pyrazol-1-yl)-2-methylpropan-2-ol. MS (ESI) m/z calc'd for C₇H₁₂BrN₂O [M+H]⁺ 219.0, found 218.9, 220.9.

Compounds in Table 1 were prepared using a similar procedure to Scheme A, in some cases using a higher reaction temperature, starting from commercial bromopyrazoles and epoxides.

TABLE 1

Intermediate Compounds Prepared According to Scheme A

| Entry | Structure Name | Observed m/z [M + H]+ |
|---|---|---|
| A.4 | ![structure] <br> 1-(4-bromo-3-methyl-1H-pyrazol-1-yl)-2-methylpropan-2-ol | 233.2, 235.2 |
| A.5 | ![structure] <br> 1-(4-bromo-5-methyl-1H-pyrazol-1-yl)-2-methylpropan-2-ol | 233.2, 235.2 |
| A.6 | ![structure] <br> 3-(4-bromo-1H-pyrazol-1-yl)-2-methylbutan-2-ol | 232.8, 234.8 |

Preparation of Intermediate B.4, 4-bromo-1-((1-((tetrahydro-2H-pyran-2-yl)oxy)cyclobutyl)methyl)-1H-pyrazole

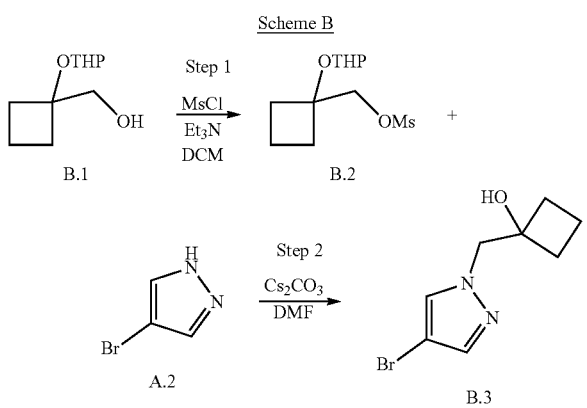

Scheme B

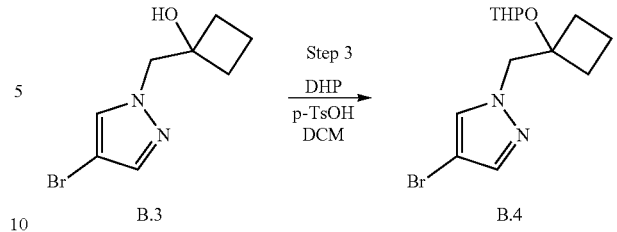

Step 1—Synthesis of Intermediate B.2, (1-((tetrahydro-2H-pyran-2-yl)oxy)cyclobutyl)methyl methanesulfonate A mixture of (1-((tetrahydro-2H-pyran-2-yl)oxy)cyclobutyl)methanol (200 mg, 1.074 mmol) and Et$_3$N (0.210 mL, 1.50 mmol) in DCM (2 mL) was cooled to 0° C. and treated with MsCl (0.211 mL, 2.71 mmol). Upon completion, water (10 mL) was added and the desired layer was extracted from the mixture with EtOAc (3×5 mL). The combined organic layers were dried over anhydrous Na$_2$SO$_4$, filtered, and concentrated to provide (1-((tetrahydro-2H-pyran-2-yl)oxy)cyclobutyl)methyl methanesulfonate, which was directly used in the next reaction.

Step 2—Synthesis of Intermediate B.3, 1-((4-bromo-1H-pyrazol-1-yl)methyl)cyclobutanol A mixture of (1-((tetrahydro-2H-pyran-2-yl)oxy)cyclobutyl)methyl methanesulfonate (39.6 mg, 0.150 mmol), Cs$_2$CO$_3$ (133 mg, 0.408 mmol), and 4-bromo-1H-pyrazole (20 mg, 0.136 mmol) in DMF (2 mL) was stirred at 90° C. for 12 h. After cooling, water (10 mL) was added and the desired layer was extracted from the mixture with EtOAc (3×5 mL). The combined organic layers were dried over anhydrous Na$_2$SO$_4$, filtered, and concentrated. The resulting crude residue was purified by Preparative TLC (silica gel, elution: 50% EtOAc/petroleum ether) to provide 1-((4-bromo-1H-pyrazol-1-yl)methyl)cyclobutanol. MS (ESI) m/z calc'd for C$_8$H$_{12}$BrN$_2$O [M+H]$^+$ 231.0, found 230.9, 232.9.

Step 3—Preparation of Intermediate B.4, 4-bromo-1((1-((tetrahydro-2H-pyran-2-yl) oxy)cyclobutyl) methyl)-1H-pyrazole p-TsOH (4.9 mg, 0.026 mmol) and 3,4-dihydro-2H-pyran (21.8 mg, 0.260 mmol) were added to a stirred solution of 1-((4-bromo-1H-pyrazol-1-yl)methyl)cyclobutanol (60 mg, 0.260 mmol) in DCM (2 mL), and the reaction was then cooled to 0° C. The resulting mixture was stirred at 40° C. for 12 h. After cooling, water (20 mL) was added and the desired layer was extracted from the mixture with EtOAc (3×10 mL). The combined organic layers were dried over anhydrous Na$_2$SO$_4$, filtered, and concentrated. The resulting crude residue was purified by silica gel chromatography (gradient elution: 0-10% EtOAc/petroleum ether) to provide 4-bromo-1-((1-((tetrahydro-2H-pyran-2-yl)oxy)cyclobutyl) methyl)-1H-pyrazole. MS (ESI) m/z calc'd for C$_{13}$H$_{20}$BrN$_2$O$_2$ [M+H]$^+$ 315.1, found 315.0, 317.0.

Preparation of Intermediate C.2, 4-bromo-1-(tetrahydro-2H-pyran-4-yl)-1H-pyrazole Scheme C

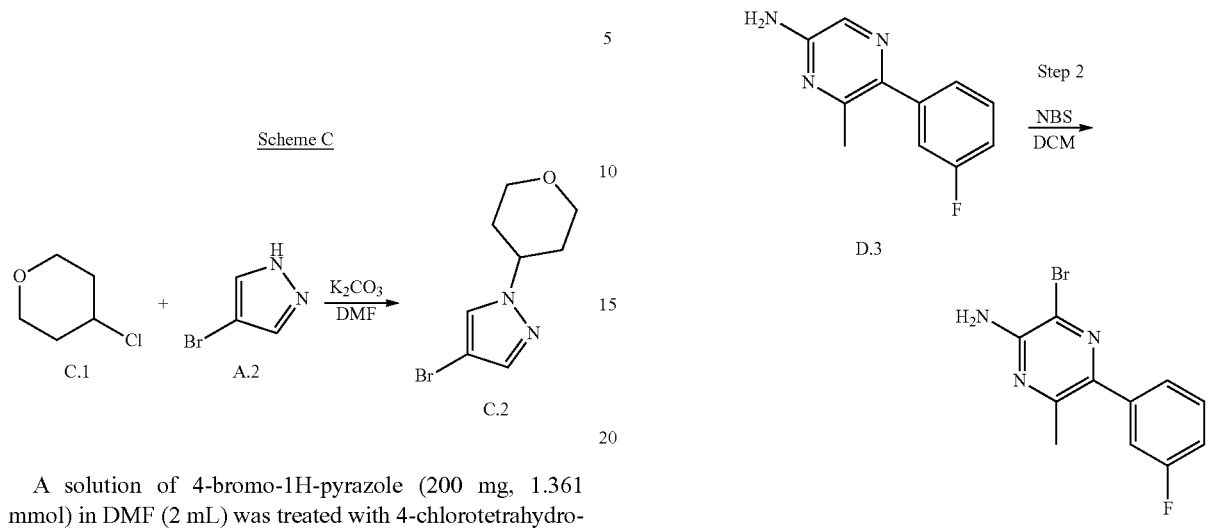

A solution of 4-bromo-1H-pyrazole (200 mg, 1.361 mmol) in DMF (2 mL) was treated with 4-chlorotetrahydro-2H-pyran (656 mg, 5.44 mmol) and potassium carbonate (564 mg, 4.08 mmol). The resulting reaction mixture was stirred at 100° C. for 3 h. After cooling, the reaction mixture was purified by reversed-phase HPLC [Method A] to provide 4-bromo-1-(tetrahydro-2H-pyran-4-yl)-1H-pyrazole. MS (ESI) m/z calc'd for $C_8H_{12}BrN_2O$ [M+H$^+$] 231.0, found 231.0, 233.0.

Preparation of Intermediate D.4, 3-bromo-5-(3-fluorophenyl)-6-methylpyrazin-2-amine

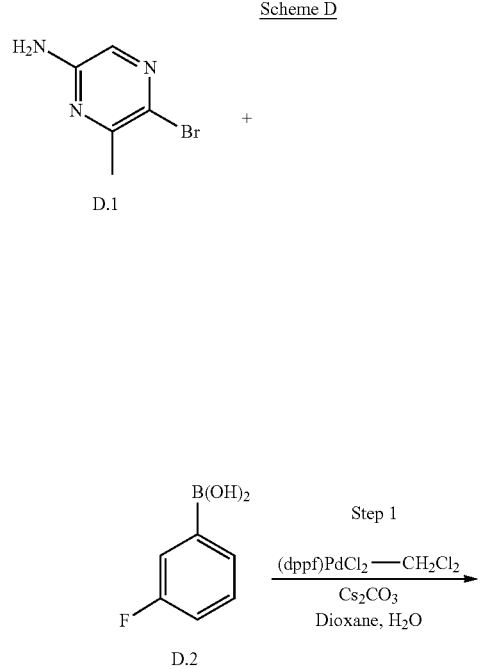

Scheme D

Step 1—Synthesis of Intermediate D.3, 5-(3-fluorophenyl)-6-methylpyrazin-2-amine A 20 mL Biotage® microwave vial was charged with 5-bromo-6-methylpyrazin-2-amine (1.00 g, 5.32 mmol), cesium carbonate (1.73 g, 5.32 mmol), (3-fluorophenyl)boronic acid (1.12 g, 7.98 mmol), and 1,1'-bis(diphenylphosphino)ferrocene-palladium(II)dichloride dichloromethane complex (0.434 g, 0.532 mmol), and the vial was evacuated and backfilled with nitrogen (3×). A degassed [Method C] mixture of dioxane (12 mL) and water (3 mL) was added, and the resulting mixture was stirred at 130° C. for 3 h. Upon completion, MP TMT resin (0.63 mmol/g, 3.17 g, 2.00 mmol) was added and the mixture was shaken overnight. The mixture was then filtered through Celite™ (diatomaceous earth). 5 mL of water was added to the filtrate and the desired layer was extracted from the mixture using DCM (3×25 mL). The combined organic layers were dried over anhydrous $NaSO_4$ then concentrated to provide 5-(3-fluorophenyl)-6-methylpyrazin-2-amine, which was used directly in the next step without further purification. MS (ESI) m/z calc'd for $C_{11}H_{11}FN_3$ [M+H]$^+$ 204.1, found 204.1.

Step 2—Preparation of Intermediate D.4, 3-bromo-5-(3-fluorophenyl)-6-methylpyrazin-2-amine A 250 mL round bottom flask was charged with 5-(3-fluorophenyl)-6-methylpyrazin-2-amine (1.00 g, 4.92 mmol). DCM (49.2 mL) was added, followed by NBS (1.05 g, 5.91 mmol). The resulting mixture was stirred at 25° C. for 2 h. The reaction was quenched with sat. aq. sodium thiosulfate (20 mL) and water (20 mL) and the desired layer was extracted with DCM (3×40 mL). The combined organic layers were dried over anhydrous $NaSO_4$, filtered, and concentrated. The resulting crude residue was purified by silica gel chromatography (gradient elution: 0-10% MeOH/DCM) to provide 3-bromo-5-(3-fluorophenyl)-6-methylpyrazin-2-amine. MS (ESI) m/z calc'd for $C_{11}H_{10}BrFN_3$ [M+H]$^+$ 282.0, found 282.0, 284.0.

Preparation of Intermediate E.2,
O-(mesitylsulfonyl)hydroxylamine

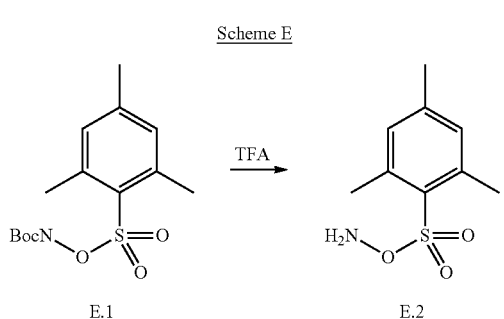

A 250 mL round bottom flask was charged with TFA (11.2 mL) and cooled to 0° C. Tert-butyl ((mesitylsulfonyl)oxy)-λ2-azanecarboxylate (3.00 g, 9.51 mmol) was then added. The resulting solution was stirred at 0° C. for 15 min, then quenched with water (80 mL) and stirred for another 15 min. The solid precipitate that formed during the quench was filtered and rinsed with 10 mL water, then transferred to a 250 mL round bottom flask and DCM (40 mL) was added. MgSO4 was added and the resulting mixture was stirred for 10 min. The mixture was then filtered and the filtrate was used directly for the reaction described in Schemes F and G.

Preparation of Intermediate F.2,
1,2-diamino-3,5-dibromo-6-methylpyrazin-1-ium
2,4,6-trimethylbenzenesulfonate

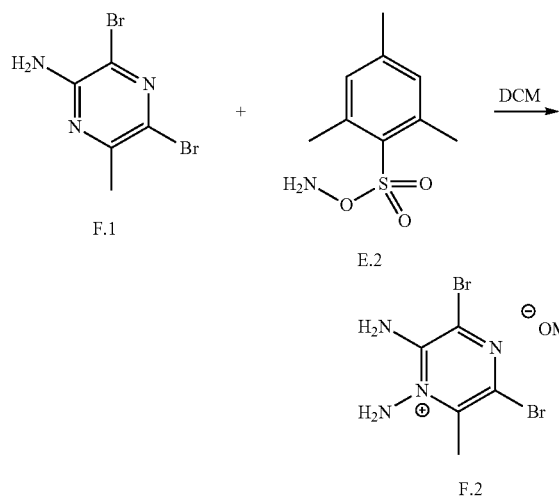

A 100 mL round bottom flask was charged with 3,5-dibromo-6-methylpyrazin-2-amine (1.27 g, 4.77 mmol). The solution of O-(mesitylsulfonyl)hydroxylamine (2.05 g, 9.54 mmol) in DCM (50 mL), freshly prepared from the procedure in Scheme E, was added. The resulting mixture was stirred at room temperature overnight. The solid precipitate that formed during the reaction was filtered and rinsed with 25 mL DCM, then dried on high vacuum for 2 h to provide 1,2-diamino-3,5-dibromo-6-methylpyrazin-1-ium 2,4,6-trimethylbenzenesulfonate. MS (ESI) m/z calc'd for $C_5H_7Br_2N_4$ [M]$^+$ 280.9, found 281.0, 283.0, 285.0.

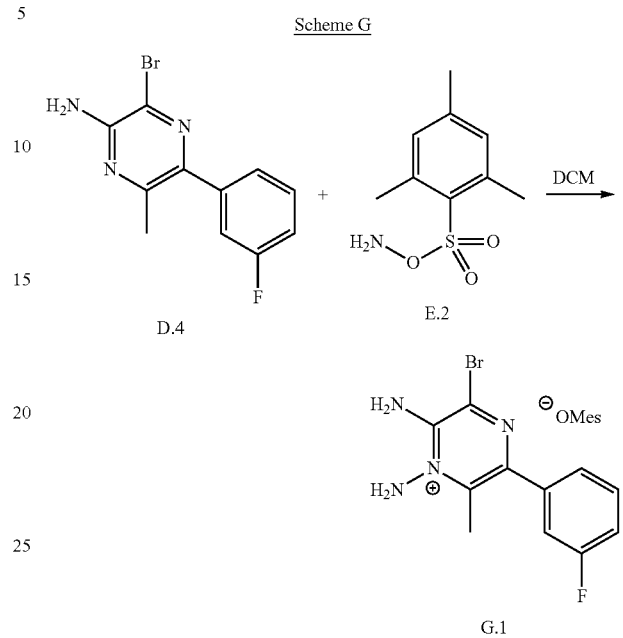

Intermediate G.1 was also synthesized according to the method shown in Scheme F, but starting from D.4. MS (ESI) m/z calc'd for $C_{11}H_{11}BrFN_4$ [M]$^+$ 297.0, found 297.0, 299.0.

Preparation of Intermediate H.4,
1-(3-fluoropyridin-2-yl)cyclopropanecarbaldehyde

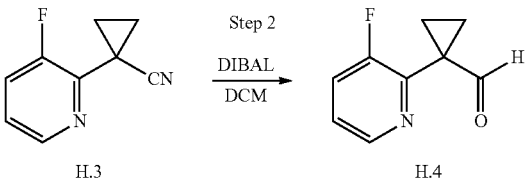

Step 1—Synthesis of Intermediate H.3, 1-(3-fluoropyridin-2-yl)cyclopropane-1-carbonitrile A solution of allylpalladium (II) chloride dimer (110 mg, 0.300 mmol) and N-XantPhos (331 mg, 0.600 mmol) in THF (15 mL) was stirred for 20 min under an atmosphere of nitrogen. A solution of 2-bromo-3-fluoropyridine (528 mg, 3.00 mmol) and cyclopropanecarbonitrile (302 mg, 4.50 mmol) in CPME (8 mL) was added, followed by LiHMDS (1 M in THF, 6.00 mL, 6.00 mmol). The resulting mixture was then stirred at 18° C. for 2 h. Upon completion, the reaction mixture was poured into water (20 mL) and extracted with EtOAc (3×20 mL). The combined organic layers were washed with water (10 mL), dried over anhydrous $Na_2SO_4$, filtered, and concentrated. The resulting crude residue was purified by silica gel chromatography (gradient elution: 0-30% EtOAc/petroleum ether) to provide 1-(3-fluoropyridin-2-yl)cyclopropanecarbonitrile. $^1$H NMR (400 MHz, $CDCl_3$) δ=8.31 (d, J=4.4 Hz, 1H), 7.49-7.40 (m, 1H), 7.29-7.24 (m, 1H), 7.26-7.23 (m, 1H), 1.84-1.78 (m, 2H), 1.77-1.72 (m, 2H).

Step 2—Preparation of Intermediate H.4, 1-(3-fluoropyridin-2-yl)cyclopropanecarbaldehyde A stirred mixture of 1-(3-fluoropyridin-2-yl)cyclopropanecarbonitrile (370 mg, 2.28 mmol) in THF (5 mL) was cooled to 0° C. and treated with DIBAL-H (1 M in Toluene, 3.88 mL, 3.88 mmol). The resulting mixture was slowly warmed to 18° C. and stirred at the same temperature for 2 h. Upon completion, the reaction was cooled to 0° C. and quenched with MeOH (5 mL). The mixture was slowly warmed to 18° C. over 15 min, and 1 N HCl (8 mL) was added. The resulting mixture was extracted with TBME (5×10 mL). The combined organic layers were dried over anhydrous $Na_2SO_4$, filtered, and concentrated to provide 1-(3-fluoropyridin-2-yl)cyclopropanecarbaldehyde, which was used in the subsequent reaction without further purification. MS (ESI) m/z calc'd for $C_9H_9FNO$ [M+H]$^+$ 166.1, found 166.0.

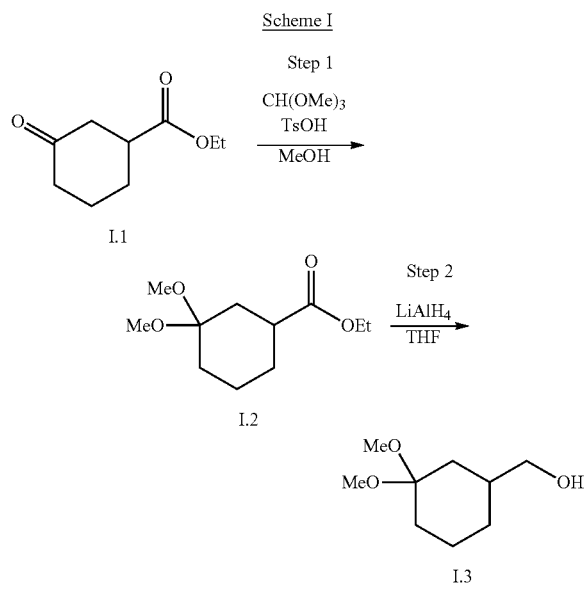

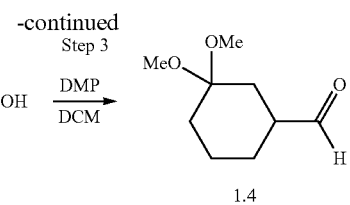

Step 1—Synthesis of Intermediate I.2, ethyl 3,3-dimethoxycyclohexanecarboxylate A solution of ethyl 3-oxocyclohexanecarboxylate (9.00 g, 52.9 mmol) in MeOH (100 mL) was treated with trimethyl orthoformate (28.0 g, 264 mmol) and 4-methylbenzenesulfonic acid hydrate (1.02 g, 5.29 mmol) at 15° C. The resulting mixture was stirred at 25° C. for 3 h. The reaction mixture was diluted with EtOAc (100 mL) and washed with sat. aq. $NaHCO_3$ (2×20 mL) and brine (40 mL). The organic layer was dried over anhydrous $Na_2SO_4$, filtered, and concentrated to provide ethyl 3,3-dimethoxycyclohexanecarboxylate, which was used in the subsequent reaction without additional purification. $^1$H NMR (400 MHz, $CDCl_3$) δ 4.11 (q, J=7.2 Hz, 2H), 3.20 (s, 3H), 3.15 (s, 3H), 2.48 (tt, J=3.6, 12.2 Hz, 1H), 2.24 (br d, J=13.6 Hz, 2H), 1.88-2.03 (m, 2H), 1.65-1.74 (m, 1H), 1.30-1.49 (m, 3H), 1.19-1.25 (m, 3H).

Step 2—Synthesis of Intermediate I.3, (3,3-dimethoxycyclohexyl)methanol

A mixture of ethyl 3,3-dimethoxycyclohexanecarboxylate (8.00 g, 37.0 mmol) in THF (100 mL) was cooled to 0° C. $LiAlH_4$ (2.80 g, 74.0 mmol) was added and the reaction mixture was stirred at 0° C. for 10 h. The reaction was quenched with water (3 mL) and 15% aq. NaOH (3 mL). The mixture was then dried over anhydrous $NaSO_4$, filtered, and concentrated to provide (3,3-dimethoxycyclohexyl)methanol, which was used in the subsequent reaction without additional purification. $^1$H NMR (400 MHz, $CDCl_3$) δ 3.41-3.53 (m, 2H), 3.18-3.23 (m, 3H), 3.15 (s, 3H), 1.96-2.12 (m, 2H), 1.63-1.79 (m, 3H), 1.36-1.51 (m, 2H), 1.20-1.29 (m, 1H), 0.86-1.07 (m, 2H).

Step 3—Preparation of Intermediate I.4, 3,3-dimethoxycyclohexane-1-carbaldehyde DMP (11.7 g, 27.5 mmol) was added to a mixture of (3,3-dimethoxycyclohexyl)methanol (2.42 g, 13.8 mmol) in DCM (30 mL). The reaction mixture was then stirred at 20° C. for 4 h. The reaction was quenched with sat. aq. $NaHCO_3$ until the solution reached pH 7. The mixture was then extracted with EtOAc (2×30 mL), dried over anhydrous $Na_2SO_4$, filtered, and concentrated. The resulting crude residue was purified by silica gel chromatography (gradient elution: 10-20% EtOAc/petroleum ether) to provide 3,3-dimethoxycyclohexanecarbaldehyde. $^1$H NMR (400 MHz, $CDCl_3$) δ 9.41 (s, 1H), 3.18 (s, 3H), 3.15 (s, 3H), 2.20-2.33 (m, 1H), 2.11-2.25 (m, 2H), 1.75-1.97 (m, 2H), 1.44-1.61 (m, 2H), 1.20-1.29 (m, 1H), 0.96-1.13 (m, 1H).

Preparation of Intermediate J.3, ethyl 1-(1-methyl-1H-pyrazol-4-yl)piperidine-3-carboxylate

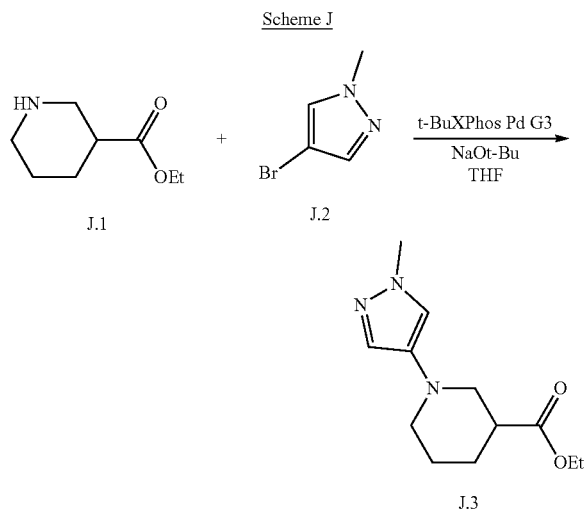

Scheme J

A 40 mL vial was backfilled with nitrogen (3×), then charged with ethyl piperidine-3-carboxylate (4.88 g, 31.1 mmol), 4-bromo-1-methyl-1H-pyrazole (0.642 mL, 6.21 mmol), and THF (6 mL). The mixture was degassed for 15 min, and t-BuXPhos Pd G3 (1.48 g, 1.86 mmol) was added. The mixture was degassed for 5 min, and then sodium tert-butoxide (1.19 g, 12.4 mmol) was added. The mixture was degassed for 5 min, and then stirred at 70° C. for 90 min. After cooling, the reaction mixture was diluted with EtOAc (20 mL), then filtered and concentrated. The resulting crude residue was purified by silica gel chromatography (gradient elution: 0-4% MeOH/DCM) to provide ethyl 1-(1-methyl-1H-pyrazol-4-yl)piperidine-3-carboxylate. MS (ESI) m/z calc'd for $C_{12}H_{20}N_3O_2$ [M+H]$^+$ 238.2, found 238.1.

Preparation of Intermediate K.1, 1-(1-methyl-1H-pyrazol-4-yl)piperidine-3-carbaldehyde

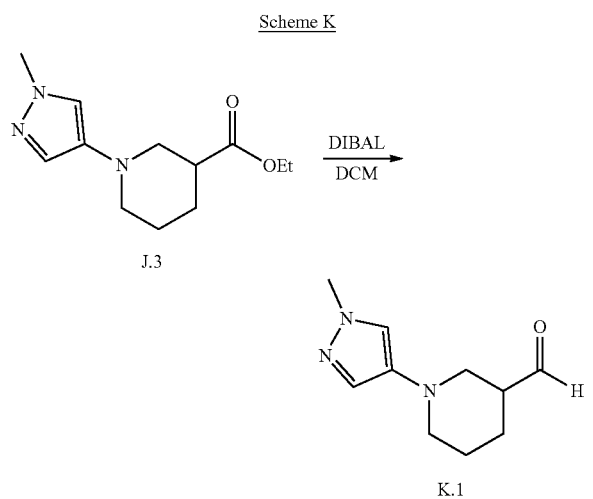

Scheme K

A 100 mL round bottom flask was charged with ethyl 1-(1-methyl-1H-pyrazol-4-yl)piperidine-3-carboxylate (2.02 g, 8.43 mmol). DCM (42 mL) was added, and the resulting mixture was cooled to −78° C. DIBAL-H (1 M in Toluene, 16.9 mL, 16.9 mmol) was then added dropwise over 30 min, with the aid of a syringe pump, ensuring that the added reagent touched the side of the flask and was allowed to cool before reaching the reaction mixture. The reaction mixture was then stirred for 30 min at −78° C. While cold, the reaction was quenched with MeOH (5 mL), which was also added dropwise down the side of the flask. After 10 min of stirring at −78° C., sat. aq. sodium potassium tartrate (1 M, 20 mL) was added, and the biphasic mixture was warmed to 25° C. and stirred at that temperature for 3 h. The layers were separated, and the aq. layer was extracted with DCM (2×50 mL). The combined organic layers were dried over anhydrous NaSO$_4$, filtered, and concentrated to provide 1-(1-methyl-1H-pyrazol-4-yl)piperidine-3-carbaldehyde, which was used directly in the subsequent reaction without additional purification. MS (ESI) m/z calc'd for $C_{10}H_{16}N_3O$ [M+H]$^+$ 194.1, found 194.3.

Preparation of Intermediate L.1, 6,8-dibromo-5-methyl-2-(1-(1-methyl-1H-pyrazol-4-yl)piperidin-3-yl)-[1,2,4]triazolo[1,5-a]pyrazine

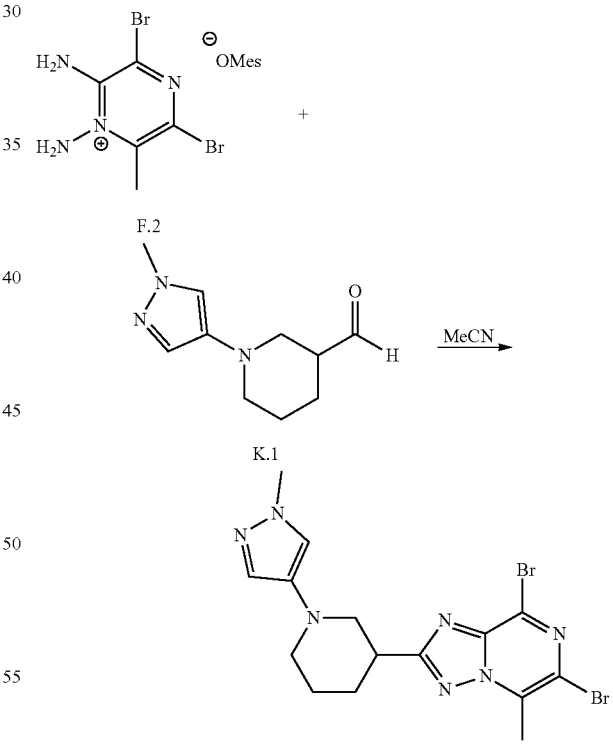

Scheme L

A 100 mL round bottom flask was charged with 1-(1-methyl-1H-pyrazol-4-yl)piperidine-3-carbaldehyde (1.63 g, 8.43 mmol) and 1,2-diamino-3,5-dibromo-6-methylpyrazin-1-ium 2,4,6-trimethylbenzenesulfonate (1.00 g, 2.07 mmol). MeCN (21 mL) was added, and the reaction mixture was stirred at 80° C. under an atmosphere of air for 1 h. DCM (20 mL) and water (20 mL) were added, and the mixture was then extracted with DCM (3×50 mL). The combined organic layers were dried over anhydrous NaSO$_4$, filtered, and concentrated. The resulting crude residue was purified by silica gel chromatography (gradient elution: 0-10% MeOH/DCM) to provide 6, 8-dibromo-5-methyl-2-(1-(1-methyl-1H-pyrazol-4-yl)piperidin-3-yl)-[1,2,4]triazolo[1,5-a]pyrazine. MS (ESI) m/z calc'd for C$_{15}$H$_{18}$Br$_2$N$_7$ [M+H]$^+$ 454.0, found 454.2, 456.2, 458.1.

Preparation of Intermediate M.2, ethyl (1S,2S)-2-(8-bromo-6-(3-fluorophenyl)-5-methyl-[1,2,4]triazolo[1,5-a]pyrazin-2-yl)cyclopropane-1-carboxylate and enantiomer

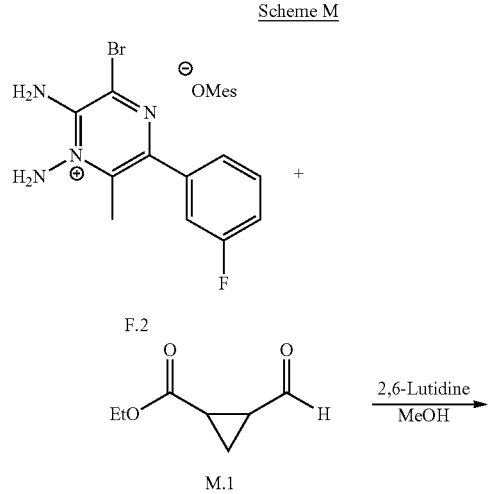

And Enantiomer

M.2

A 20 mL scintillation vial was charged with 1,2-diamino-3-bromo-5-(3-fluorophenyl)-6-methylpyrazin-1-ium 2,4,6-trimethylbenzenesulfonate (70 mg, 0.141 mmol) and ethyl 2-formylcyclopropanecarboxylate (100 mg, 0.704 mmol). MeOH (1.4 mL) was added, followed by 2,6-lutidine (33 µL, 0.281 mmol) and the resulting mixture was stirred under air at 80° C. for 5 h. DCM (2 mL) and water (2 mL) were added, and the mixture was then extracted with DCM (3×5 mL). The combined organic layers were dried over anhydrous NaSO$_4$, filtered, and concentrated. The resulting crude residue was then purified by silica gel chromatography (gradient elution: 0-100% EtOAc/Hexanes) to provide ethyl (1S,2S)-2-(8-bromo-6-(3-fluorophenyl)-5-methyl-[1,2,4]triazolo[1,5-a]pyrazin-2-yl)cyclopropane-1-carboxylate and its enantiomer. MS (ESI) m/z calc'd for C$_{18}$H$_{17}$BrFN$_4$O$_2$ [M+H]$^+$ 419.0, found 419.0, 421.0. Compounds in Table 2 were prepared according to Scheme M, starting from pyrimidinium salts F.2 or G.1 and commercially available aldehydes or intermediates 1.4 and J.1.

TABLE 2

| Entry | Structure Name | Observed m/z [M + H]$^+$ |
|---|---|---|
| M.3 | 6,8-dibromo-2-(3,3-dimethoxycyclohexyl)-5-methyl-[1,2,4]triazolo[1,5-a]pyrazine | 401.0, 403.0, 405.0 |
| M.4 | 6,8-dibromo-5-methyl-2-(1,4-dioxaspiro[4.4]nonan-7-yl)-[1,2,4]triazolo[1,5-a]pyrazine | 417.0, 419.0, 421.0 |

TABLE 2-continued

Intermediate Compounds Prepared According to Scheme M

| Entry | Structure Name | Observed m/z [M + H]+ |
|---|---|---|
| M.5 | 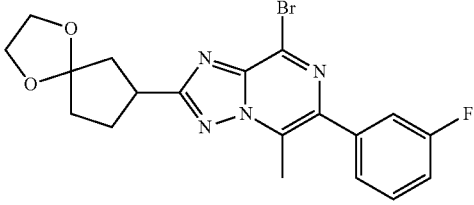 [SMILES: Cc1c(-c2cccc(F)c2)nc(Br)c2nc(C3CCC4(C3)OCCO4)nn12]<br>8-bromo-6-(3-fluorophenyl)-5-methyl-2-(1,4-dioxaspiro[4.4]nonan-7-yl)-[1,2,4]triazolo[1,5-a]pyrazine | 433.1, 435.1 |
| M.6 | 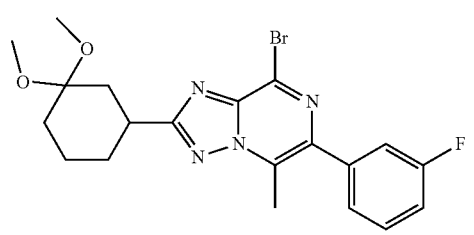 [SMILES: COC1(OC)CCCC(c2nc3c(Br)nc(-c4cccc(F)c4)c(C)n3n2)C1]<br>8-bromo-2-(3,3-dimethoxycyclohexyl)-6-(3-fluorophenyl)-5-methyl-[1,2,4]triazolo[1,5-a]pyrazine | 417.1, 419.1 |
| M.7 | 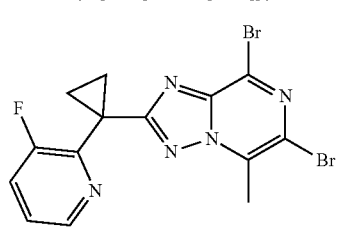 [SMILES: Cc1c(Br)nc(Br)c2nc(C3(c4ncccc4F)CC3)nn12]<br>6,8-dibromo-2-(1-(3-fluoropyridin-2-yl)cyclopropyl)-5-methyl-[1,2,4]triazolo[1,5-a]pyrazine | 425.9, 427.9, 429.9 |

Preparation of Intermediate N.2, 6-bromo-N-(2,4-dimethoxybenzyl)-5-methyl-2-(1-(1-methyl-1H-pyrazol-4-yl)piperidin-3-yl)-[1,2,4]triazolo[1,5-a]pyrazin-8-amine Scheme N

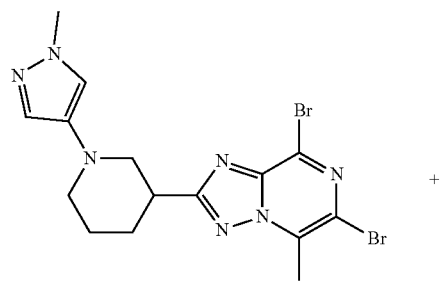

L.1

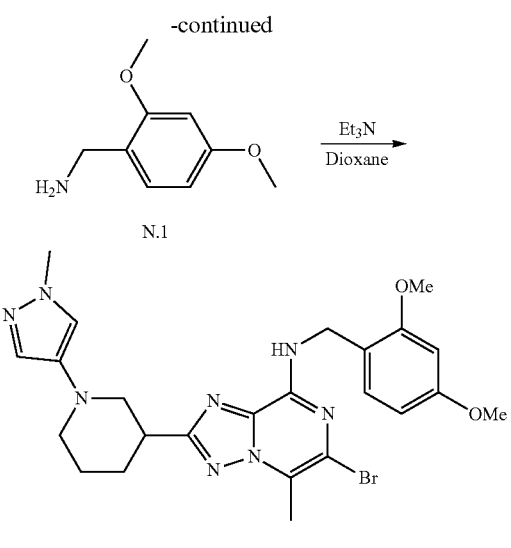

A 20 mL scintillation vial was charged with 6,8-dibromo-5-methyl-2-(1-(1-methyl-1H-pyrazol-4-yl)piperidin-3-yl)-[1,2,4]triazolo[1,5-a]pyrazine (433 mg, 0.951 mmol).

Dioxane (9.5 mL) and Et₃N (265 µL, 1.90 mmol) were added, followed by (2,4-dimethoxyphenyl)methanamine (214 µL, 1.43 mmol). The resulting mixture was stirred at 90° C. for 2 h. After cooling, the reaction mixture was concentrated, and the resulting residue was dissolved in DCM (50 mL), washed with water (10 mL) and brine (10 mL), dried over anhydrous NaSO₄, filtered, and concentrated. The resulting crude material was purified by silica gel chromatography (gradient elution: 0-10% MeOH/DCM) to provide 6-bromo-N-(2,4-dimethoxybenzyl)-5-methyl-2-(1-(1-methyl-1H-pyrazol-4-yl)piperidin-3-yl)-[1,2,4]triazolo[1,5-a]pyrazin-8-amine. MS (ESI) m/z calc'd for $C_{24}H_{30}BrN_8O_2$ [M+H]⁺ 541.2, found 541.3, 543.3.

Compounds in Table 3 were prepared according to Scheme N, starting from intermediates M.3, M.4, M.5, M.6, or M.7.

TABLE 3

Intermediate Compounds Prepared According to Scheme N

| Entry | Structure Name | Observed m/z [M + H]⁺ |
|---|---|---|
| N.3 | 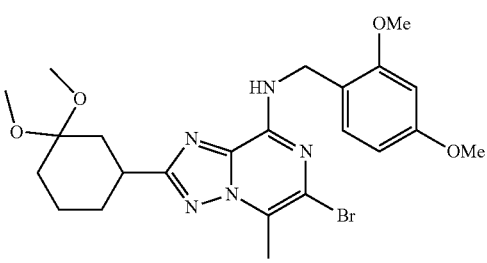 [SMILES: COc1ccc(CNc2nc(Br)c(C)n3nc(C4CCCC(OC)(OC)C4)nc23)c(OC)c1]<br>6-bromo-N-(2,4-dimethoxybenzyl)-2-(3,3-dimethoxycyclohexyl)-5-methyl-[1,2,4]triazolo[1,5-a]pyrazin-8-amine | 488.1, 490.1 |
| N.4 | 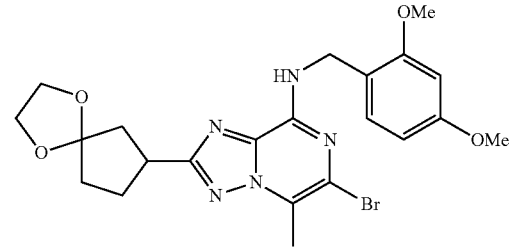 [SMILES: COc1ccc(CNc2nc(Br)c(C)n3nc(C4CCC5(C4)OCCO5)nc23)c(OC)c1]<br>6-bromo-N-(2,4-dimethoxybenzyl)-5-methyl-2-(1,4-dioxaspiro[4.4]nonan-7-yl)-[1,2,4]triazolo[1,5-a]pyrazin-8-amine | 504.1, 506.1 |
| N.5 | 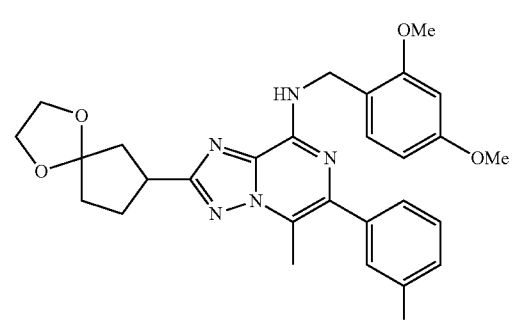<br>N-(2,4-dimethoxybenzyl)-6-(3-fluorophenyl)-5-methyl-2-(1,4-dioxaspiro[4.4]nonan-7-yl)-[1,2,4]triazolo[1,5-a]pyrazin-8-amine | 520.2 |

TABLE 3-continued

Intermediate Compounds Prepared According to Scheme N

| Entry | Structure Name | Observed m/z [M + H]+ |
|---|---|---|
| N.6 | 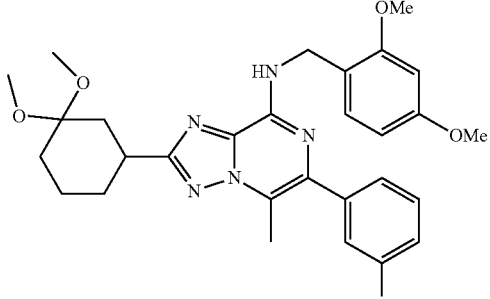<br>N-(2,4-dimethoxybenzyl)-2-(3,3-dimethoxycyclohexyl)-6-(3-fluorophenyl)-5-methyl-[1,2,4]triazolo[1,5-a]pyrazin-8-amine | 536.4 |
| N.7 | 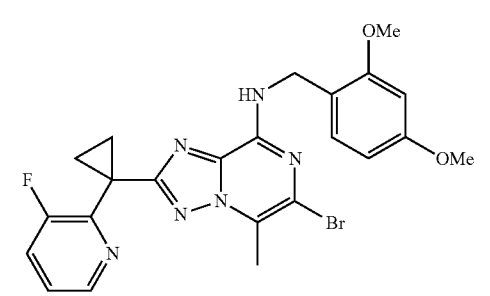 [SMILES: COc1ccc(CNc2nc(Br)c(C)n3nc(C4(c5ncccc5F)CC4)nc23)c(OC)c1]<br>6-bromo-N-(2,4-dimethoxybenzyl)-2-(1-(3-fluoropyridin-2-yl)cyclopropyl)-5-methyl-[1,2,4]triazolo[1,5-a]pyrazin-8-amine | 513.1, 515.1 |

Preparation of Intermediate O.2, ethyl 1,4-dioxaspiro[4.5]decane-7-carboxylate

Scheme O

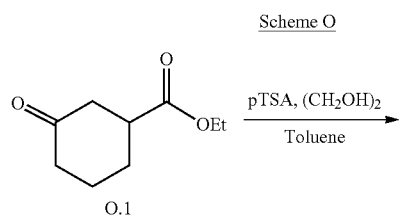

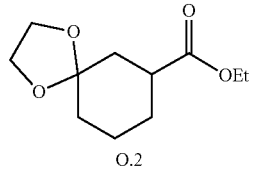

A solution of ethyl 3-oxocyclohexanecarboxylate (2.00 g, 11.8 mmol) in toluene (25 mL) was treated with ethane-1,2-diol (1.09 g, 17.7 mmol) and p-TsOH (0.112 g, 0.588 mmol). The reaction mixture was stirred at 110° C. for 16 h. After cooling, the mixture was diluted with EtOAc (50 mL), and washed with sat. aq. NaHCO₃ (2×20 mL) and brine (20 mL). The organic layer was dried over anhydrous Na₂SO₄, filtered, and concentrated to provide ethyl 1,4-dioxaspiro[4.5]decane-7-carboxylate, which was used in the subsequent reaction without additional purification. $^1$H NMR (500 MHz, CDCl$_3$) δ 4.21-4.28 (m, 1H), 4.10-4.17 (m, 1H), 3.94-3.99 (m, 4H), 2.56-2.71 (m, 1H), 1.85-2.01 (m, 3H), 1.78-1.85 (m, 1H), 1.65-1.76 (m, 2H), 1.54-1.57 (m, 2H), 1.22-1.49 (m, 3H).

Preparation of Intermediate P.6, tert-butyl 3-(7-chloro-5-((2,4-dimethoxybenzyl) amino)-8-methyl[1,2,4]triazolo[1,5-a]pyrimidin-2-yl)piperidine-1-carboxylate Scheme P

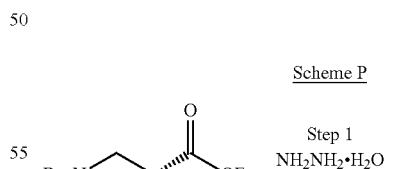

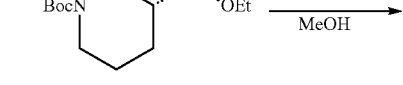

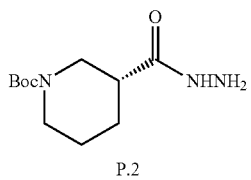

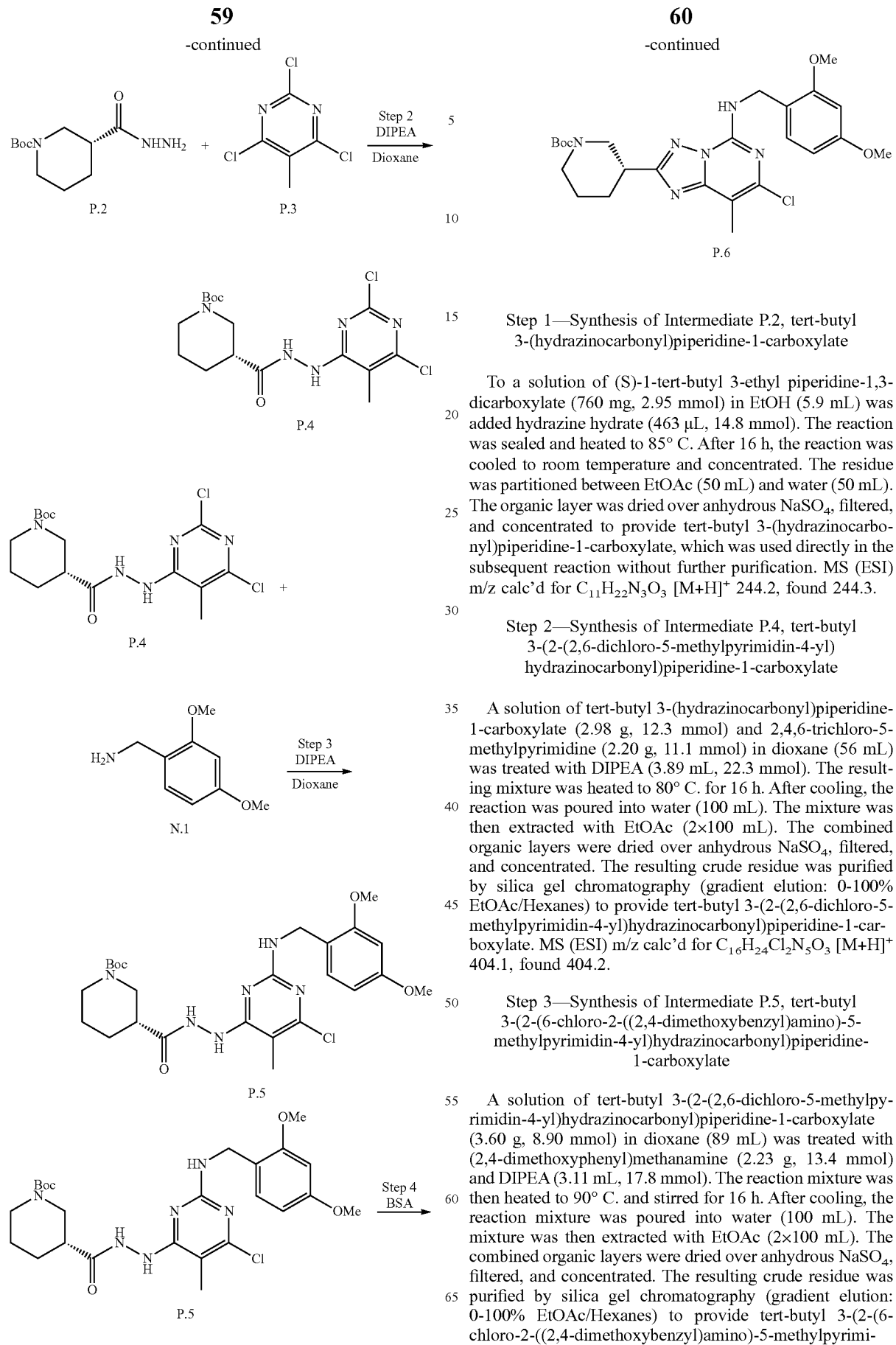

Step 1—Synthesis of Intermediate P.2, tert-butyl 3-(hydrazinocarbonyl)piperidine-1-carboxylate To a solution of (S)-1-tert-butyl 3-ethyl piperidine-1,3-dicarboxylate (760 mg, 2.95 mmol) in EtOH (5.9 mL) was added hydrazine hydrate (463 μL, 14.8 mmol). The reaction was sealed and heated to 85° C. After 16 h, the reaction was cooled to room temperature and concentrated. The residue was partitioned between EtOAc (50 mL) and water (50 mL). The organic layer was dried over anhydrous NaSO$_4$, filtered, and concentrated to provide tert-butyl 3-(hydrazinocarbonyl)piperidine-1-carboxylate, which was used directly in the subsequent reaction without further purification. MS (ESI) m/z calc'd for $C_{11}H_{22}N_3O_3$ [M+H]$^+$ 244.2, found 244.3.

Step 2—Synthesis of Intermediate P.4, tert-butyl 3-(2-(2,6-dichloro-5-methylpyrimidin-4-yl)hydrazinocarbonyl)piperidine-1-carboxylate A solution of tert-butyl 3-(hydrazinocarbonyl)piperidine-1-carboxylate (2.98 g, 12.3 mmol) and 2,4,6-trichloro-5-methylpyrimidine (2.20 g, 11.1 mmol) in dioxane (56 mL) was treated with DIPEA (3.89 mL, 22.3 mmol). The resulting mixture was heated to 80° C. for 16 h. After cooling, the reaction was poured into water (100 mL). The mixture was then extracted with EtOAc (2×100 mL). The combined organic layers were dried over anhydrous NaSO$_4$, filtered, and concentrated. The resulting crude residue was purified by silica gel chromatography (gradient elution: 0-100% EtOAc/Hexanes) to provide tert-butyl 3-(2-(2,6-dichloro-5-methylpyrimidin-4-yl)hydrazinocarbonyl)piperidine-1-carboxylate. MS (ESI) m/z calc'd for $C_{16}H_{24}Cl_2N_5O_3$ [M+H]$^+$ 404.1, found 404.2.

Step 3—Synthesis of Intermediate P.5, tert-butyl 3-(2-(6-chloro-2-((2,4-dimethoxybenzyl)amino)-5-methylpyrimidin-4-yl)hydrazinocarbonyl)piperidine-1-carboxylate A solution of tert-butyl 3-(2-(2,6-dichloro-5-methylpyrimidin-4-yl)hydrazinocarbonyl)piperidine-1-carboxylate (3.60 g, 8.90 mmol) in dioxane (89 mL) was treated with (2,4-dimethoxyphenyl)methanamine (2.23 g, 13.4 mmol) and DIPEA (3.11 mL, 17.8 mmol). The reaction mixture was then heated to 90° C. and stirred for 16 h. After cooling, the reaction mixture was poured into water (100 mL). The mixture was then extracted with EtOAc (2×100 mL). The combined organic layers were dried over anhydrous NaSO$_4$, filtered, and concentrated. The resulting crude residue was purified by silica gel chromatography (gradient elution: 0-100% EtOAc/Hexanes) to provide tert-butyl 3-(2-(6-chloro-2-((2,4-dimethoxybenzyl)amino)-5-methylpyrimidin-4-yl)hydrazinocarbonyl)piperidine-1-carboxylate. MS (ESI) m/z calc'd for $C_{25}H_{36}ClN_6O_5$ [M+H]$^+$ 535.2, found 535.4.

Step 4—Preparation of Intermediate P.6, tert-butyl 3-(7-chloro-5-((2,4-dimethoxybenzyl) amino)-8-methyl[1,2,4]triazolo[1,5-a]pyrimidin-2-yl)piperidine-1-carboxylate Tert-butyl 3-(2-(6-chloro-2-((2,4-dimethoxybenzyl) amino)-5-methylpyrimidin-4-yl)hydrazinocarbonyl)piperidine-1-carboxylate (3.4 g, 6.35 mmol) was dissolved in BSA (28.0 mL, 114 mmol). The mixture was heated to 120° C. and stirred for 18 h. After cooling, the reaction mixture was concentrated. The resulting crude residue was purified by silica gel chromatography (gradient elution: 0-50% EtOAc/Hexanes) to provide tert-butyl 3-(7-chloro-5-((2,4-dimethoxybenzyl)amino)-8-methyl-[1,2,4]triazolo[1,5-c]pyrimidin-2-yl)piperidine-1-carboxylate. MS (ESI) m/z calc'd for $C_{25}H_{34}ClN_6O_4$ [M+H]$^+$ 517.2, found 517.4.

Compounds in Table 4 were prepared according to Scheme P and General Scheme 1, starting from commercially available alkyl esters or intermediate 0.2, and 2,4,6-trichloro-6-methylpyrimidine.

TABLE 4

Intermediate Compounds Prepared According to General Scheme 1 and Scheme P

| Entry | Structure Name | Observed m/z [M + H]$^+$ |
|---|---|---|
| P.7 | 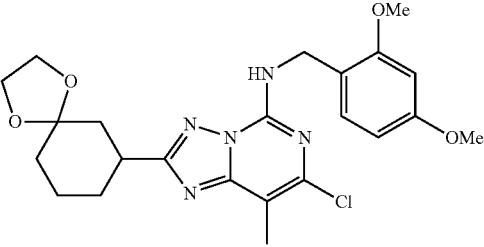 [SMILES: COc1ccc(CNc2nc(Cl)c(C)c3nc(C4CCCC5(C4)OCCO5)nn23)c(OC)c1]<br>7-chloro-N-(2,4-dimethoxybenzyl)-8-methyl-2-(1,4-dioxaspiro[4.5]decan-7-yl)-[1,2,4]triazolo[1,5-c]pyrimidin-5-amine | 474.3 |
| P.8 | 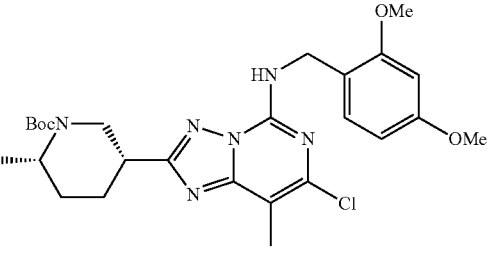 [SMILES: COc1ccc(CNc2nc(Cl)c(C)c3nc([C@@H]4CC[C@H](C)N(C(=O)OC(C)(C)C)C4)nn23)c(OC)c1]<br>And Enantiomer<br>(racemic, cis)-tert-butyl-5-(7-chloro-5-((2,4-dimethoxybenzyl)amino)-8-methyl-[1,2,4]triazolo[1,5-c]pyrimidin-2-yl)-2-methylpiperidine-1-carboxylate | 531.4 |
| P.9 | 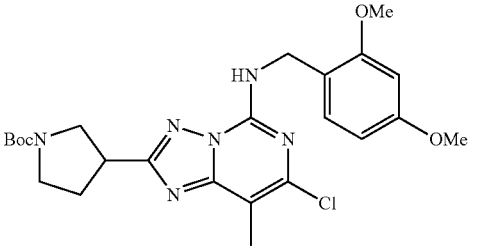 [SMILES: COc1ccc(CNc2nc(Cl)c(C)c3nc(C4CCN(C(=O)OC(C)(C)C)C4)nn23)c(OC)c1]<br>tert-butyl 3-(7-chloro-5-((2,4-dimethoxybenzyl)amino)-8-methyl-[1,2,4]triazolo[1,5-c]pyrimidin-2-yl)pyrrolidine-1-carboxylate | 503.3 |

TABLE 4-continued

Intermediate Compounds Prepared According to General Scheme 1 and Scheme P

| Entry | Structure Name | Observed m/z [M + H]+ |
|---|---|---|
| P.10 | 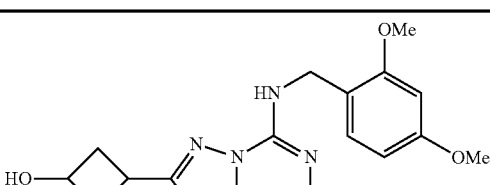  3-(7-chloro-5-((2,4-dimethoxybenzyl)amino)-8-methyl-[1,2,4]triazolo[1,5-c]pyrimidin-2-yl)cyclobutan-1-ol | 404.1 |

Preparation of Intermediate Q.7, tert-butyl (S)-2-(7-chloro-5-((2,4-dimethoxybenzyl)amino)-[1,2,4]triazolo[1,5-c]pyrimidin-2-yl)-4,4-difluoropyrrolidine-1-carboxylate Scheme Q

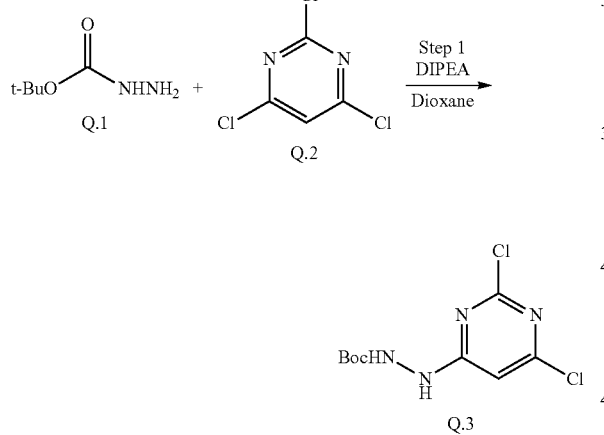

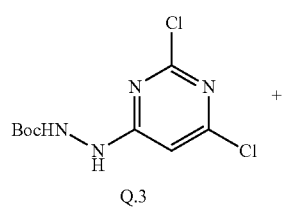

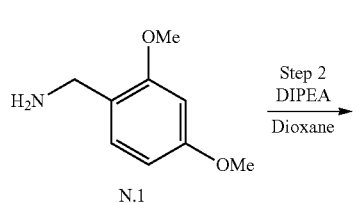

-continued

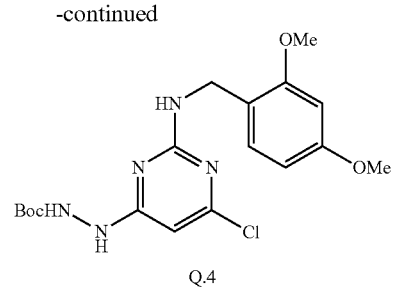

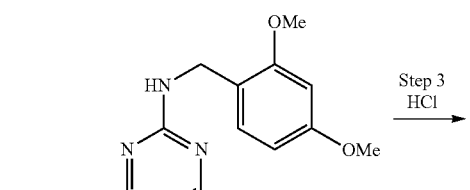

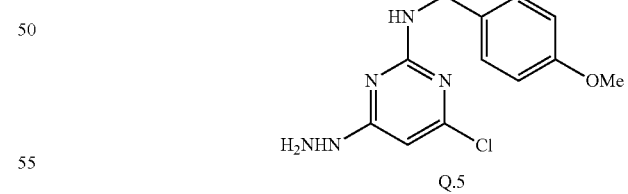

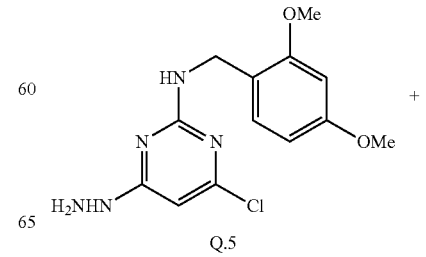

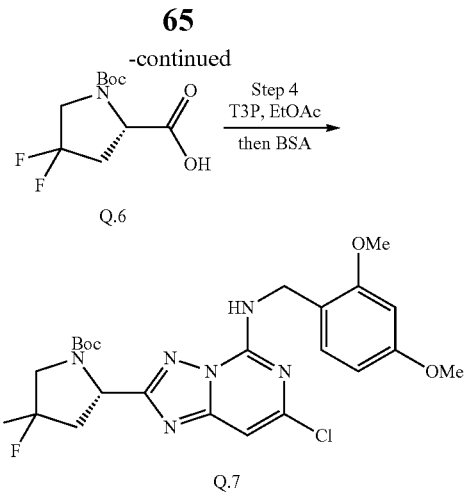

Q.6

Step 4
T3P, EtOAc
then BSA

Q.7

Step 1—Synthesis of Intermediate Q.3, tert-butyl 2-(2,6-dichloropyrimidin-4-yl)hydrazine-1-carboxylate A stirred solution of 2,4,6-trichloropyrimidine (15 g, 82 mmol) in dioxane (800 mL) was treated with tert-butyl hydrazinecarboxylate (11.9 g, 90 mmol) and DIPEA (28.6 mL, 164 mmol). The resulting mixture was heated to 70° C. and stirred for 16 h. After cooling, EtOAc (200 mL) and water (100 mL) were added. The layers were separated and the aq. layer was extracted with EtOAc (3×100 mL). The combined organic layers were dried over anhydrous $NaSO_4$, filtered, and concentrated to provide tert-butyl 2-(2,6-dichloropyrimidin-4-yl)hydrazine-1-carboxylate, which was used in the subsequent reaction without additional purification. MS (ESI) m/z calc'd for $C_9H_{13}Cl_2N_4O_2$ $[M+H]^+$ 279.0, found 279.1.

Step 2—Synthesis of Intermediate Q.4, tert-butyl 2-(6-chloro-2-((2,4-dimethoxybenzyl)amino)pyrimidin-4-yl)hydrazine-1-carboxylate A solution of tert-butyl 2-(2,6-dichloropyrimidin-4-yl)hydrazine-1-carboxylate (22 g, 79 mmol) in dioxane (600 mL) was treated with (2,4-dimethoxyphenyl)methanamine (19.8 g, 118 mmol) and DIPEA (27.5 mL, 158 mmol). The resulting mixture was heated to 95° C. and stirred for 16 h. After cooling, the reaction mixture was concentrated. The resulting crude residue was dissolved in DCM (300 mL) and washed with water (200 mL) and aq. HCl (1 N, 200 mL), dried over anhydrous $NaSO_4$, filtered, and concentrated to provide tert-butyl 2-(6-chloro-2-((2,4-dimethoxybenzyl)amino)pyrimidin-4-yl)hydrazine-1-carboxylate, which was used in the subsequent step without additional purification. MS (ESI) m/z calc'd for $C_{18}H_{25}ClN_5O_4$ $[M+H]^+$ 410.2, found 410.3.

Step 3—Synthesis of Intermediate Q.5, 4-chloro-N-(2,4-dimethoxybenzyl)-6-hydrazinylpyrimidin-2-amine A solution of tert-butyl 2-(6-chloro-2-((2,4-dimethoxybenzyl)amino)pyrimidin-4-yl)hydrazine-1-carboxylate (10.0 g, 24.4 mmol) in MeOH (200 mL) was treated with HCl (4 M in dioxane, 24.4 mL, 98.0 mmol). The resulting mixture was stirred at 25° C. for 2 h. The mixture was then concentrated, and the residue was suspended in $Et_2O$ (150 mL). The precipitate was filtered to provide 4-chloro-N-(2,4-dimethoxybenzyl)-6-hydrazinylpyrimidin-2-amine as a hydrochloride salt which was used in the subsequent reaction. MS (ESI) m/z calc'd for $C_{13}H_{17}ClN_5O_2$ $[M+H]^+$ 310.1, found 310.0.

Step 4—Preparation of Intermediate Q.7, tert-butyl (S)-2-(7-chloro-5-((2,4-dimethoxybenzyl)amino)-[1,2,4]triazolo[1,5-c]pyrimidin-2-yl)-4,4-difluoropyrrolidine-1-carboxylate A stirred solution of 4-chloro-N-(2,4-dimethoxybenzyl)-6-hydrazinylpyrimidin-2-amine hydrochloride (3.50 g, 10.11 mmol), (S)-1-(tert-butoxycarbonyl)-4,4-difluoropyrrolidine-2-carboxylic acid (2.8 g, 11.1 mmol), and N-ethyl-N-isopropylpropan-2-amine (7.14 mL, 40.4 mmol) in DCM (100 mL) was treated with T3P (50% in EtOAc, 12.9 g, 20.2 mmol). The resulting mixture was stirred at 25° C. for 2 h, and then the reaction was quenched with sat. aq. $NaHCO_3$ (100 mL). After stirring for 5 min, the layers were separated, and the organic layer was dried over anhydrous $NaSO_4$, filtered, and concentrated. The resulting crude residue was treated with BSA (50 mL) and the resulting mixture was stirred at 130° C. overnight. After cooling, the mixture was concentrated. The residue was dissolved in DCM (250 mL) and treated with sat. aq. $NaHCO_3$ (200 mL). The layers were separated, and the organic layer was dried over anhydrous $NaSO_4$, filtered, and concentrated. The resulting crude residue was purified by silica gel chromatography (gradient elution: 10-100% EtOAc/Hexanes) to provide tert-butyl (S)-2-(7-chloro-5-((2,4-dimethoxybenzyl)amino)-[1,2,4]triazolo[1,5-c]pyrimidin-2-yl)-4,4-difluoropyrrolidine-1-carboxylate. MS (ESI) m/z calc'd for $C_{23}H_{28}ClF_2N_6O_4$ $[M+H]^+$ 525.2, found 525.1.

Preparation of Intermediate R.2, tert-butyl 3-(5-((2,4-dimethoxybenzyl)amino)-8-methyl-7-(oxazol-2-yl)-[1,2,4]triazolo[1,5-a]pyrimidin-2-yl)piperidine-1-carboxylate Scheme R

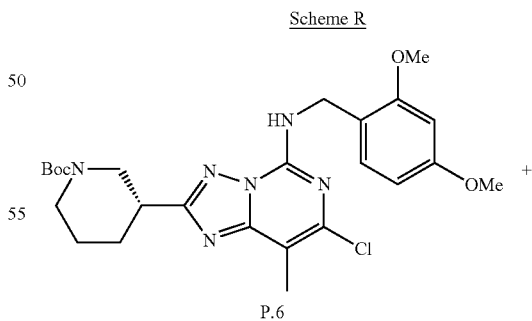

P.6

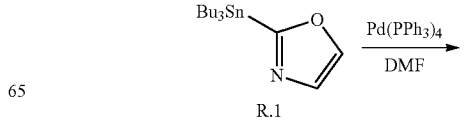

R.1

-continued

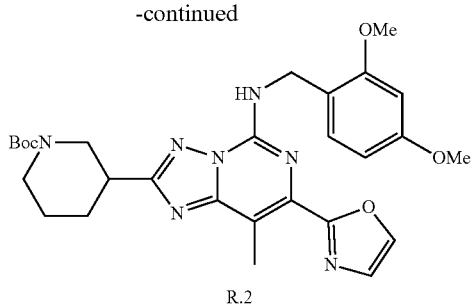

R.2

A nitrogen-sparged solution of tert-butyl 3-(7-chloro-5-((2,4-dimethoxybenzyl)amino)-8-methyl-[1,2,4]triazolo[1,5-c]pyrimidin-2-yl)piperidine-1-carboxylate (1.00 g, 1.93 mmol) and 2-(tributylstannyl)oxazole (1.04 g, 2.90 mmol) in DMF (10 mL) was treated with Pd(PPh$_3$)$_4$ (224 mg, 0.193 mmol). The mixture was degassed and then heated to 100° C. and stirred for 16 h. After cooling, the reaction mixture was poured into sat. aq. NH$_4$Cl (100 mL). The desired layer was extracted from the mixture with EtOAc (2×50 mL). The combined organics were dried over anhydrous NaSO$_4$, filtered, and concentrated. The resulting crude residue was purified by silica gel chromatography (gradient elution: 0-100% EtOAc/Hexanes) to provide tert-butyl 3-(5-((2,4-dimethoxybenzyl)amino)-8-methyl-7-(oxazol-2-yl)-[1,2,4]triazolo[1,5-c]pyrimidin-2-yl)piperidine-1-carboxylate. MS (ESI) m/z calc'd for C$_{28}$H$_{36}$N$_7$O$_5$ [M+H]$^+$ 550.3, found 550.4. Compounds in Table 5 were prepared according to General Scheme 1 and Scheme R, employing a slightly modified procedure that used XPhos Pd G2 as the catalyst and dioxane as solvent, starting from intermediates P.7, Q.7, N.2, N.3, N.4, P.8, N.7, P.9, or P.10, and the appropriate commercial tributylstannane coupling partner.

TABLE 5

Intermediate Compounds Prepared According to General Scheme 1 and Scheme R

| Entry | Structure Name | Observed m/z [M + H]$^+$ |
|---|---|---|
| R.3 | N-(2,4-dimethoxybenzyl)-8-methyl-7-(oxazol-2-yl)-2-(1,4-dioxaspiro[4.5]decan-7-yl)-[1,2,4]triazolo[1,5-c]pyrimidin-5-amine | 507.4 |
| R.4 | tert-butyl (S)-2-(5-((2,4-dimethoxybenzyl)amino)-7-phenyl-[1,2,4]triazolo[1,5-c]pyrimidin-2-yl)-4,4-difluoropyrrolidine-1-carboxylate | 567.2 |
| R.5 | tert-butyl (S)-2-(5-((2,4-dimethoxybenzyl)amino)-7-(oxazol-2-yl)-[1,2,4]triazolo[1,5-c]pyrimidin-2-yl)-4,4-difluoropyrrolidine-1-carboxylate | 558.2 |

TABLE 5-continued

Intermediate Compounds Prepared According to General Scheme 1 and Scheme R

| Entry | Structure Name | Observed m/z [M + H]+ |
|---|---|---|
| R.6 | 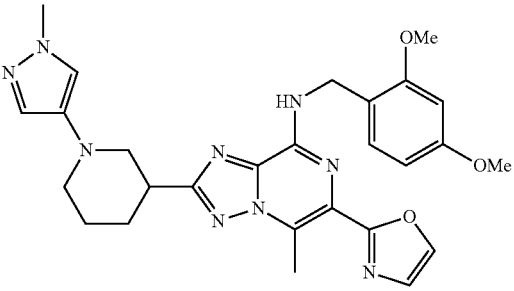<br>N-(2,4-dimethoxybenzyl)-5-methyl-2-(1-(1-methyl-1H-pyrazol-4-yl)piperidin-3-yl)-6-(oxazol-2-yl)-[1,2,4]triazolo[1,5-a]pyrazin-8-amine | 530.2 |
| R.7 | 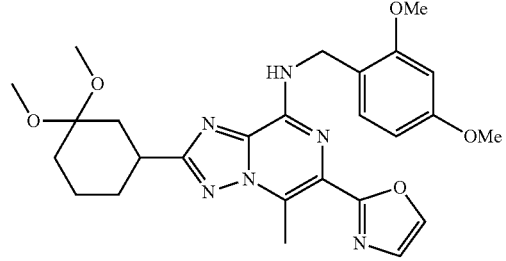<br>N-(2,4-dimethoxybenzyl)-2-(3,3-dimethoxycyclohexyl)-5-methyl-6-(oxazol-2-yl)-[1,2,4]triazolo[1,5-a]pyrazin-8-amine | 509.3 |
| R.8 | 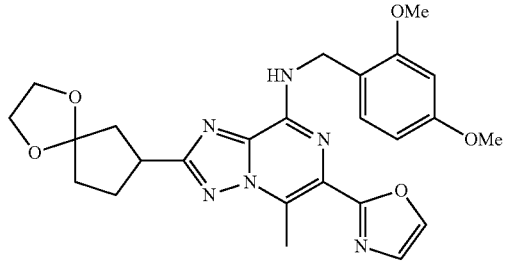<br>N-(2,4-dimethoxybenzyl)-5-methyl-6-(oxazol-2-yl)-2-(1,4-dioxaspiro[4.4]nonan-7-yl)-[1,2,4]triazolo[1,5-a]pyrazin-8-amine | 493.4 |
| R.9 | 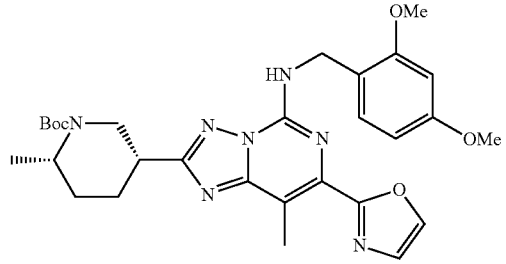<br>And Enantiomer<br>(racemic, cis)-tert-butyl-5-(5-(((2,4-dimethoxybenzyl)amino)-8-methyl-7-(oxazol-2-yl)-[1,2,4]triazolo[1,5-c]pyrimidin-2-yl)-2-methylpiperidine-1-carboxylate | 564.4 |

TABLE 5-continued

Intermediate Compounds Prepared According to General Scheme 1 and Scheme R

| Entry | Structure Name | Observed m/z [M + H]+ |
|---|---|---|
| R.10 | 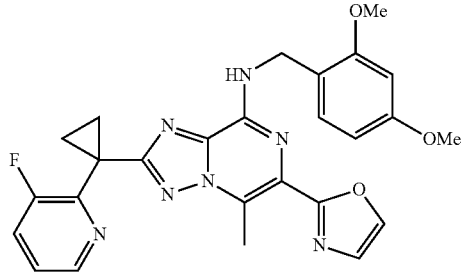<br>N-(2,4-dimethoxybenzyl)-2-(1-(3-fluoropyridin-2-yl)cyclopropyl)-5-methyl-6-(oxazol-2-yl)-[1,2,4]triazolo[1,5-a]pyrazin-8-amine | 502.3 |
| R.11 | 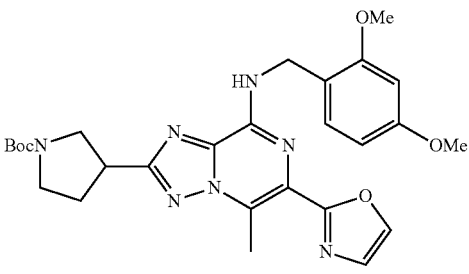<br>tert-butyl 3-(5-((2,4-dimethoxybenzyl)amino)-8-methyl-7-(oxazol-2-yl)-[1,2,4]triazolo[1,5-c]pyrimidin-2-yl)pyrrolidine-1-carboxylate | 536.4 |
| R.12 | 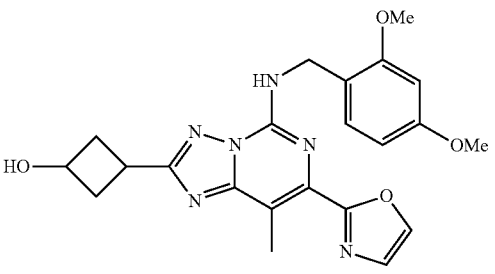<br>3-(5-((2,4-dimethoxybenzyl)amino)-8-methyl-7-(oxazol-2-yl)-[1,2,4]triazolo[1,5-c]pyrimidin-2-yl)cyclobutan-1-ol | 437.2 |

Preparation of Intermediate S.2, 6-(2,5difluorophenyl)-N-(2,4-dimethoxybenzyl)-5-methyl-2-(1-(1-methyl-1H-pyrazol-4-yl)piperidin-3-yl)-[1,2,4]triazolo[1,5-a]pyrazin-8-amine Scheme S

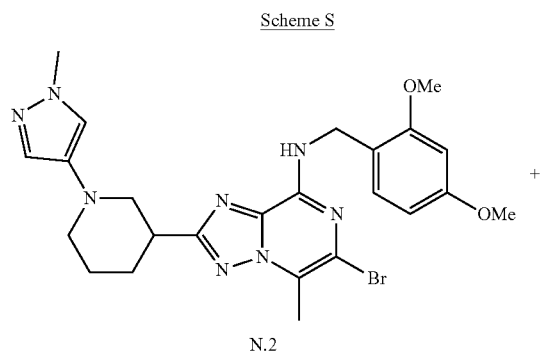

N.2

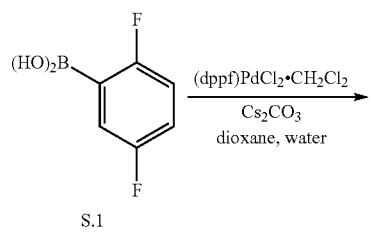

S.1

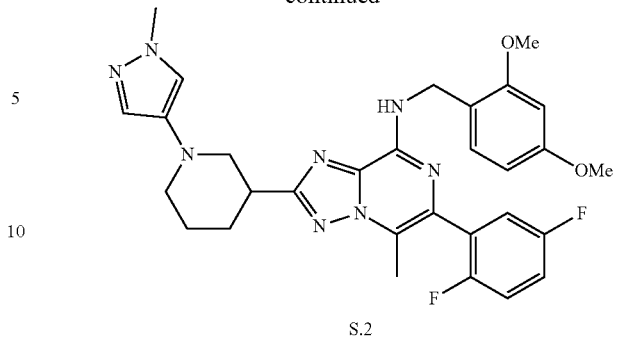

S.2

A 2 mL Biotage® microwave vial was charged with 6-bromo-N-(2,4-dimethoxybenzyl)-5-methyl-2-(1-(1-methyl-1H-pyrazol-4-yl)piperidin-3-yl)-[1,2,4]triazolo[1,5-a]pyrazin-8-amine (262 mg, 0.484 mmol), (2,5-difluorophenyl)boronic acid (115 mg, 0.726 mmol), cesium carbonate (158 mg, 0.484 mmol), and 1,1'-bis(diphenylphosphino)ferrocene-palladium(II)dichloride dichloromethane complex (39.5 mg, 0.048 mmol) and the vial was evacuated and backfilled with nitrogen (3×). A mixture of dioxane (2.6 mL) and water (0.65 mL) was added, and the resulting mixture was heated at 125° C. overnight. After cooling, water (3 mL) and DCM (3 mL) were added. The layers were separated, and the aq. layer was extracted with DCM (2×5 mL). The combined organic layers were dried over anhydrous $NaSO_4$, filtered through Celite™ (diatomaceous earth) and concentrated to provide 6-(2,5-difluorophenyl)-N-(2,4-dimethoxybenzyl)-5-methyl-2-(1-(1-methyl-1H-pyrazol-4-yl)piperidin-3-yl)-[1,2,4]triazolo[1,5-a]pyrazin-8-amine, which was used directly in the next reaction without further purification. MS (ESI) m/z calc'd for $C_{30}H_{33}F_2N_8O_2$ $[M+H]^+$ 575.3, found 575.2. Compounds in Table 6 were prepared using a similar procedure to Scheme S, starting from either intermediates P.6 or P.8 and the appropriate commercial boronic acid.

TABLE 6

Intermediate Compounds Prepared According to General Scheme 1 and Scheme S

| Entry | Structure Name | Observed m/z $[M + H]^+$ |
|---|---|---|
| S.3 | 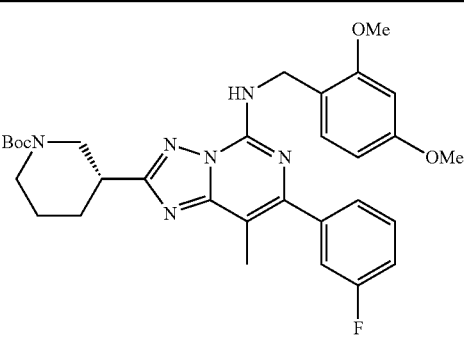<br>tert-butyl (R)-3-(5-((2,4-dimethoxybenzyl)amino)-7-(3-fluorophenyl)-8-methyl-[1,2,4]triazolo[1,5-c]pyrimidin-2-yl)piperidine-1-carboxylate | 577.3 |

TABLE 6-continued

Intermediate Compounds Prepared According to General Scheme 1 and Scheme S

| Entry | Structure<br>Name | Observed m/z<br>[M + H]+ |
|---|---|---|
| S.4 | 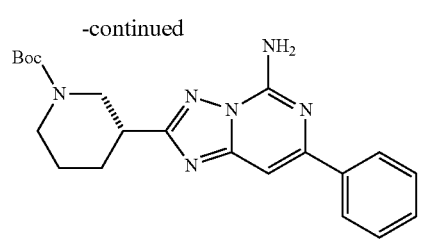<br>And Enantiomer<br>(racemic,cis)-tert-butyl-5-(5-((2,4-dimethoxybenzyl)amino)-<br>7-(3-fluorophenyl)-8-methyl-[1,2,4]triazolo[1,5-c]pyrimidin-<br>2-yl)-2-methylpiperidine-1-carboxylate | 591.1 |

Preparation of Intermediate T.5, (R)-tert-butyl 3-(5-amino-7-phenyl-[1,2,4]triazolo[1,5-c]pyrimidin-2-yl)piperidine-1-carboxylate

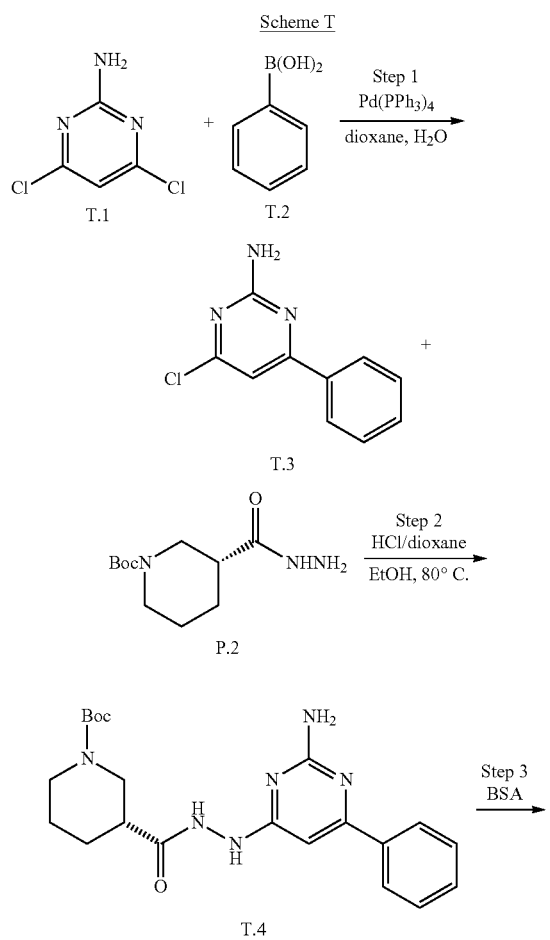

Step 1—Synthesis of Intermediate T.3, 4-chloro-6-phenylpyrimidin-2-amine

A 250 mL round bottom flask was charged with 4,6-dichloropyrimidin-2-amine (8.00 g, 49.1 mmol), phenylboronic acid (7.2 g, 58.9 mmol), Pd(PPh$_3$)$_4$ (2.8 g, 2.46 mmol), potassium carbonate (13.6 g, 98.2 mmol), H$_2$O (10 mL) and dioxane (50 mL). The reaction mixture was stirred at 80° C. for 2 h. After completion, the reaction mixture was concentrated. The resulting crude material was treated with water (50 mL), and then extracted with EtOAc (3×100 mL). The combined organic layers were dried over anhydrous Na$_2$SO$_4$, filtered, and concentrated. The resulting crude residue was purified by silica column chromatography (elution: 20% EtOAc/petroleum ether) to provide 4-chloro-6-phenylpyrimidin-2-amine. MS (ESI) m/z calc'd for C$_{10}$H$_9$ClN$_3$ [M+H]+ 206, found 206.

Step 2—Synthesis of Intermediate T.4, (R)-tert-butyl 3-(2-(2-amino-5-bromo-6-phenylpyrimidin-4-yl)hydrazinocarbonyl)piperidine-1-carboxylate A mixture of 4-chloro-6-phenylpyrimidin-2-amine (5.00 g, 24.4 mmol), (R)-tert-butyl 3-(hydrazinocarbonyl)piperidine-1-carboxylate (7.1 g, 29.3 mmol), HCl (4 M in dioxane, 6.00 mL, 24.0 mmol) and EtOH (50 mL) was stirred at 80° C. for 2 h. The reaction mixture was then concentrated. The resulting crude material was treated with water (50 mL) and extracted with EtOAc (3×100 mL), and the combined organic layers were filtered and concentrated to provide (R)-tert-butyl 3-(2-(2-amino-5-bromo-6-phenylpyrimidin-4-yl)hydrazinocarbonyl)piperidine-1-carboxylate, which was used in the next step without further purification. MS (ESI) m/z calc'd for $C_{21}H_{29}N_6O_3$ [M+H]$^+$ 413, found 413.

Step 3—Preparation of Intermediate T.5, (R)-tert-butyl 3-(5-amino-7-phenyl-[1,2,4]triazolo[1,5-c]pyrimidin-2-yl)piperidine-1-carboxylate A mixture of (R)-tert-butyl 3-(2-(2-amino-5-bromo-6-phenylpyrimidin-4-yl)hydrazinocarbonyl)piperidine-1-carboxylate (8.00 g, 19.4 mmol) and BSA (39.4 g, 194 mmol) was stirred at 140° C. overnight. The reaction mixture was then concentrated. The resulting crude residue was purified by silica column chromatography (elution: 33% EtOAc/petroleum ether) to provide (R)-tert-butyl 3-(5-amino-7-phenyl-[1,2,4]triazolo[1,5-c]pyrimidin-2-yl)piperidine-1-carboxylate. MS (ESI) m/z calc'd for $C_{21}H_{27}N_6O_2$ [M+H]$^+$ 395, found 395.

Preparation of Intermediate U.1, N-(2,4-dimethoxybenzyl)-8-methyl-7-(oxazol-2-yl)-2-(piperidin-3-yl)-[1,2,4]triazolo[1,5-c]pyrimidin-5-amine Scheme U

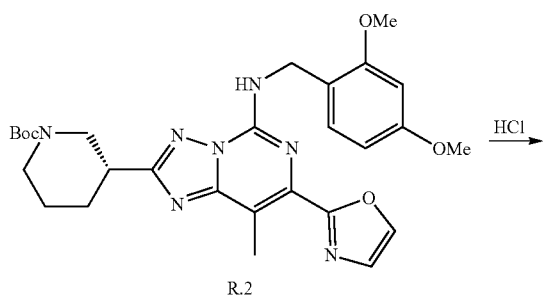

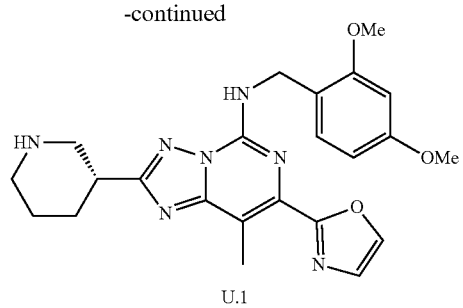

A solution of tert-butyl 3-(5-((2,4-dimethoxybenzyl)amino)-8-methyl-7-(oxazol-2-yl)-[1,2,4]triazolo[1,5-c]pyrimidin-2-yl)piperidine-1-carboxylate (465 mg, 0.846 mmol) in DCM (5 mL) was treated with HCl (4 M in dioxane, 1.06 mL, 4.23 mmol). The resulting mixture was stirred at 25° C. for 3 h. The reaction mixture was then poured into sat. aq. NaHCO$_3$ (50 mL) and then extracted with DCM (2×50 mL). The combined organic layers were dried over anhydrous Na$_2$SO$_4$, filtered, and concentrated. The resulting crude residue was purified by reversed-phase HPLC [Method A]. The product fractions were washed with sat. aq. NaHCO$_3$ (25 mL) and concentrated to provide N-(2,4-dimethoxybenzyl)-8-methyl-7-(oxazol-2-yl)-2-(piperidin-3-yl)-[1,2,4]triazolo[1,5-c]pyrimidin-5-amine. MS (ESI) m/z calc'd for $C_{23}H_{28}N_7O_3$ [M+H]$^+$ 450.2, found 450.2.

Compounds in Table 7 were prepared according to General Scheme 3 and Scheme U, using a slightly modified procedure that used MeOH as solvent, starting from intermediates R.4, S.4, S.3, or R.9.

TABLE 7

Intermediate Compounds Prepared According to General Scheme 3 and Scheme U

| Entry | Structure Name | Observed m/z [M + H]$^+$ |
|---|---|---|
| U.2 | -2-(4,4-difluoropyrrolidin-2-yl)-N-(2,4-dimethoxybenzyl)-7-phenyl-[1,2,4]triazolo[1,5-c]pyrimidin-5-amine | 467.3 |

TABLE 7-continued

Intermediate Compounds Prepared According to General Scheme 3 and Scheme U

| Entry | Structure Name | Observed m/z [M + H]+ |
|---|---|---|
| U.3 | 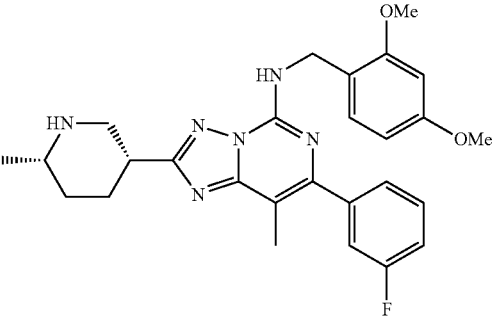 [SMILES: COc1ccc(CNc2nc(-c3cccc(F)c3)c(C)c3nc([C@@H]4CC[C@H](C)NC4)nn23)c(OC)c1]<br>And Enantiomer<br>(racemic,cis)-N-(2,4-dimethoxybenzyl)-7-(3-fluorophenyl)-8-methyl-2-(6-methylpiperidin-3-yl)-[1,2,4]triazolo[1,5-c]pyrimidin-5-amine | 491.5 |
| U.4 | 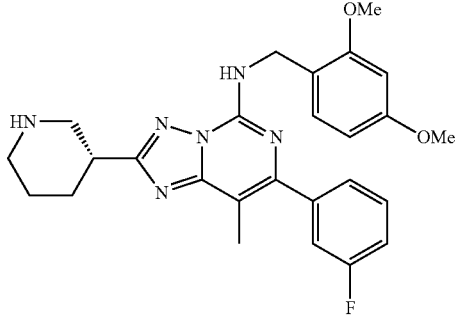 [SMILES: COc1ccc(CNc2nc(-c3cccc(F)c3)c(C)c3nc([C@@H]4CCCNC4)nn23)c(OC)c1]<br>(R)-N-(2,4-dimethoxybenzyl)-7-(3-fluorophenyl)-8-methyl-2-(piperidin-3-yl)-[1,2,4]triazolo[1,5-c]pyrimidin-5-amine | 477.2 |
| U.5 | 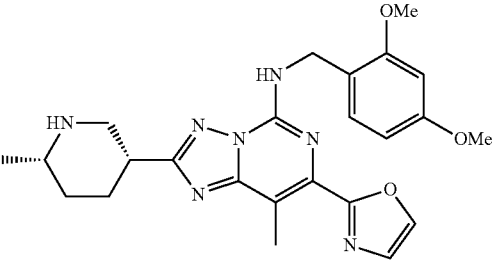 [SMILES: COc1ccc(CNc2nc(-c3ncco3)c(C)c3nc([C@@H]4CC[C@H](C)NC4)nn23)c(OC)c1]<br>And Enantiomer<br>(racemic,cis)-N-(2,4-dimethoxybenzyl)-8-methyl-2-(6-methylpiperidin-3-yl)-7-(oxazol-2-yl)-[1,2,4]-triazolo[1,5-c]pyrimidin-5-amine | 464.4 |

Preparation of Intermediate V.1, N-(2,4-dimethoxy-benzyl)-8-methyl-7-(oxazol-2-yl)-2-(pyrrolidin-3-yl)-[1,2,4]triazolo[1,5-a]pyrimidin-5-amine Scheme V

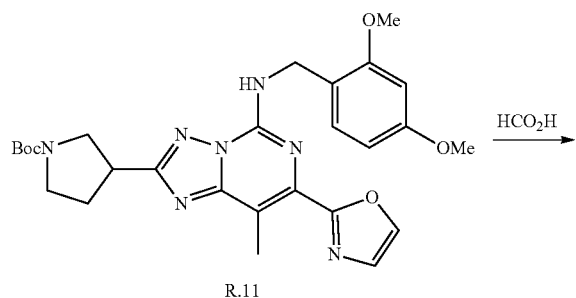

R.11

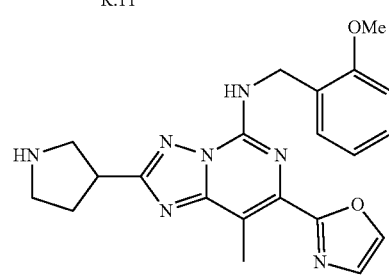

V.1 tert-Butyl 3-(5-((2,4-dimethoxybenzyl)amino)-8-methyl-7-(oxazol-2-yl)-[1,2,4]triazolo[1,5-c]pyrimidin-2-yl) pyrrolidine-1-carboxylate (300 mg, 0.560 mmol) was added to formic acid (4 mL), and the resulting mixture was cooled to 0° C. and stirred 2 h, then warmed to 25° C. and stirred for 2 h. The reaction mixture was then concentrated. Sat. aq. NaHCO$_3$ was then added until the pH was adjusted to 7-8. The mixture was extracted with DCM (3×50 mL), and the combined organic layers were dried over anhydrous Na$_2$SO$_4$, filtered, and concentrated. The resulting crude residue was purified by preparative TLC (silica gel; elution: 9% MeOH in DCM) to provide N-(2,4-dimethoxybenzyl)-8-methyl-7-(oxazol-2-yl)-2-(pyrrolidin-3-yl)-[1,2,4]triazolo[1,5-c]pyrimidin-5-amine. MS (ESI) m/z calc'd for C$_{22}$H$_{26}$N$_7$O$_3$ [M+H]$^+$ 436.2, found 436.3.

Preparation of Intermediate W.1, (R)-7-phenyl-2-(piperidin-3-yl)-[1,2,4]triazolo[1,5-c]pyrimidin-5-amine Scheme W

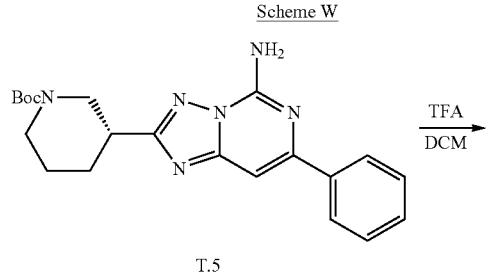

T.5

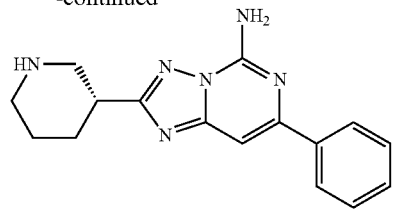

W.1

A mixture of (R)-tert-butyl 3-(5-amino-7-phenyl-[1,2,4]triazolo[1,5-c]pyrimidin-2-yl)piperidine-1-carboxylate (220 mg, 0.51 mmol) in TFA (2 mL) and DCM (10 mL) was stirred at 25° C. for 2 h. The reaction mixture was then quenched with sat. aq. NaHCO$_3$ (10 mL), and then extracted with EtOAc (3×20 mL). The combined organic layers were dried over anhydrous Na$_2$SO$_4$, filtered, and concentrated to provide (R)-8-(3,5-dichlorophenyl)-7-phenyl-2-(piperidin-3-yl)-[1,2,4]triazolo[1,5-c]pyrimidin-5-amine. MS (ESI) m/z calc'd for C$_{16}$H$_{19}$N$_6$ [M+H]$^+$ 295, found 295.

Scheme X

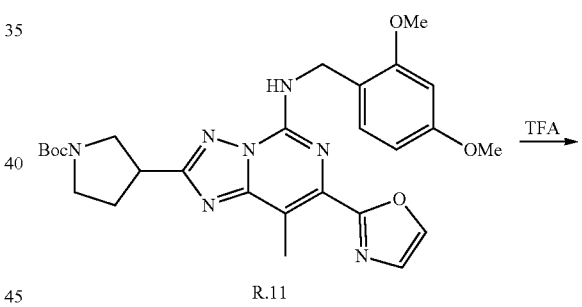

R.11

X.1

Intermediate X.1 was also synthesized similarly to the method shown in Scheme W, but starting with R.11. MS (ESI) m/z calc'd for C$_{13}$H$_{16}$N$_7$O [M]$^+$ 286.1, found 286.1.

Preparation of Intermediate Y.3, (R,E)-tert-butyl 3-(8-bromo-5-((dimethylamino)methyleneamino)-7-phenyl-[1,2,4]triazolo[1,5-c]pyrimidin-2-yl)piperidine-1-carboxylate

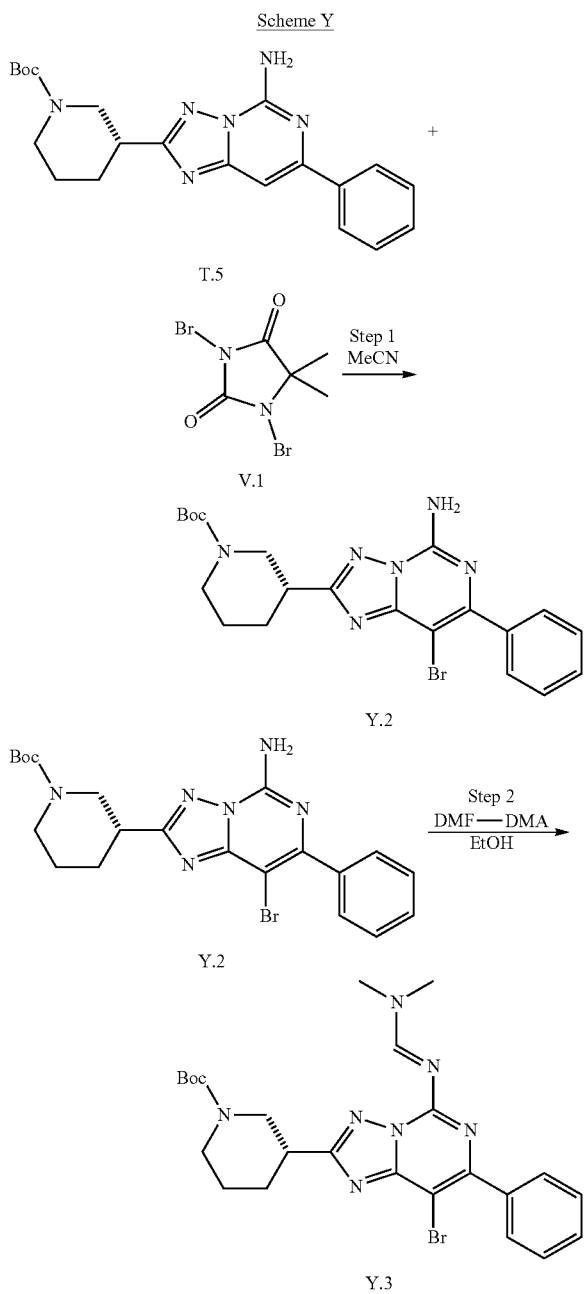

Step 1—Synthesis of Intermediate Y.2, (R)-tert-butyl 3-(5-amino-8-bromo-7-phenyl-[1,2,4]triazolo[1,5-c]pyrimidin-2-yl)piperidine-1-carboxylate A solution of (R)-tert-butyl 3-(5-amino-7-phenyl-[1,2,4]triazolo[1,5-c]pyrimidin-2-yl)piperidine-1-carboxylate (5.00 g, 12.7 mmol) in MeCN (50 mL) was cooled to 0° C. 1,3-dibromo-5,5-dimethylimidazolidine-2,4-dione (2.0 g, 7.0 mmol) was dissolved in MeCN (20 mL) and added dropwise over 10 min to the reaction mixture while maintaining the temperature at 0° C. The reaction mixture was then warmed to 25° C. and stirred for 1 h. The reaction mixture was then concentrated, and the resulting crude residue was purified by silica gel chromatography (elution: 33% EtOAc/petroleum ether) to provide (R)-tert-butyl 3-(5-amino-8-bromo-7-phenyl-[1,2,4]triazolo[1,5-c]pyrimidin-2-yl)piperidine-1-carboxylate. MS (ESI) m/z calc'd for $C_{21}H_{26}BrN_6O_2$ [M+H]$^+$ 473, found 473, 475.

Step 2—Preparation of Intermediate Y.3, (R,E)-tert-butyl 3-(8-bromo-5-((dimethylamino)methyleneamino)-7-phenyl-[1,2,4]triazolo[1,5-c]pyrimidin-2-yl)piperidine-1-carboxylate A solution of (R)-tert-butyl 3-(5-amino-8-bromo-7-phenyl-[1,2,4]triazolo[1,5-c]pyrimidin-2-yl)piperidine-1-carboxylate (4.0 g, 8.5 mmol) in EtOH (20 mL) was stirred at 25° C. DMF-DMA (2.0 g, 17.0 mmol) was added, and the resulting mixture was stirred at 25° C. overnight. The reaction mixture was then concentrated, treated with water (30 mL), and extracted with EtOAc (3×50 mL). The combined organic layers were dried over anhydrous Na$_2$SO$_4$, filtered, and concentrated to provide (R,E)-tert-butyl 3-(8-bromo-5-((dimethylamino)methyleneamino)-7-phenyl-[1,2,4]triazolo[1,5-c]pyrimidin-2-yl)piperidine-1-carboxylate, which was used in the next reaction without additional purification. MS (ESI) m/z calc'd for $C_{24}H_{31}BrN_7O_2$ [M+H]$^+$ 528, found 528, 530.

Preparation of Intermediates Z.1-1 and Z.1-2, 3-(4-((R)-3-(5-(2,4-dimethoxybenzyl)amino)-8-methyl-7-(oxazol-2-yl)-[1,2,4]triazolo[1,5-c]pyrimidin-2-yl)piperidin-1-yl)-1H-pyrazol-1-yl)-2-methylbutan-2-ol

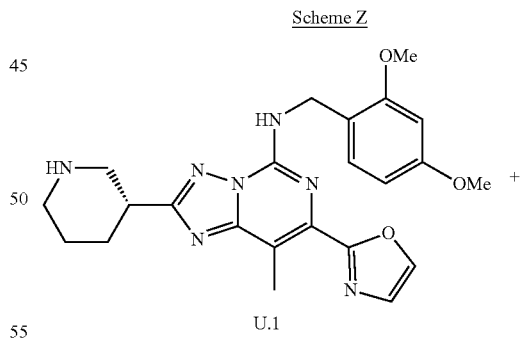

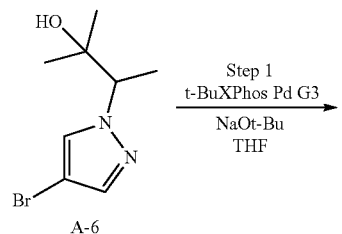

-continued

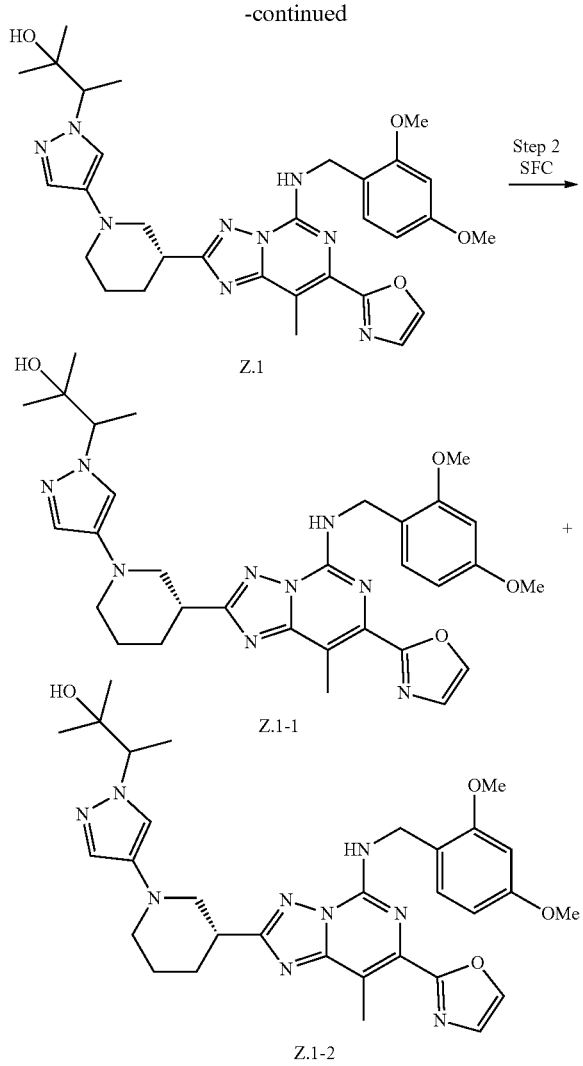

Z.1

Z.1-1

Z.1-2

Step 1—Synthesis of Intermediate Z.1, 3-(4-((R)-3-(5-((2,4-dimethoxybenzyl)amino)-8-methyl-7-(oxazol-2-yl)-[1,2,4]triazolo[1,5-c]pyrimidin-2-yl)piperidin-1-yl)-1H-pyrazol-1-yl)-2-methylbutan-2-ol A solution of (R)—N-(2,4-dimethoxybenzyl)-8-methyl-7-(oxazol-2-yl)-2-(piperidin-3-yl)-[1,2,4]triazolo[1,5-c]pyrimidin-5-amine (100 mg, 0.222 mmol) and 3-(4-bromo-1H-pyrazol-1-yl)-2-methylbutan-2-ol (130 mg, 0.556 mmol) in THF (2.2 mL) was sparged with nitrogen and treated with t-BuXPhos Pd G3 (53 mg, 0.067 mmol) and sodium tert-butoxide (64 mg, 0.667 mmol). The resulting slurry was degassed and then heated at 80° C. for 16 h. After cooling, the reaction mixture was poured into sat. aq. NH$_4$Cl (25 mL) and then extracted with EtOAc (2×25 mL). The combined organic layers were dried over anhydrous NaSO$_4$, filtered, and concentrated. The resulting crude residue was purified by silica gel chromatography (gradient elution: 0-100% [25% EtOH in EtOAc]/hexanes) to provide 3-(4-((R)-3-(5-((2,4-dimethoxybenzyl) amino)-8-methyl-7-(oxazol-2-yl)-[1,2,4]triazolo[1,5-c]pyrimidin-2-yl)piperidin-1-yl)-1H-pyrazol-1-yl)-2-methylbutan-2-ol. MS (ESI) m/z calc'd for $C_{31}H_{40}N_9O_4$ [M+H]$^+$ 602.3, found 602.4.

Step 2—Resolution of Z.1

The mixture of diastereomers of 3-(5-amino-8-methyl-7-(oxazol-2-yl)-[1,2,4]triazolo[1,5-c]pyrimidin-2-yl)-1-methylcyclohexanol were purified by CHIRAL-Prep SFC [Column: AD-H, 250×21 mm; 60% (0.2% DIPA in 1:1 MeOH/MeCN)/CO$_2$; Flow rate: 50 g/min; 210 nM; First Eluting Peak (Z.1-1); Second Eluting Peak (Z.1-2)].

Compounds in Table 8 were prepared according to General Scheme 3 and Scheme Z, starting from intermediates U.5 or U.3 and the appropriate bromopyrazole. (Either commercially available bromopyrazoles or intermediate A.3 were used as the bromopyrazole.) Enantiomers were separated by chiral SFC. (SFC conditions are provided following the table.)

TABLE 8

Intermediate Compounds Prepared According to General Scheme 3 and Scheme Z

| Entry | Structure Name | Observed m/z [M + H]$^+$ |
|---|---|---|
| Z.2-1 | 1-(4-((2S,5R)-5-(5-((2,4-dimethoxybenzyl)amino)-8-methyl-7-(oxazol-2-yl)-[1,2,4]triazolo[1,5-c]pyrimidin-2-yl)-2-methylpiperidin-1-yl)-1H-pyrazol-1-yl)-2-methylpropan-2-ol | 602.4 |

TABLE 8-continued

Intermediate Compounds Prepared According to General Scheme 3 and Scheme Z

| Entry | Structure Name | Observed m/z [M + H]+ |
|---|---|---|
| Z.2-2 | 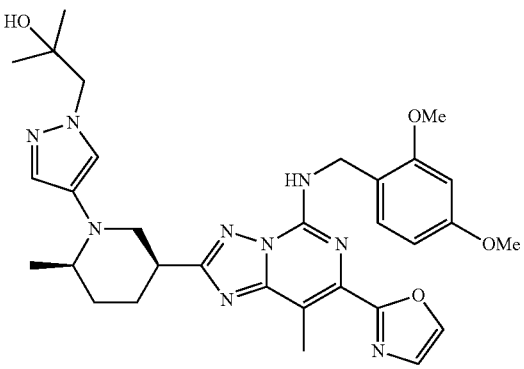 [SMILES: COc1ccc(CNc2nc(-c3ncco3)c(C)c3nc([C@H]4CC[C@@H](C)N(c5cnn(CC(C)(C)O)c5)C4)nn23)c(OC)c1]<br>1-(4-(2R,5S)-5-(5-((2,4-dimethoxybenzyl)amino)-8-methyl-7-(oxazol-2-yl)-[1,2,4]triazolo[1,5-c]pyrimidin-2-yl)-2-methylpiperidin-1-yl)-1H-pyrazol-1-yl)-2-methylpropan-2-ol | 602.4 |
| Z.3-1 | 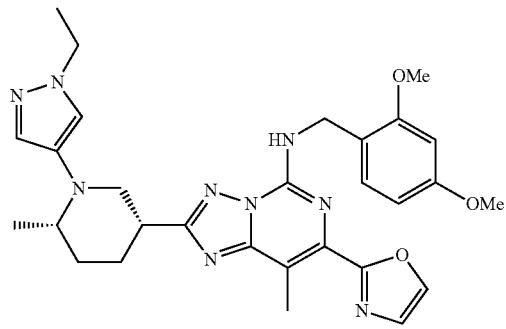 [SMILES: CCn1cc(N2C[C@H](c3nc4c(C)c(-c5ncco5)nc(NCc5ccc(OC)cc5OC)n4n3)CC[C@@H]2C)cn1]<br>N-(2,4-dimethoxybenzyl)-2-((3R,6S or 3S,6R)-1-(1-ethyl-1H-pyrazol-4-yl)-6-methylpiperidin-3-yl)-8-methyl-7-(oxazol-2-yl)-[1,2,4]triazolo[1,5-c]pyrimidin-5-amine | 558.4 |
| Z.3-2 | 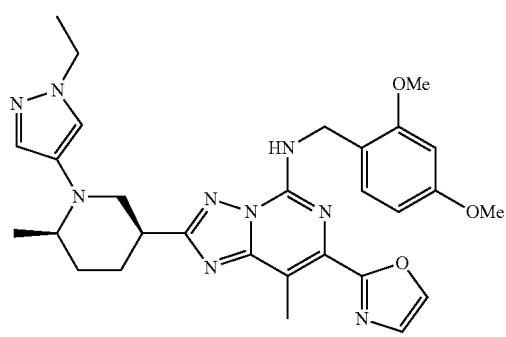 [SMILES: CCn1cc(N2C[C@@H](c3nc4c(C)c(-c5ncco5)nc(NCc5ccc(OC)cc5OC)n4n3)CC[C@H]2C)cn1]<br>N-(2,4-dimethoxybenzyl)-2-((3S,6R or 3R,6S)-1-(1-ethyl-1H-pyrazol-4-yl)-6-methylpiperidin-3-yl)-8-methyl-7-(oxazol-2-yl)-[1,2,4]triazolo[1,5-c]pyrimidin-5-amine | 558.4 |

TABLE 8-continued

Intermediate Compounds Prepared According to General Scheme 3 and Scheme Z

| Entry | Structure Name | Observed m/z [M + H]⁺ |
| --- | --- | --- |
| Z.4-1 | N-(2,4-dimethoxybenzyl)-2-((3R,6S or 3S,6R)-1-(1-ethyl-1H-pyrazol-4-yl)-6-methylpiperidin-3-yl)-7-(3-fluorophenyl)-8-methyl-[1,2,4]triazolo[1,5-c]pyrimidin-5-amine | 585.4 |
| Z.4-2 | N-(2,4-dimethoxybenzyl)-2-((3S,6R or 3R,6S)-1-(1-ethyl-1H-pyrazol-4-yl)-6-methylpiperidin-3-yl)-7-(3-fluorophenyl)-8-methyl-[1,2,4]triazolo[1,5-c]pyrimidin-5-amine | 585.4 |

Intermediates Z.2-1/Z.2-2

1-(4-((2S,5R)-5-(5-((2,4-dimethoxybenzyl) amino)-8-methyl-7-(oxazol-2-yl)-[1,2,4]triazolo[1,5-c]pyrimidin-2-yl)-2-methylpiperidin-1-yl)-1H-pyrazol-1-yl)-2-methylpropan-2-ol and its enantiomer were purified by CHIRAL-Prep SFC [[Column: OD-H, 250×4.6 mm; 35% MeOH/CO₂ Flow rate: 50 g/min; column temp: 40° C.; 210 nm; First Eluting Peak (Z.2-1); Second Eluting Peak (Z.2-2)].

Intermediates Z.3-1/Z.3-2

N-(2,4-dimethoxybenzyl)-2-((3R,6S)-1-(1-ethyl-1H-pyrazol-4-yl)-6-methylpiperidin-3-yl)-8-methyl-7-(oxazol-2-yl)-[1,2,4]triazolo[1,5-c]pyrimidin-5-amine and its enantiomer were purified by CHIRAL-Prep SFC [Column: AS-H, 250×6 mm; 35% (0.1% DIPA in i-PrOH/CO₂; Flow rate: 50 g/min; column temp: 40° C.; 210 nm; First Eluting Peak (Z.3-1); Second Eluting Peak (Z.3-2)].

Intermediates Z.4-1/Z.4-2

N-(2,4-dimethoxybenzyl)-2-((3R,6S)-1-(1-ethyl-1H-pyrazol-4-yl)-6-methylpiperidin-3-yl)-7-(3-fluorophenyl)-8-methyl-[1,2,4]triazolo[1,5-c]pyrimidin-5-amine and its enantiomer were purified by CHIRAL-Prep SFC [Column: OD-H, 250×21 mm; 20% i-PrOH/CO₂; Flow rate: 50 g/min; column temp: 40° C.; 210 nm; First Eluting Peak (Z.4-1); Second Eluting Peak (Z.4-2)].

Preparation of Intermediate AA.2,
2-(6-bromopyridin-3-yl)propan-2-ol

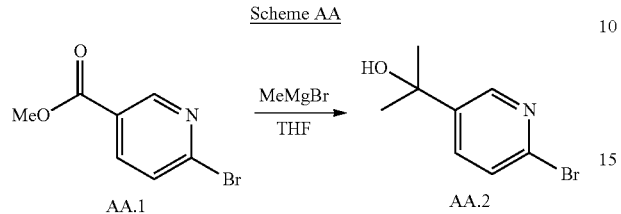

Scheme AA

A 50 mL round bottom flask was charged with methyl 6-bromonicotinate (1.50 g, 6.94 mmol). THF (15 mL) was added, and the mixture was cooled to −30° C. Methylmagnesium bromide (3 M in Et$_2$O, 5.10 mL, 15.3 mmol) was then added over 5 min, and the reaction mixture was warmed to 25° C. over 15 min and stirred at that temperature for 30 min. The reaction was quenched with sat. NH$_4$Cl (10 mL). DCM (15 mL) was added and, the biphasic mixture was stirred for 5 min. The layers were separated, and the aq. layer was extracted with DCM (2×15 mL). Then the combined organic layers were dried over anhydrous NaSO$_4$, filtered, and concentrated. The resulting crude material was purified by silica gel chromatography (gradient elution: 0-100% EtOAc/hexanes) to provide 2-(6-bromopyridin-3-yl)propan-2-ol. MS (ESI) m/z calc'd for C$_8$H$_{11}$BrNO [M+H]$^+$ 216.0, found 216.1, 218.1.

Preparation of Intermediate AB.1,
5-(2-azidopropan-2-yl)-2-bromopyridine

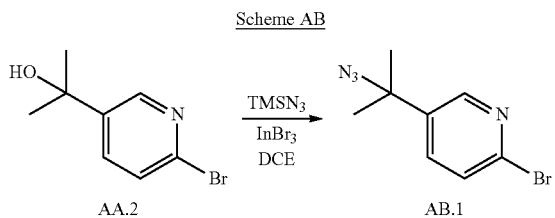

Scheme AB

A 40 mL scintillation vial was charged with 2-(6-bromopyridin-3-yl)propan-2-ol (500 mg, 2.31 mmol) and indium (III) bromide (1 g, 2.82 mmol). DCE (23 mL) was then added followed by trimethylsilyl azide (1.54 mL, 11.6 mmol). The resulting reaction mixture was stirred at 60° C. for 12 h. After cooling, the reaction was quenched with sat. aq. NaHCO$_3$ (20 mL) and, the mixture was stirred for 10 min. The layers were separated, and the aq. layer was extracted with 25% i-PrOH in CHCl$_3$ (2×10 mL). The combined organic layers were dried over anhydrous Na$_2$SO$_4$, filtered, and concentrated to provide 5-(2-azidopropan-2-yl)-2-bromopyridine, which was used directly in the subsequent reaction without further purification. MS (ESI) m/z calc'd for C$_8$H$_{10}$BrN$_4$ [M+H]$^+$ 241.0, found 241.1, 243.0.

Preparation of Intermediate AC.1, N-(2,4-dimethoxybenzyl)-2-(3-iodocyclobutyl)-8-methyl-7-(oxazol-2-yl)-[1,2,4]triazolo[1,5-c]pyrimidin-5-amine Scheme AC

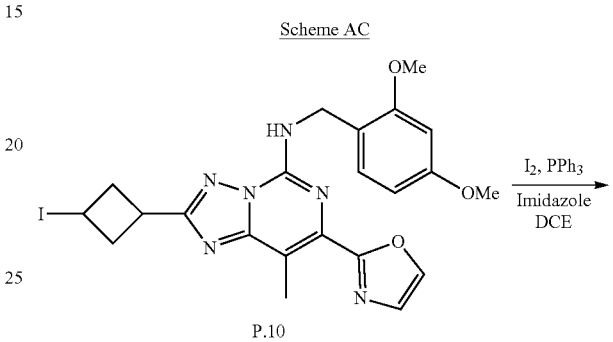

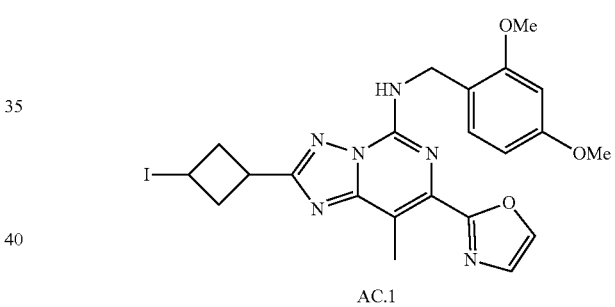

A 1 L flask was charged with 3-(5-((2,4-dimethoxybenzyl)amino)-7-methoxy-[1,2,4]triazolo[1,5-c]quinazolin-2-yl)cyclobutan-1-ol (12 g, 27.6 mmol), triphenylphosphine (14.5 g, 55.1 mmol), imidazole (3.75 g, 55.1 mmol) and DCE (410 mL). Iodine (14.0 g, 55.1 mmol) was then added, and the resulting suspension was stirred at 65° C. overnight. After cooling, the reaction was quenched with sat. aq. sodium thiosulfate (200 mL) and stirred for 20 min. Water (200 mL) was then added and the layers were separated. The aq. layer was extracted with DCM (2×150 mL), then the combined organic layers were dried over anhydrous NaSO$_4$, filtered, and concentrated. The crude solid material was taken up in refluxing acetone (300 mL), and the resulting suspension was placed in the refrigerator overnight. The mixture was then filtered, and the solid residue was rinsed with acetone (50 mL). The precipitate was then dried to provide N-(2,4-dimethoxybenzyl)-2-(3-iodocyclobutyl)-8-methyl-7-(oxazol-2-yl)-[1,2,4]triazolo[1,5-c]pyrimidin-5-amine. MS (ESI) m/z calc'd for C$_{22}$H$_{24}$IN$_6$O$_3$ [M+H]$^+$ 547.1, found 547.2.

Preparation of Intermediate AD.1, 2-((1,3-trans)-3-(5-(2-azidopropan-2-yl)pyridin-2-yl)cyclobutyl)-N-(2,4-dimethoxybenzyl)-8-methyl-7-(oxazol-2-yl)-[1,2,4]triazolo[1,5-c]pyrimidin-5-amine and Intermediate AD.2, 2-((1,3-cis)-3-(5-(2-azidopropan-2-yl)pyridin-2-yl)cyclobutyl)-N-(2,4-dimethoxybenzyl)-8-methyl-7-(oxazol-2-yl)-[1,2,4]triazolo[1,5-c]pyrimidin-5-amine Scheme AD

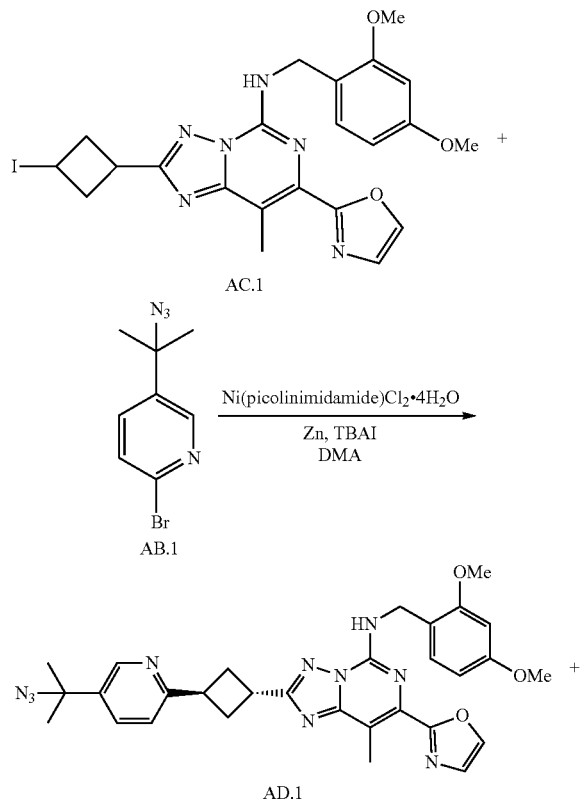

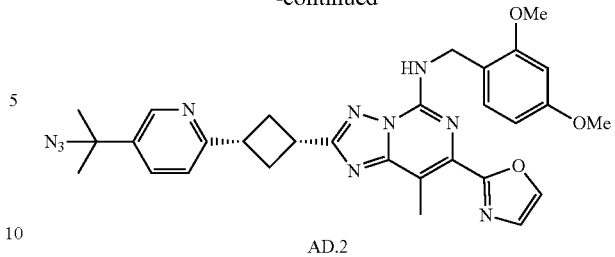

AD.2

A 20 mL scintillation vial was charged with Ni(picolinimidamide)Cl$_2$·4H$_2$O (73 mg, 0.29 mmol), 5-(2-azidopropan-2-yl)-2-bromopyridine (353 mg, 1.46 mmol), N-(2,4-dimethoxybenzyl)-2-(3-iodocyclobutyl)-8-methyl-7-(oxazol-2-yl)-[1,2,4]triazolo[1,5-c]pyrimidin-5-amine (400 mg, 0.73 mmol), tetrabutylammonium iodide (68 mg, 0.18 mmol), and zinc (191 mg, 2.93 mmol). The vial was evacuated and backfilled with nitrogen (3×). DMA (6.1 mL) was then added, and the resulting reaction mixture was stirred at 50° C. for 7 h. After completion, the DMA was removed under vacuum. The crude material was redissolved in DCM (20 mL), and the resulting mixture was filtered through Celite™ (diatomaceous earth), rinsing with DCM (2×10 mL). The filtrate was then concentrated, and the resulting crude residue was purified by silica gel chromatography (gradient elution: 0-40% EtOAc/Hexanes). This provided 2-((1,3-trans)-3-(5-(2-azidopropan-2-yl)pyridin-2-yl)cyclobutyl)-N-(2,4-dimethoxybenzyl)-8-methyl-7-(oxazol-2-yl)-[1,2,4]triazolo[1,5-c]pyrimidin-5-amine (AD.1) as the first eluting peak. MS (ESI) m/z calc'd for C$_{30}$H$_{33}$N$_{10}$O$_3$ [M+H]$^+$ 581.3, found 581.3. It also provided 2-((1,3-cis)-3-(5-(2-azidopropan-2-yl)pyridin-2-yl)-cyclobutyl)-N-(2,4-dimethoxybenzyl)-8-methyl-7-(oxazol-2-yl)-[1,2,4]triazolo[1,5-c]pyrimidin-5-amine (AD.2) as the second eluting peak. MS (ESI) m/z calc'd for C$_{30}$H$_{33}$N$_{10}$O$_3$ [M+H]$^+$ 581.3, found 581.3.

Compounds in Table 9 were prepared according to Scheme AD, starting from intermediates AC.1 and AA.2. AD.3 and AD.4 were separated from each other by chiral SFC instead of silica gel chromatography. (SFC conditions are provided following the table.)

TABLE 9

Intermediate Compounds Prepared According to Scheme AD

| Entry | Structure Name | Observed m/z [M + H]$^+$ |
|---|---|---|
| AD.3 | ![structure] 2-(6-((1,3-cis)-3-(5-((2,4-dimethoxybenzyl)amino)-8-methyl-7-(oxazol-2-yl)-[1,2,4]triazolo[1,5-c]pyrimidin-2-yl)cyclobutyl)pyridin-3-yl)propan-2-ol | 556.3 |

TABLE 9-continued

Intermediate Compounds Prepared According to Scheme AD

| Entry | Structure Name | Observed m/z [M + H]+ |
|---|---|---|
| AD.4 | 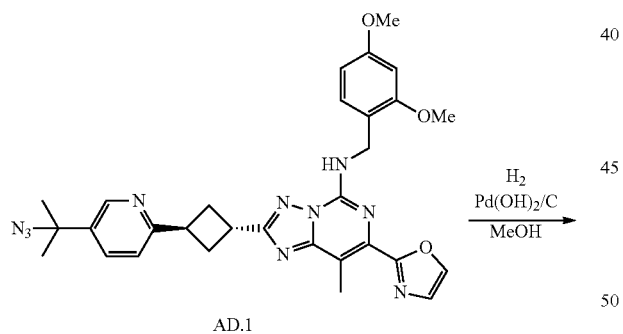<br>2-(6-((1,3-trans)-3-(5-((2,4-dimethoxybenzyl)amino)-8-methyl-7-(oxazol-2-yl)-[1,2,4]triazolo[1,5-c]pyrimidin-2-yl)cyclobutyl)pyridin-3-yl)propan-2-ol | 556.3 |

Intermediates AD.3/AD.4

2-(6-(3-(5-((2,4-dimethoxybenzyl)amino)-8-methyl-7-(oxazol-2-yl)-[1,2,4]triazolo[1,5-c]pyrimidin-2-yl)-cyclobutyl)pyridin-3-yl)propan-2-ol (mixture of cis and trans) was purified by CHIRAL-Prep SFC [Column: OJ-H, 21×250 mm; 35% (0.1% NH$_4$OH in 1:1 MeOH/MeCN)/CO$_2$ Flow rate: 70 mL/min; 220 nm; First Eluting Peak (AD.3); Second Eluting Peak (AD.4)].

Preparation of Intermediate AE.1, 2-((1,3-trans)-3-(5-(2-aminopropan-2-yl)pyridin-2-yl)cyclobutyl)-N-(2,4-dimethoxybenzyl)-8-methyl-7-(oxazol-2-yl)-[1,2,4]triazolo[1,5-c]pyrimidin-5-amine A 10 mL round bottom flask was charged with 2-((1,3-trans)-3-(5-(2-azidopropan-2-yl)pyridin-2-yl)-cyclobutyl)-N-(2,4-dimethoxybenzyl)-8-methyl-7-(oxazol-2-yl)-[1,2,4]triazolo[1,5-c]pyrimidin-5-amine (AD.1, 80 mg, 0.138 mmol). MeOH (1.4 mL) was then added, followed by 20% Pd(OH)$_2$/C (9.7 mg, 0.01 mmol). The resulting mixture was quickly evacuated and backfilled with argon, then evacuated and backfilled with hydrogen (3×). The reaction was stirred at 25° C. under an atmosphere of hydrogen (15 psi) for 4 h. The mixture was then diluted with DCM (10 mL), filtered through Celite™ (diatomaceous earth) and concentrated. The resulting crude residue was purified by silica gel chromatography (gradient elution: 0-10% MeOH/DCM) to provide 2-((1,3-trans)-3-(5-(2-aminopropan-2-yl)pyridin-2-yl)-cyclobutyl)-N-(2,4-dimethoxybenzyl)-8-methyl-7-(oxazol-2-yl)-[1,2,4]triazolo[1,5-c]pyrimidin-5-amine. MS (ESI) m/z calc'd for C$_{30}$H$_{34}$N$_8$O$_3$ [M+H]+ 555.3, found 555.3.

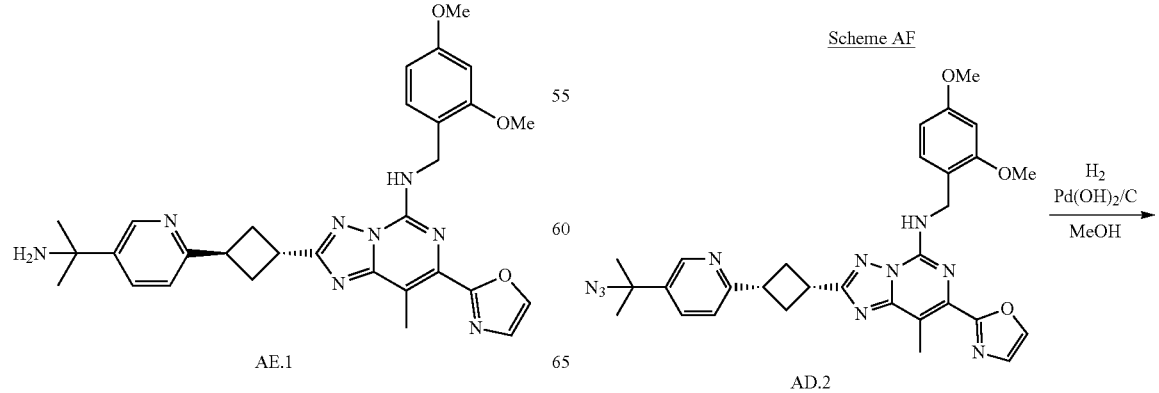

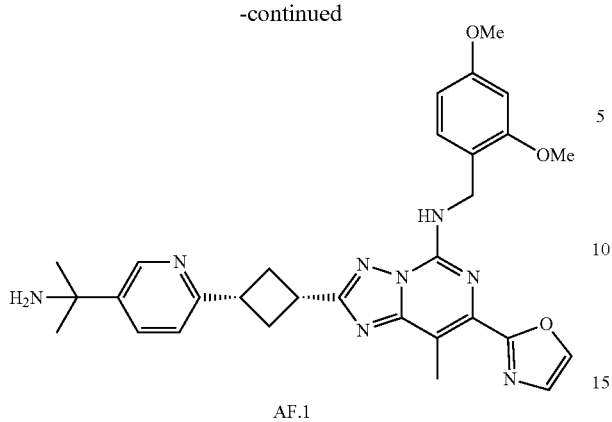

AF.1

Intermediate AF.1 was synthesized according to the method shown in Scheme AE, but starting with AD.2. MS (ESI) m/z calc'd for $C_{30}H_{34}N_8O_3$ [M+H]$^+$ 555.3, found 555.3.

Preparation of Example 1.2, 2-((1S,2S and 1R,2R)-2-(8-bromo-6-(3-fluorophenyl)-5-methyl-[1,2,4]triazolo[1,5-a]pyrazin-2-yl)cyclopropyl)propan-2-ol

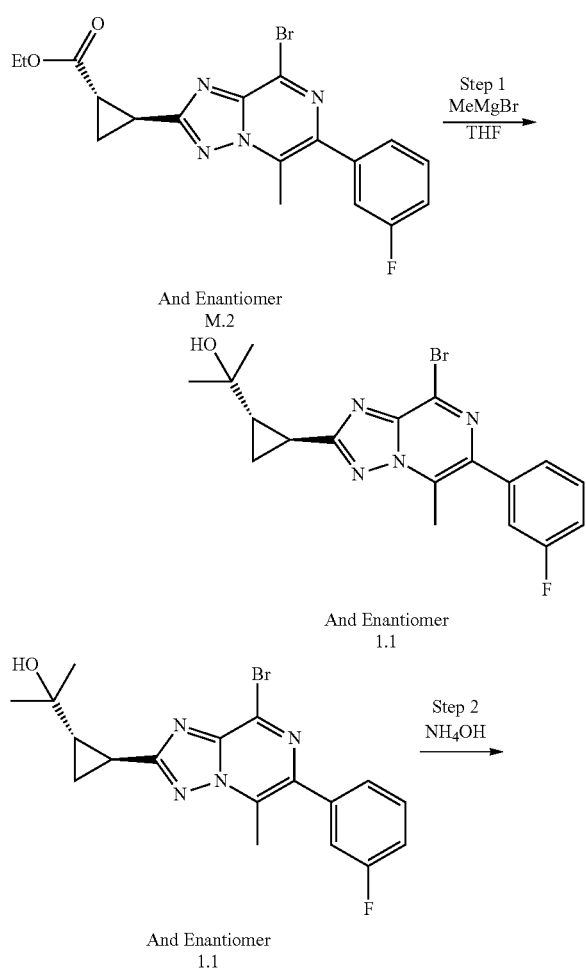

Scheme 1

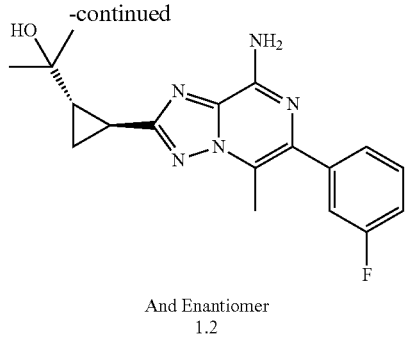

And Enantiomer
1.2

Step 1—Synthesis of Intermediate 1.1, 2-((1S,2S and 1R,2R)-2-(8-bromo-6-(3-fluorophenyl)-5-methyl-[1,2,4]triazolo[1,5-a]pyrazin-2-yl)cyclopropyl)propan-2-ol A 20 mL scintillation vial was charged with Intermediate M.2 (22 mg, 0.052 mmol) and THF (525 μL). The resulting mixture was cooled to −30° C., then methylmagnesium bromide (3 M in Et$_2$O, 44 μL, 0.131 mmol) was added dropwise over 5 min. The reaction mixture was warmed to 25° C. over 15 min and stirred an additional 30 min. The reaction was then quenched with sat. aq. NH$_4$Cl (1 mL). DCM (1 mL) was added and the biphasic mixture was stirred for 5 min. The mixture was then diluted with water (2 mL) and extracted with DCM (3×4 mL). The combined organic layers were dried over anhydrous NaSO$_4$, filtered, and concentrated to provide 2-((1S,2S and 1R,2R)-2-(8-bromo-6-(3-fluorophenyl)-5-methyl-[1,2,4]triazolo[1,5-a]pyrazin-2-yl)cyclopropyl)propan-2-ol, which was used directly in the next reaction without additional purification. MS (ESI) m/z calc'd for $C_{18}H_{19}BrFN_4O$ [M+H]$^+$ 405.1, found 405.0, 407.0.

Step 2—Preparation of Example 1.2, 2-((1S,2S and 1R,2R)-2-(8-bromo-6-(3-fluorophenyl)-5-methyl-[1,2,4]triazolo[1,5-a]pyrazin-2-yl)cyclopropyl)propan-2-ol A 2 mL Biotage® microwave vial was charged with 2-((1S,2S and 1R,2R)-2-(8-bromo-6-(3-fluorophenyl)-5-methyl[1,2,4]triazolo[1,5-a]pyrazin-2-yl)cyclopropyl)propan-2-ol (20 mg, 0.049 mmol). i-PrOH (150 μL) was added, followed by ammonium hydroxide (250 μL, 1.80 mmol), and the reaction was sealed and stirred at 120° C. overnight. After cooling, DCM (2 mL) and water (2 mL) were added, and the mixture was extracted with DCM (3×5 mL). The combined organic layers were dried over anhydrous NaSO$_4$, filtered, and concentrated. The resulting crude material was taken up in DMSO (2 mL), filtered and purified by reversed-phase HPLC [Method B] to provide 2-41 S,2S and 1R,2R)-2-(8-bromo-6-(3-fluorophenyl)-5-methyl-[1,2,4]triazolo[1,5-a]pyrazin-2-yl)cyclopropyl)propan-2-ol (Example 1.2) as a racemic mixture. MS (ESI) m/z calc'd for $C_{18}H_{21}FN_5O$ [M+H]$^+$ 342.2, found 342.1. $^1$H NMR (600 MHz, MeOD-d$_4$) δ 7.56 (td, J=8.0, 5.9 Hz, 1H), 7.39 (d, J=7.8 Hz, 1H), 7.36 (dt, J=9.6, 2.0 Hz, 1H), 7.26 (td, J=8.4, 1.9 Hz, 1H), 2.57 (s, 3H), 2.35 (ddd, J=9.0, 4.9, 4.9 Hz, 1H), 1.71 (ddd, J=9.1, 6.4, 4.7 Hz, 1H), 1.30 (s, 3H), 1.30 (s, 3H), 1.30-1.26 (m, 1H), 1.22 (ddd, J=9.2, 4.6, 4.6 Hz, 1H). A2a IC$_{50}$ 23.3 nM (A), A2b IC$_{50}$ 202.3 nM.

Preparation of Example 2.1, (S)-2-(4,4-difluoropyrrolidin-2-yl)-7-phenyl-[1,2,4]triazolo[1,5-c]pyrimidin-5-amine, TFA Salt

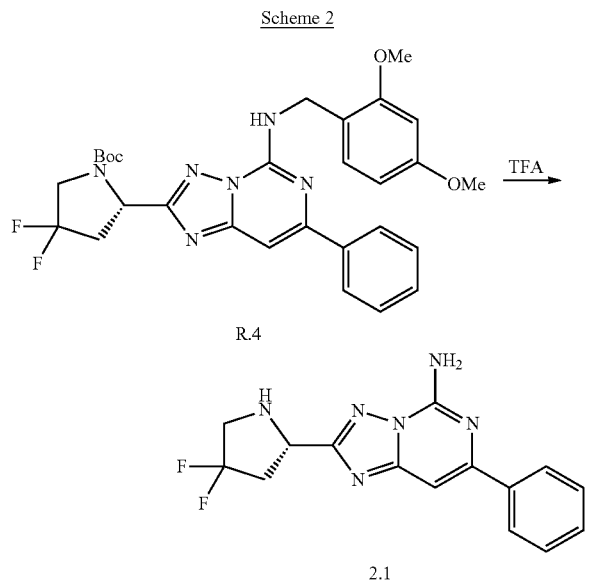

A mixture of tert-butyl (S)-2-(5-((2,4-dimethoxybenzyl)amino)-7-phenyl-[1,2,4]triazolo[1,5-c]pyrimidin-2-yl)-4,4-difluoropyrrolidine-1-carboxylate (65 mg, 0.117 mmol) and TFA (1 mL) was heated at 60° C. for 1 h. Upon completion, the reaction was concentrated. The resulting crude residue was taken up in DMSO (3 mL), filtered, and purified by reversed-phase HPLC [Method A] to provide (S)-2-(4,4-difluoropyrrolidin-2-yl)-7-phenyl-[1,2,4]triazolo[1,5-c]pyrimidin-5-amine, TFA salt (Example 2.1). MS (ESI) m/z calc'd for $C_{15}H_{15}F_2N_6$ [M+H]$^+$ 317.1, found 317.0. $^1$H NMR (500 MHz, MeOD-d$_4$) δ 8.12-8.13 (m, 2H), 7.46-7.50 (m, 4H), 5.42 (t, J=8.5 Hz, 1H), 3.95-4.91 (m, 2H), 3.11-3.25 (m, 2H). A2a IC$_{50}$ 12.0 nM (A).

Table 10 sets forth example compounds of the invention which were prepared according to Scheme 2 and General Scheme 1 above, using intermediates R.5, R.2, S.3, R.6, S.2, R.10, R.12, R.9, Z.1-1, Z.1-2, Z.2-1, Z.2-2, Z.3-1, Z.3-2, Z.4-1, Z.4-2, AD.3, AD.4, AE.1, or AF.1. The compounds were generally purified by silica gel chromatography, reversed phase prep-HPLC, and SFC. SFC conditions used are set forth after the table. An asterisk (*) indicates that the indicated data is not available. For Examples 2.5-1, 2.5-2, and 2.6 the absolute stereochemistry was inferred based on the relative potency of the enantiomers and comparison to an analog of known absolute stereochemistry. For Examples 2.12 through 2.17 the absolute stereochemistry was inferred based on the relative potency of the enantiomers and absolute stereochemical determination of an analogous molecule via vibrational circular dichroism.

TABLE 10

| Example | Structure Name | Observed m/z [M + H]$^+$ | A2a IC50 (nM) A2b IC50 (nM) |
|---|---|---|---|
| 2.2 | (S)-2-(4,4-difluoropyrrolidin-2-yl)-7-(oxazol-2-yl)-[1,2,4]triazolo[1,5-c]pyrimidin-5-amine | 308.0 | 142.7 (A) * |
| 2.3 | (R)-8-methyl-7-(oxazol-2-yl)-2-(piperidin-3-yl)-[1,2,4]triazolo[1,5-c]pyrimidin-5-amine | 300.2 | 20.5 (A) 1035 |
| 2.4 | (R)-7-(3-fluorophenyl)-8-methyl-2-(piperidin-3-yl)-[1,2,4]triazolo[1,5-c]pyrimidin-5-amine | 327.2 | 57.7 (A) 872.6 |

TABLE 10-continued

| Example | Structure Name | Observed m/z [M + H]+ | A2a IC50 (nM) A2b IC50 (nM) |
|---|---|---|---|
| 2.5-1 | (R)-5-methyl-2-(1-(1-methyl-1H-pyrazol-4-yl)piperidin-3-yl)-6-(oxazol-2-yl)-[1,2,4]triazolo[1,5-a]pyrazin-8-amine | 380.2 | 14.8 (A) 769.9 |
| 2.5-2 | (S)-5-methyl-2-(1-(1-methyl-1H-pyrazol-4-yl)piperidin-3-yl)-6-(oxazol-2-yl)-[1,2,4]triazolo[1,5-a]pyrazin-8-amine | 380.2 | 37.3 (A) 7395 |
| 2.6 | (R)-6-(2,5-difluorophenyl)-5-methyl-2-(1-(1-methyl-1H-pyrazol-4-yl)piperidin-3-yl)-[1,2,4]triazolo[1,5-a]pyrazin-8-amine | 425.1 | 217.6 (A) 435.6 |
| 2.7 | 2-(1-(3-fluoropyridin-2-yl)cyclopropyl)-5-methyl-6-(oxazol-2-yl)-[1,2,4]triazolo[1,5-a]pyrazin-8-amine | 352.1 | 56.4 (A) 2912 |

TABLE 10-continued

| Example | Structure Name | Observed m/z [M + H]⁺ | A2a IC50 (nM) A2b IC50 (nM) |
|---|---|---|---|
| 2.8 | 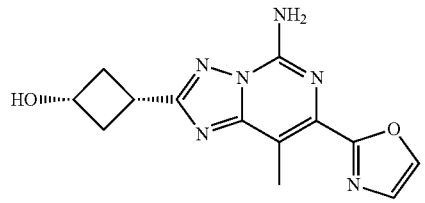 [SMILES: Cc1c(-c2ncco2)nc(N)n2nc([C@H]3C[C@@H](O)C3)nc12]<br>(1s,3s)-3-(5-amino-8-methyl-7-(oxazol-2-yl)-[1,2,4]triazolo[1,5-c]pyrimidin-2-yl)cyclobutan-1-ol | 287.1 | 72.9 (A)<br>250.2 |
| 2.9 | 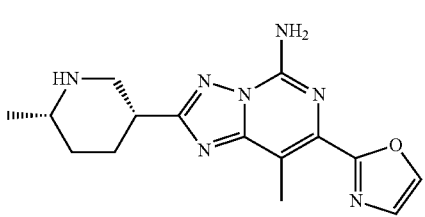 [SMILES: Cc1c(-c2ncco2)nc(N)n2nc([C@@H]3CC[C@H](C)NC3)nc12]<br>8-methyl-2-((3R,6S)-6-methylpiperidin-3-yl)-7-(oxazol-2-yl)-[1,2,4]triazolo[1,5-c]pyrimidin-5-amine | 314.3 | 129.2 (A)<br>2406 |
| 2.10 | 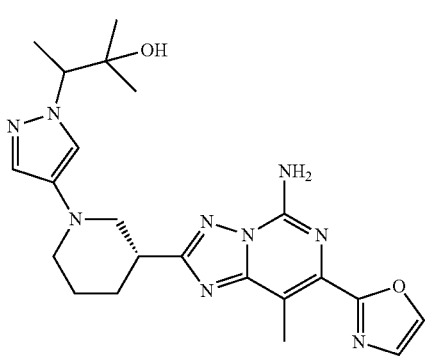 [SMILES: Cc1c(-c2ncco2)nc(N)n2nc([C@@H]3CCCN(c4cnn(C(C)C(C)(C)O)c4)C3)nc12]<br>(R or S)-3-(4-((R)-3-(5-amino-8-methyl-7-(oxazol-2-yl)-[1,2,4]triazolo[1,5-c]pyrimidin-2-yl)piperidin-1-yl)-1H-pyrazol-1-yl)-2-methylbutan-2-ol | 452.3 | 1.2 (A)<br>260.6 |
| 2.11 | 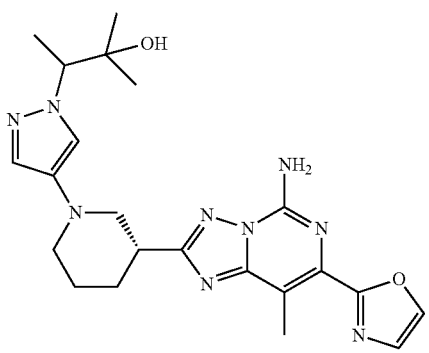 [SMILES: Cc1c(-c2ncco2)nc(N)n2nc([C@@H]3CCCN(c4cnn(C(C)C(C)(C)O)c4)C3)nc12]<br>(S or R)-3-(4-((R)-3-(5-amino-8-methyl-7-(oxazol-2-yl)-[1,2,4]triazolo[1,5-c]pyrimidin-2-yl)piperidin-1-yl)-1H-pyrazol-1-yl)-2-methylbutan-2-ol | 452.5 | 3.2 (A)<br>81.6 |

TABLE 10-continued

| Example | Structure Name | Observed m/z [M + H]+ | A2a IC50 (nM) A2b IC50 (nM) |
|---|---|---|---|
| 2.12 | 1-(4-((2S,5R)-5-(5-amino-8-methyl-7-(oxazol-2-yl)-[1,2,4]triazolo[1,5-c]pyrimidin-2-yl)-2-methylpiperidin-1-yl)-1H-pyrazol-1-yl)-2-methylpropan-2-ol | 452.4 | 1.0 (A) 19.8 |
| 2.13 | 1-(4-((2R,5S)-5-(5-amino-8-methyl-7-(oxazol-2-yl)-[1,2,4]triazolo[1,5-c]pyrimidin-2-yl)-2-methylpiperidin-1-yl)-1H-pyrazol-1-yl)-2-methylpropan-2-ol | 452.4 | 47.9 (A) 1309 |
| 2.14 | 2-((3R,6S)-1-(1-ethyl-1H-pyrazol-4-yl)-6-methylpiperidin-3-yl)-8-methyl-7-(oxazol-2-yl)-[1,2,4]triazolo[1,5-c]pyrimidin-5-amine | 408.3 | 1.2 (A) 17.6 |

TABLE 10-continued

| Example | Structure Name | Observed m/z [M + H]+ | A2a IC50 (nM) A2b IC50 (nM) |
|---|---|---|---|
| 2.15 | 2-((3S,6R)-1-(1-ethyl-1H-pyrazol-4-yl)-6-methylpiperidin-3-yl)-8-methyl-7-(oxazol-2-yl)-[1,2,4]triazolo[1,5-c]pyrimidin-5-amine | 408.3 | 20.0 (A) 2396 |
| 2.16 | 2-((3R,6S)-1-(1-ethyl-1H-pyrazol-4-yl)-6-methylpiperidin-3-yl)-7-(3-fluorophenyl)-8-methyl-[1,2,4]triazolo[1,5-c]pyrimidin-5-amine | 435.3 | 8.8 (A) 82.6 |
| 2.17 | 2-((3S,6R)-1-(1-ethyl-1H-pyrazol-4-yl)-6-methylpiperidin-3-yl)-7-(3-fluorophenyl)-8-methyl-[1,2,4]triazolo[1,5-c]pyrimidin-5-amine | 435.3 | 47.6 (A) 2147 |
| 2.18 | 2-(6-((1,3-cis)-3-(5-amino-8-methyl-7-(oxazol-2-yl)-[1,2,4]triazolo[1,5-c]pyrimidin-2-yl)cyclobutyl)pyridin-3-yl)propan-2-ol | 406.2 | 3.7 (A) * |

TABLE 10-continued

| Example | Structure Name | Observed m/z [M + H]+ | A2a IC50 (nM) A2b IC50 (nM) |
|---|---|---|---|
| 2.19 | 2-(6-((1,3-trans)-3-(5-amino-8-methyl-7-(oxazol-2-yl)-[1,2,4]triazolo[1,5-c]pyrimidin-2-yl)cyclobutyl)pyridin-3-yl)propan-2-ol | 406.2 | 5.2 (A) * |
| 2.20 | 2-((1,3-trans)-3-(5-(2-aminopropan-2-yl)pyridin-2-yl)cyclobutyl)-8-methyl-7-(oxazol-2-yl)[1,2,4]triazolo[1,5-c]pyrimidin-5-amine | 405.1 | 9.9 (A) * |
| 2.21 | 2-((1,3-cis)-3-(5-(2-aminopropan-2-yl)pyridin-2-yl)cyclobutyl)-8-methyl-7-(oxazol-2-yl)-[1,2,4]triazolo[1,5-c]pyrimidin-5-amine | 405.3 | 26.3 (A) * |

Example 2.5-1/2.5-2

5-methyl-2-(1-(1-methyl-1H-pyrazol-4-yl)piperidin-3-yl)-6-(oxazol-2-yl)-[1,2,4]triazolo[1,5-a]pyrazin-8-amine was purified by CHIRAL-Prep SFC [Column: CC4, 21×250 mm; 40% (0.1% NH₄OH in MeOH)/CO₂; Flow rate: 70 mL/min; 220 nm; First Eluting Peak (Example 2.5-1); Second Eluting Peak (Example 2.5-2)].

Example 2.6

Racemic 6-(2,5-difluorophenyl)-5-methyl-2-(1-(1-methyl-1H-pyrazol-4-yl)piperidin-3-yl)-[1,2,4]triazolo[1,5-a]pyrazin-8-amine was purified by CHIRAL-Prep SFC [Column: CC4, 21×250 mm; 25% (0.1% NH₄OH in MeOH)/CO₂; Flow rate: 70 mL/min; 220 nm; First Eluting Peak (Example 2.6); Second Eluting Peak (Enantiomer of Example 2.6)].

Preparation of Example 3.3, (R)-2-(1-(1-ethyl-1H-pyrazol-4-yl)piperidin-3-yl)-8-methyl-7-(oxazol-2-yl)-[1,2,4]triazolo[1,5-c]pyrimidin-5-amine Scheme 3

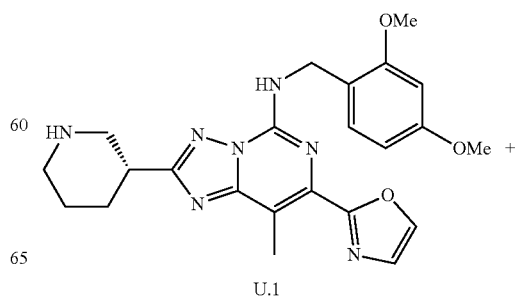

U.1 +

-continued

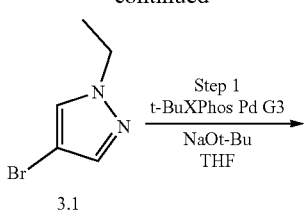
3.1

Step 1
t-BuXPhos Pd G3
NaOt-Bu
THF

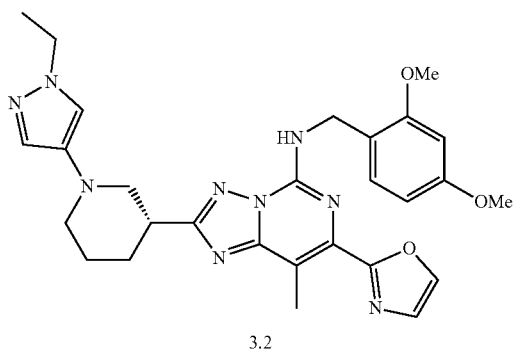
3.2

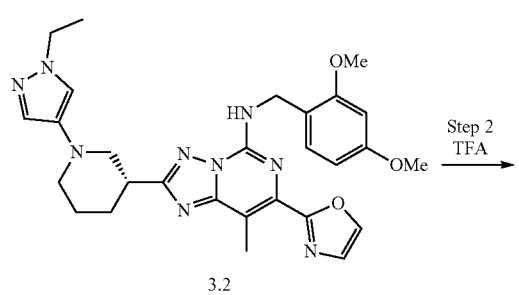
3.2

Step 2
TFA

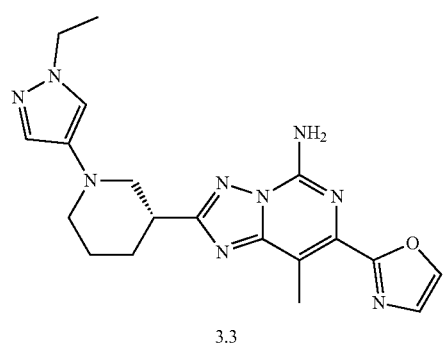
3.3

Step 1—Synthesis of Intermediate 3.2, (R)—N-(2,4-dimethoxybenzyl)-2-(1-(1-ethyl-1H pyrazol-4-yl)piperidin-3-yl)-8-methyl-7-(oxazol-2-yl)-[1,2,4]triazolo[1,5-c]pyrimidin-5-amine A solution of (R)—N-(2,4-dimethoxybenzyl)-8-methyl-7-(oxazol-2-yl)-2-(piperidin-3-yl)-[1,2,4]triazolo[1,5-c]pyrimidin-5-amine (85 mg, 0.189 mmol), 4-bromo-1-ethyl-1H-pyrazole (83 mg, 0.473 mmol) and sodium tert-butoxide (55 mg, 0.567 mmol) in THF (2 mL) was treated with t-BuXPhos Pd G3 (45 mg, 0.057 mmol). The resulting slurry was degassed and then heated at 90° C. for 16 h. After cooling, the reaction mixture was poured into sat. aq. NH₄Cl (25 mL) and then extracted with EtOAc (2×25 mL). The combined organic layers were dried over anhydrous NaSO₄, filtered, and concentrated. The resulting crude residue was purified by silica gel chromatography (gradient elution: 0-100% EtOAc/hexanes) to provide (R)—N-(2,4-dimethoxybenzyl)-2-(1-(1-ethyl-1H pyrazol-4-yl)piperidin-3-yl)-8-methyl-7-(oxazol-2-yl)-[1,2,4]triazolo[1,5-c]pyrimidin-5-amine. MS (ESI) m/z calc'd for $C_{28}H_{34}N_9O_3$ $[M+H]^+$ 544.3, found 544.3.

Step 2—Preparation of Example 3.3, (R)-2-(1-(1-ethyl-1H-pyrazol-4-yl)piperidin-3-yl)-8-methyl-7-(oxazol-2-yl)-[1,2,4]triazolo[1,5-c]pyrimidin-5-amine (R)—N-(2,4-dimethoxybenzyl)-2-(1-(1-ethyl-1H-pyrazol-4-yl)piperidin-3-yl)-8-methyl-7-(oxazol-2-yl)-[1,2,4]triazolo[1,5-c]pyrimidin-5-amine (100 mg, 0.184 mmol) was dissolved in TFA (1 mL). The mixture was heated to 50° C. and stirred for 1 h. After cooling, the reaction mixture was concentrated and the resulting crude residue was purified by reversed-phase HPLC [Method A]. The product fractions were treated with sat. aq. NaHCO₃ (25 mL), extracted with EtOAc (2×25 mL), and then concentrated. This provided (R)-2-(1-(1-ethyl-1H-pyrazol-4-yl)piperidin-3-yl)-8-methyl-7-(oxazol-2-yl)-[1,2,4]triazolo[1,5-c]pyrimidin-5-amine (Example 3.3). MS (ESI) m/z calc'd for $C_{19}H_{24}N_9O$ $[M+H]^+$ 394.2, found 394.2. ¹H NMR (500 MHz, CDCl₃) δ 7.82 (s, 1H), 7.38 (s, 1H), 7.28 (s, 1H), 7.01 (s, 1H), 6.19 (br, 2H), 4.10 (q, 2H), 3.70 (d, 1H), 3.19 (m, 2H), 2.99 (t, 1H), 2.88 (s, 3H), 2.70 (m, 1H), 2.15 (d, 1H), 2.95-2.79 (m, 3H), 1.41 (t, 3H), 1.27 (m, 1H). A2a IC₅₀ 0.9 nM (A), A2b IC₅₀ 155.4 nM.

Table 11 sets forth example compounds of the invention which were prepared according to Scheme 3 and General Scheme 3 above, using cyclic amine intermediates U.1, U.4, or V.1, and an appropriate bromoheteroaryl as the coupling partner. (Intermediates C.2, A.3, B.4, A.4, A.5, or A.6 were used as the coupling partner or the appropriate coupling partner was commercially sourced.) The compounds were generally purified by silica gel chromatography, reverse phase prep-HPLC and SFC. Where isomers were separated by SFC conditions are provided, following the table.

TABLE 11

| Example | Structure Name | Observed m/z [M + H]⁺ | A2a IC50 (nM) A2b IC50 (nM) |
|---------|----------------|------------------------|------------------------------|
| 3.4 | (R)-2-(4-(3-(5-amino-8-methyl-7-(oxazol-2-yl)-[1,2,4]triazolo[1,5-c]pyrimidin-2-yl)piperidin-1-yl)-1H-pyrazol-1-yl)-N,2-dimethylpropanamide | 465.0 | 5.4 (A) 85.5 |
| 3.5 | (R)-8-methyl-7-(oxazol-2-yl)-2-(1-(1-(2,2,2-trifluoroethyl)-1H-pyrazol-4-yl)piperidin-3-yl)-[1,2,4]triazolo[1,5-c]pyrimidin-5-amine | 448.2 | 1.3 (A) 34.4 |
| 3.6 | (R)-8-methyl-7-(oxazol-2-yl)-2-(1-(1-(tetrahydro-2H-pyran-4-yl)-1H-pyrazol-4-yl)piperidin-3-yl)-[1,2,4]triazolo[1,5-c]pyrimidin-5-amine | 450.2 | 0.9 (A) 388.8 |

TABLE 11-continued

| Example | Structure Name | Observed m/z [M + H]+ | A2a IC50 (nM) A2b IC50 (nM) |
|---------|----------------|----------------------|------------------------------|
| 3.7 | (R)-1-(4-(3-(5-amino-8-methyl-7-(oxazol-2-yl)-[1,2,4]triazolo[1,5-c]pyrimidin-2-yl)piperidin-1-yl)-1H-pyrazol-1-yl)-2-methylpropan-2-ol | 438.3 | 4.7 (A) 224.0 |
| 3.8 | (R)-1-((4-(3-(5-amino-8-methyl-7-(oxazol-2-yl)-[1,2,4]triazolo[1,5-c]pyrimidin-2-yl)piperidin-1-yl)-1H-pyrazol-1-yl)methyl)cyclobutan-1-ol | 450.1 | 2.7 (A) 191.1 |
| 3.9 | (R)-1-(4-(3-(5-amino-8-methyl-7-(oxazol-2-yl)-[1,2,4]triazolo[1,5-c]pyrimidin-2-yl)piperidin-1-yl)-3-methyl-1H-pyrazol-1-yl)-2-methylpropan-2-ol | 452.2 | 0.1 (A) 553.5 |

TABLE 11-continued

| Example | Structure Name | Observed m/z [M + H]⁺ | A2a IC50 (nM) A2b IC50 (nM) |
|---|---|---|---|
| 3.10 | 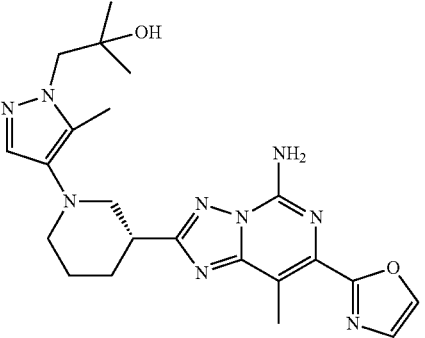 [SMILES: Cc1c(-c2ncco2)nc(N)n2nc([C@@H]3CCCN(c4cnn(CC(C)(C)O)c4C)C3)nc12]<br>(R)-1-(4-(3-(5-amino-8-methyl-7-(oxazol-2-yl)-[1,2,4]triazolo[1,5-c]pyrimidin-2-yl)piperidin-1-yl)-5-methyl-1H-pyrazol-1-yl)-2-methylpropan-2-ol | 452.2 | 2.1 (A)<br>535.0 |
| 3.11 | 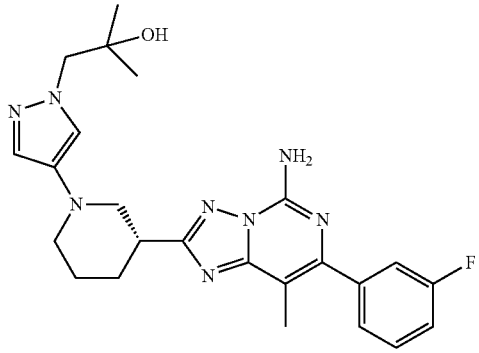 [SMILES: Cc1c(-c2cccc(F)c2)nc(N)n2nc([C@@H]3CCCN(c4cnn(CC(C)(C)O)c4)C3)nc12]<br>(R)-1-(4-(3-(5-amino-7-(3-fluorophenyl)-8-methyl-[1,2,4]triazolo[1,5-c]pyrimidin-2-yl)piperidin-1-yl)-1H-pyrazol-1-yl)-2-methylpropan-2-ol | 465.2 | 29.2 (A)<br>542.5 |
| 3.12 | 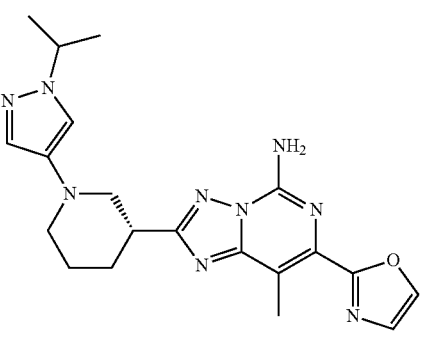 [SMILES: Cc1c(-c2ncco2)nc(N)n2nc([C@@H]3CCCN(c4cnn(C(C)C)c4)C3)nc12]<br>(R)-2-(1-(1-isopropyl-1H-pyrazol-4-yl)piperidin-3-yl)-8-methyl-7-(oxazol-2-yl)-[1,2,4]triazolo[1,5-c]pyrimidin-5-amine | 408.1 | 1.2 (A)<br>167.5 |

TABLE 11-continued

| Example | Structure Name | Observed m/z [M + H]+ | A2a IC50 (nM) A2b IC50 (nM) |
|---|---|---|---|
| 3.13 | (R)-2-(1-(6-(difluoromethoxy)-5-methylpyridin-3-yl)piperidin-3-yl)-8-methyl-7-(oxazol-2-yl)-[1,2,4]triazolo[1,5-c]pyrimidin-5-amine | 457.0 | 1.6 (A) 149.4 |
| 3.14 | (R)-5-(3-(5-amino-8-methyl-7-(oxazol-2-yl)-[1,2,4]triazolo[1,5-c]pyrimidin-2-yl)piperidin-1-yl)-1-(difluoromethyl)-3-methylpyridin-2(1H)-one | 457.1 | 0.2 (A) 115.6 |
| 3.15-1 | (R or S)-1-(4-(3-(5-amino-8-methyl-7-(oxazol-2-yl)-[1,2,4]triazolo[1,5-c]pyrimidin-2-yl)pyrrolidin-1-yl)-1H-pyrazol-1-yl)-2-methylpropan-2-ol | 424.2 | 42.6 (A) 386.4 |

TABLE 11-continued

| Example | Structure Name | Observed m/z [M + H]+ | A2a IC50 (nM) A2b IC50 (nM) |
|---|---|---|---|
| 3.15-2 | 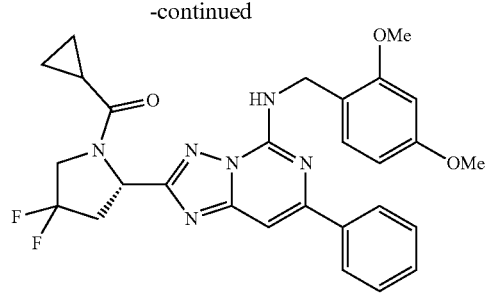  (R or S)-1-(4-(3-(5-amino-8-methyl-7-(oxazol-2-yl)-[1,2,4]triazolo[1,5-c]pyrimidin-2-yl)pyrrolidin-1-yl)-1H-pyrazol-1-yl)-2-methylpropan-2-ol | 424.2 | 435 (A) 9089 |

Example 3.15-1/3.15-2

Racemic 1-(4-(3-(5-amino-8-methyl-7-(oxazol-2-yl)-[1,2,4]triazolo[1,5-c]pyrimidin-2-yl)pyrrolidin-1-yl)-1H-pyrazol-1-yl)-2-methylpropan-2-ol was purified by CHIRAL-Prep SFC [Column: Chiralcel O J, 3100×4.6 mm; gradient elution: 5-40% (0.05% Et$_2$NH in MeOH)/CO$_2$ in 4.5 min, then 5% (0.05% Et$_2$NH in MeOH)/CO$_2$ for 1 min; flow rate: 2.8 mL/min; column temp: 40° C.; 220 nm; first eluting peak (Example 3.15-1); second eluting peak (Example 3.15-2)].

Preparation of Example 4.3, (S)-(2-(5-amino-7-phenyl-[1,2,4]triazolo[1,5-c]pyrimidin-2-yl)-4,4-difluoropyrrolidin-1-yl)(cyclopropyl)methanone Scheme 4

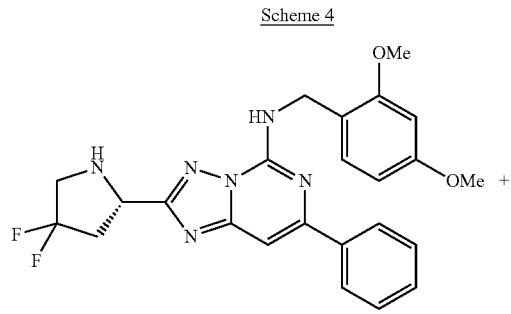

U.2

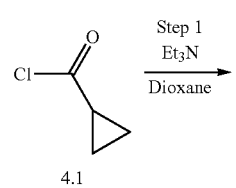

4.1

Step 1
Et$_3$N
Dioxane

-continued

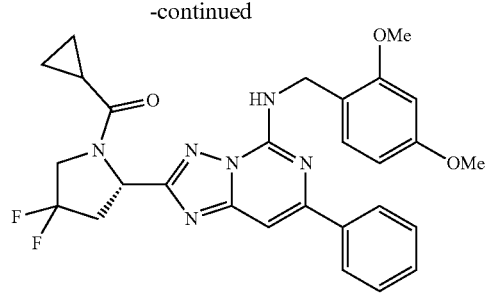

4.2

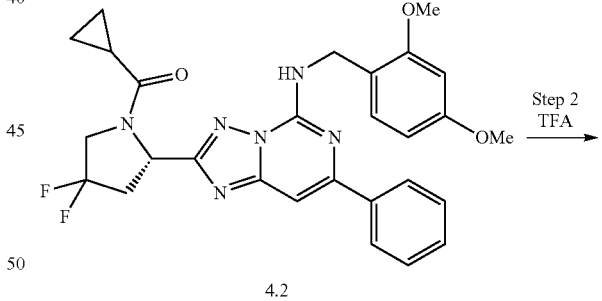

Step 2
TFA 4.2

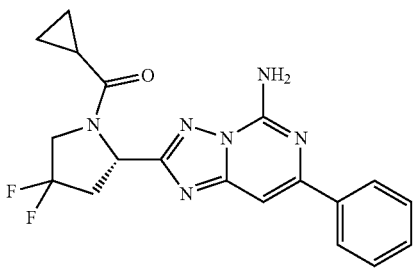

4.3

Step 1—Synthesis of Intermediate 4.2, (S)-cyclo-propyl(2-(5-((2,4-dimethoxybenzyl)amino)-7-phe-nyl-[1,2,4]triazolo[1,5-c]pyrimidin-2-yl)-4,4-difluo-ropyrrolidin-1-yl)methanone A reaction vial containing (S)-2-(4,4-difluoropyrrolidin-2-yl)-N-(2,4-dimethoxybenzyl)-7-phenyl-[1,2,4]triazolo[1,5-c]pyrimidin-5-amine (120 mg, 0.257 mmol) in dioxane (3 mL) was treated with Et$_3$N (54 µL, 0.386 mmol) followed by cyclopropanecarbonyl chloride (28 µL, 0.309 mmol). The resulting mixture was capped and stirred at room temperature for 2 h. Upon completion, the reaction mixture was concentrated, and the resulting crude residue was purified by silica gel chromatography (elution: 3% MeOH/DCM) to provide (S)-cyclopropyl(2-(5-((2,4-dimethoxybenzyl)amino)-7-phenyl-[1,2,4]triazolo[1,5-c]pyrimidin-2-yl)-4,4-difluoropyrrolidin-1-yl)methanone. MS (ESI) m/z calc'd for C$_{28}$H$_{29}$F$_2$N$_6$O$_3$ [M+H]$^+$ 535.2, found 535.4.

Step 2—Preparation of Example 4.3, (S)-(2-(5-amino-7-phenyl-[1,2,4]triazolo[1,5-c]pyrimidin-2-yl)-4,4-difluoropyrrolidin-1-yl)(cyclopropyl)metha-none A mixture of (S)-cyclopropyl(2-(5-((2,4-dimethoxybenzyl)amino)-7-phenyl-[1,2,4]triazolo[1,5-c]pyrimidin-2-yl)-4,4-difluoropyrrolidin-1-yl)methanone (125 mg, 0.234 mmol) in TFA (3 mL) was heated to 50° C. and stirred for 1 h. Upon completion, the reaction mixture was concentrated. The resulting crude residue was purified by silica gel chromatography (elution: 4% MeOH/DCM) to provide (S)-(2-(5-amino-7-phenyl-[1,2,4]triazolo[1,5-c]pyrimidin-2-yl)-4,4-difluoropyrrolidin-1-yl)(cyclopropyl)methanone (Example 4.3). MS (ESI) m/z calc'd for C$_{19}$H$_{19}$F$_2$N$_6$O [M+H]$^+$ 385.2, found 385.3. $^1$H NMR (500 MHz, CDCl$_3$) (Two rotamers) δ 7.94-7.99 (m, 2H), 7.44-7.51 (m, 3H), 7.35-7.39 (s, 1H), 6.10, 6.17 (b, 2H), 5.58-5.67 (m, 1H), 3.79-4.37 (m, 2H), 3.49 (s, 2H), 2.75-3.09 (m, 2H), 1.59-1.64 (m, 1H), 0.90-1.08 (m, 2H), 0.58-0.99 (m, 2H). A2a IC$_{50}$ 14.9 nM (A).

Preparation of Example 5.5, (R)-8-cyclopropyl-7-phenyl-2-(1-(2,2,2-trifluoroethyl)piperidin-3-yl)-[1,2,4]triazolo[1,5-c]pyrimidin-5-amine

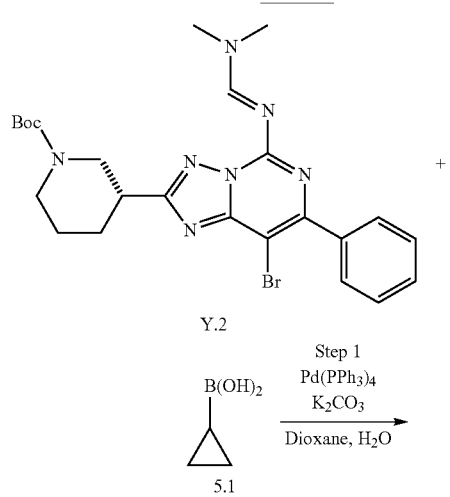

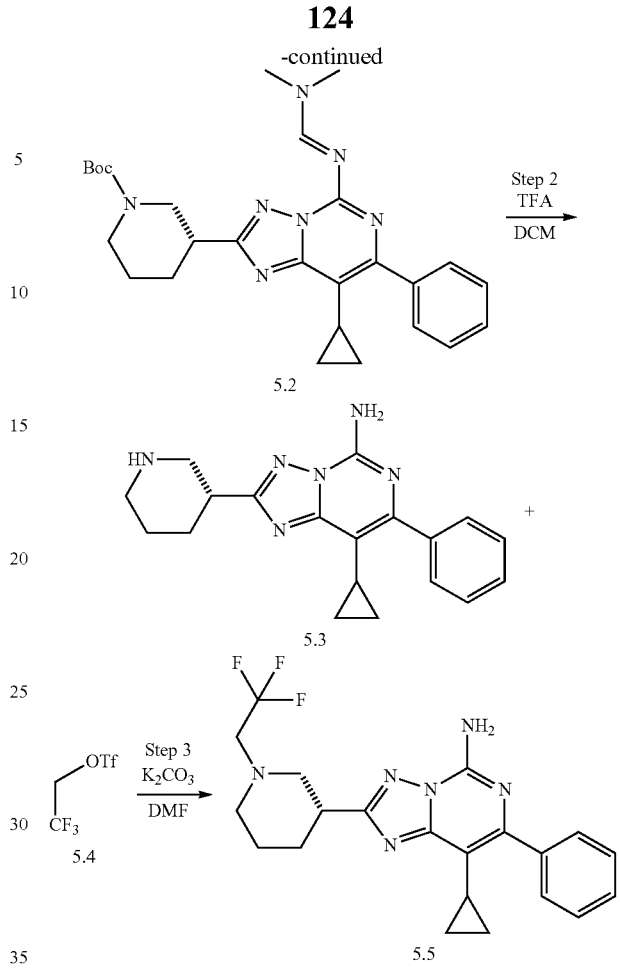

Step 1—Synthesis of intermediate 5.1, (R,E)-tert-butyl 3-(8-cyclopropyl-5-((dimethylamino)methyl-eneamino)-7-phenyl-[1,2,4]triazolo[1,5-c]pyrimidin-2-yl)piperidine-1-carboxylate A 250 mL round-bottomed flask was equipped with a nitrogen inlet adaptor and charged with (R,E)-tert-butyl3-(8-bromo-5-((dimethylamino)methyleneamino)-7-phenyl-[1,2,4]triazolo[1,5-c]pyrimidin-2-yl)piperidine-1-carboxylate (528 mg, 1.0 mmol), cyclopropyl boronic acid (129 mg, 1.5 mmol), Pd(PPh$_3$)$_4$ (116 mg, 0.1 mmol), potassium carbonate (276 mg, 2.0 mmol), H$_2$O (1 mL) and dioxane (5 mL). The reaction mixture was then stirred at 80° C. overnight. After cooling, the reaction mixture was concentrated. Water (20 mL) was added, and the mixture was extracted with EtOAc (3×30 mL). The combined organic layers were dried over anhydrous Na$_2$SO$_4$, filtered, and concentrated to provide (R,E)-tert-butyl 3-(8-cyclopropyl-5-((dimethylamino)methyleneamino)-7-phenyl-[1,2,4]triazolo[1,5-c]pyrimidin-2-yl)piperidine-1-carboxylate, which was used in the next reaction without further purification. MS (ESI) m/z calc'd for C$_{27}$H$_{36}$N$_7$O$_2$ [M+H]$^+$ 490, found 490.

Step 2—Synthesis of intermediate 5.3, (R)-8-cyclo-propyl-7-phenyl-2-(piperidin-3-yl)-[1,2,4]triazolo[1,5-c]pyrimidin-5-amine A mixture of (R,E)-tert-butyl 3-(8-cyclopropyl-5-((dimethylamino)methyleneamino)-7-phenyl-[1,2,4]triazolo[1,5- c]pyrimidin-2-yl)piperidine-1-carboxylate (489 mg, 1.0 mmol), TFA (5 mL) and DCM (5 mL) was stirred at 25° C. for 2 h. Sat. aq. NaHCO$_3$ was then added to the mixture until a pH of greater than 7 was achieved. The resulting mixture was extracted with EtOAc (3×50 mL), and the combined organic layers were dried over anhydrous Na$_2$SO$_4$, filtered, and concentrated to provide (R)-8-cyclopropyl-7-phenyl-2-(piperidin-3-yl)-[1,2,4]triazolo[1,5-c]pyrimidin-5-amine, which was used in the next reaction without further purification. MS (ESI) m/z calc'd for C$_{19}$H$_{23}$N$_6$ [M+H]$^+$ 335, found 335.

Step 3—Preparation of Example 5.5, (R)-8-cyclopropyl-7-phenyl-2-(1-(2,2,2-trifluoroethyl)piperidin-3-yl)-[1,2,4]triazolo[1,5-a]pyrimidin-5-amine A mixture of (R)-8-cyclopropyl-7-phenyl-2-(piperidin-3-yl)-[1,2,4]triazolo[1,5-c]pyrimidin-5-amine (100 mg, 0.3 mmol), 2,2,2-trifluoroethyl trifluoromethanesulfonate (208 mg, 0.9 mmol), potassium carbonate (62 mg, 0.45 mmol), and DMF (5 mL) was stirred at 45° C. for 2 h. The reaction mixture was then diluted with water (25 mL) and extracted with EtOAc (3×30 mL). The combined organic layers were dried over anhydrous Na$_2$SO$_4$, filtered, and concentrated. The resulting crude residue was purified by reversed-phase HPLC [Method B] to provide (R)-8-cyclopropyl-7-phenyl-2-(1-(2,2,2-trifluoroethyl)piperidin-3-yl)-[1,2,4]triazolo[1,5-c]pyrimidin-5-amine (Example 5.5). MS (ESI) m/z calc'd for C$_{27}$H$_{36}$N$_7$O$_2$ [M+H]$^+$ 490, found 490. MS (ESI) m/z calc'd for C$_{21}$H$_{24}$F$_3$N$_6$ [M+H]$^+$ 417, found 417. $^1$H NMR (CDCl$_3$, 400 MHz) δ 7.64 (d, 2H), 7.48-7.42 (m, 3H), 6.36 (s, 2H), 3.32-3.21 (m, 2H), 3.11-2.99 (m, 3H), 2.77 (t, 1H), 2.52-2.46 (m, 1H), 2.19-2.15 (m, 1H), 2.00-1.96 (m, 1H), 1.81-1.63 (m, 3H), 1.00-0.96 (m, 2H), 0.88-0.81 (m, 2H). A2a IC$_{50}$ 81.7 nM (B).

Preparation of Example 6.5, (R)-2-(5-amino-7-phenyl-2-(1-(2,2,2-trifluoroethyl)piperidin-3-yl)-[1,2,4]triazolo[1,5-a]pyrimidin-8-yl)propan-2-ol

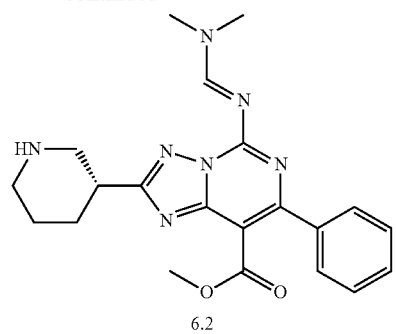

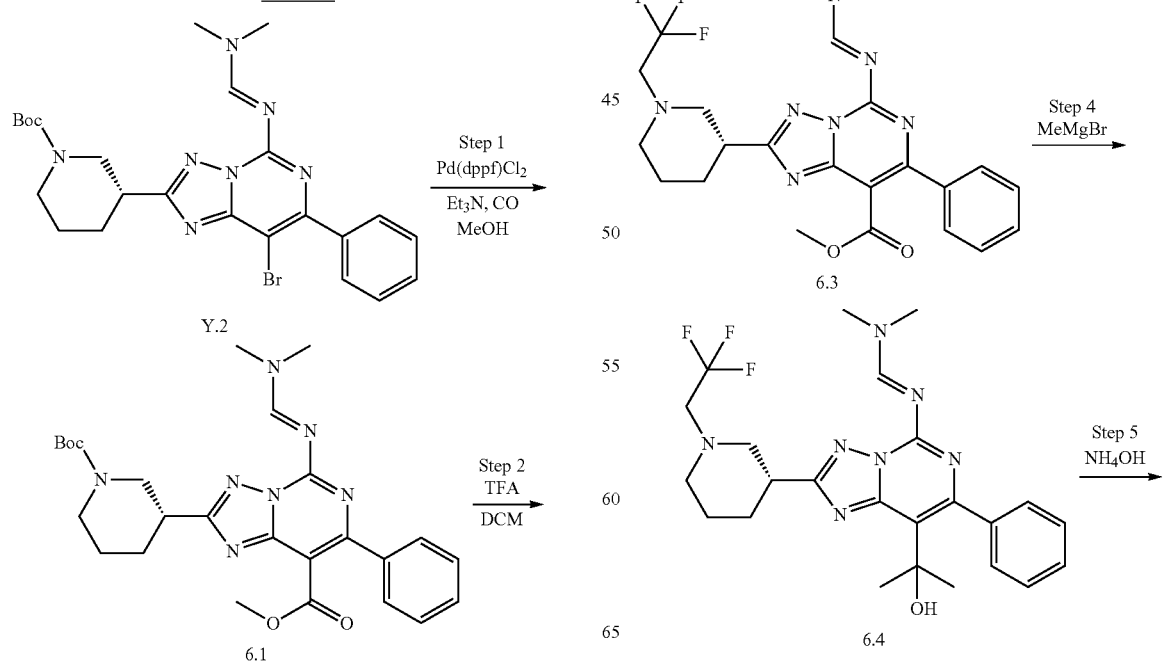

-continued

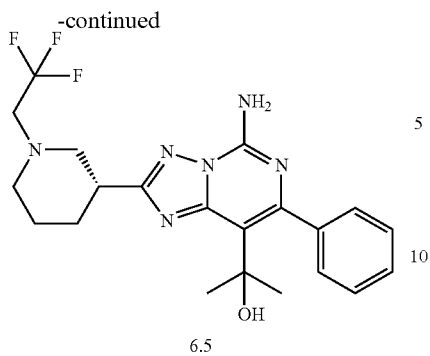

6.5

Step 1—Synthesis of intermediate 6.1, (R,E)-methyl 2-(1-(tert-butoxycarbonyl)piperidin-3-yl)-5-((dimethylamino)methyleneamino)-7-phenyl-[1,2,4]triazolo[1,5-c]pyrimidine-8-carboxylate A solution of (R,E)-tert-butyl 3-(8-bromo-5-((dimethylamino)methyleneamino)-7-phenyl-[1,2,4]triazolo[1,5-c]pyrimidin-2-yl)piperidine-1-carboxylate (528 mg, 1.00 mmol) in MeOH (30 mL) was treated with $Et_3N$ (0.78 mL, 5.60 mmol) and $Pd(dppf)Cl_2$ (73 mg, 0.10 mmol). The reaction mixture was stirred at 100° C. for 16 h under 15 atm of CO. After cooling, the reaction mixture was directly concentrated. The resulting crude residue was purified by reversed-phase HPLC [Method B] to provide (R,E)-methyl 2-(1-(tert-butoxycarbonyl)piperidin-3-yl)-5-((dimethylamino)methyleneamino)-7-phenyl-[1,2,4]triazolo[1,5-c]pyrimidine-8-carboxylate. MS (ESI) m/z calc'd for $C_{26}H_{34}N_7O_4$ $[M+H^+]$ 508, found 508.

Step 2—Synthesis of intermediate 6.2, (R,E)-methyl 5-((dimethylamino)methyleneamino)-7-phenyl-2-(piperidin-3-yl)-[1,2,4]triazolo[1,5-c]pyrimidine-8-carboxylate A mixture of (R,E)-methyl 2-(1-(tert-butoxycarbonyl)piperidin-3-yl)-5-((dimethylamino)methyleneamino)-7-phenyl-[1,2,4]triazolo[1,5-c]pyrimidine-8-carboxylate (507 mg, 1.00 mmol) and TFA (5 mL) in DCM (5 mL) was stirred at 0° C. for 2 h. Sat. aq. $NaHCO_3$ was then added until a pH of greater than 7 was achieved. The resulting mixture was then extracted with EtOAc (3×50 mL), and the combined organic layers were dried over anhydrous $Na_2SO_4$, filtered, and concentrated to provide (R,E)-methyl 5-((dimethylamino)methyleneamino)-7-phenyl-2-(piperidin-3-yl)-[1,2,4]triazolo[1,5-c]pyrimidine-8-carboxylate, which used in the subsequent reaction without additional purification. MS (ESI) m/z calc'd for $C_{21}H_{26}N_7O_2$ $[M+H^+]$ 408, found 408.

Step 3—Synthesis of intermediate 6.3, (R,E)-methyl 5-((dimethylamino)methyleneamino)-7-phenyl-2-(1-(2,2,2-trifluoroethyl)piperidin-3-yl)-[1,2,4]triazolo[1,5-c]pyrimidine-8-carboxylate A mixture of (R,E)-methyl 5-((dimethylamino)methyleneamino)-7-phenyl-2-(piperidin-3-yl)-[1,2,4]triazolo[1,5-c]pyrimidine-8-carboxylate (815 mg, 2.00 mmol), 2,2,2-trifluoroethyl trifluoromethanesulfonate (1.39 g, 6.00 mmol), potassium carbonate (414 mg, 3.00 mmol), and DMF (20 mL) was stirred at 45° C. for 2 h. The mixture was then diluted with water (80 mL) and extracted with EtOAc (3×100 mL). The combined organic layers were dried over anhydrous $Na_2SO_4$, filtered, and concentrated. The resulting crude residue was purified by reversed-phase HPLC [Method B] to provide (R,E)-methyl 5-((dimethylamino)methyleneamino)-7-phenyl-2-(1-(2,2,2-trifluoroethyl)piperidin-3-yl)-[1,2,4]triazolo[1,5-c]pyrimidine-8-carboxylate. MS (ESI) m/z calc'd for $C_{23}H_{27}F_3N_7O_2$ $[M+H^+]$ 490, found 490.

Step 4—Synthesis of intermediate 6.4, ((R,E)-N'-(8-(2-hydroxypropan-2-yl)-7-phenyl-2-(1-(2,2,2-trifluoroethyl)piperidin-3-yl)-[1,2,4]triazolo[1,5-c]pyrimidin-5-yl)-N,N-dimethylformimidamide A solution of (R,E)-methyl 5-((dimethylamino)methyleneamino)-7-phenyl-2-(1-(2,2,2-trifluoroethyl)piperidin-3-yl)-[1,2,4]triazolo[1,5-c]pyrimidine-8-carboxylate (489 mg, 1.00 mmol) in THF (5 mL) was cooled to −30° C. Methylmagnesium bromide (1 M in THF, 3.00 mL, 3.00 mmol) was then added dropwise, and the reaction mixture was stirred at −30° C. for 3 h. The reaction was then diluted with MeOH (10 mL) and concentrated. The resulting crude residue was purified by reversed-phase HPLC [Method B] to provide (R,E)-N'-(8-(2-hydroxypropan-2-yl)-7-phenyl-2-(1-(2,2,2-trifluoroethyl)piperidin-3-yl)-[1,2,4]triazolo[1,5-c]pyrimidin-5-yl)-N,N-dimethylformimidamide. MS (ESI) m/z calc'd for $C_{24}H_{31}F_3N_7O$ $[M+H^+]$ 490, found 489.

Step 5—Preparation of Example 6.5, (R)-2-(5-amino-7-phenyl-2-(1-(2,2,2-trifluoroethyl)piperidin-3-yl)-[1,2,4]triazolo[1,5-a]pyrimidin-8-yl)propan-2-ol A mixture of (R,E)-N'-(8-(2-hydroxypropan-2-yl)-7-phenyl-2-(1-(2,2,2-trifluoroethyl)piperidin-3-yl)-[1,2,4]triazolo[1,5-c]pyrimidin-5-yl)-N,N-dimethylformimidamide (50 mg, 0.10 mmol), $NH_4OH$ (1 mL) and EtOH (5 mL) was stirred at 50° C. for 3 h. The mixture was then concentrated, and the resulting crude residue was purified by reversed-phase HPLC [Method B] to provide (R)-2-(5-amino-7-phenyl-2-(1-(2,2,2-trifluoroethyl)piperidin-3-yl)-[1,2,4]triazolo[1,5-c]pyrimidin-8-yl)propan-2-ol (Example 6.5). MS (ESI) m/z calc'd for $C_{21}H_{26}F_3N_6O$ $[M+H^+]$ 435, found 435. A2a $IC_{50}$ 1028 nM (B).

Preparation of Example 7.3, (R)-7-phenyl-8-(prop-1-en-2-yl)-2-(1-(2,2,2-trifluoroethyl)piperidin-3-yl)-[1,2,4]triazolo[1,5-a]pyrimidin-5-amine Scheme 7

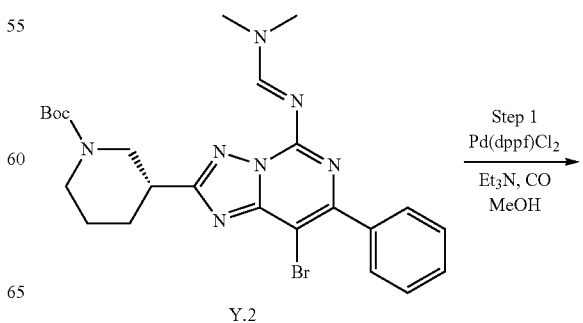

Y.2

Step 1
$Pd(dppf)Cl_2$
$Et_3N$, CO
MeOH

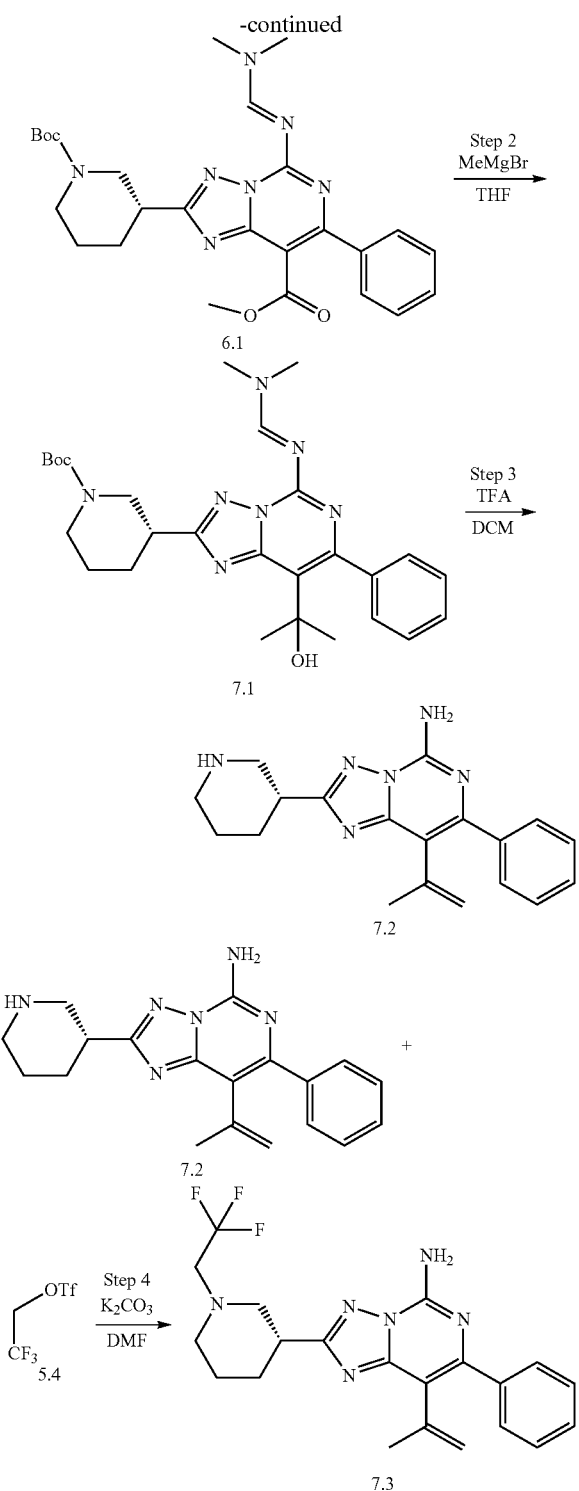

Step 1—Synthesis of intermediate 6.1, (R,E)-methyl 2-(1-(tert-butoxycarbonyl)piperidin-3-yl)-5-((dimethylamino)methyleneamino)-7-phenyl-[1,2,4]triazolo[1,5-c]pyrimidine-8-carboxylate A solution of (R,E)-tert-butyl 3-(8-bromo-5-((dimethylamino)methyleneamino)-7-phenyl-[1,2,4]triazolo[1,5-c]pyrimidin-2-yl)piperidine-1-carboxylate (528 mg, 1.00 mmol) in MeOH (30 mL) was treated with Et$_3$N (0.78 mL, 5.60 mmol) and Pd(dppf)Cl$_2$ (73 mg, 0.10 mmol). The reaction mixture was stirred at 100° C. for 16 h under 15 atm of CO. After cooling, the reaction mixture was concentrated. The resulting crude residue was purified by reversed-phase HPLC [Method B] to provide (R,E)-methyl 2-(1-(tert-butoxycarbonyl)piperidin-3-yl)-5-((dimethylamino)methyleneamino)-7-phenyl-[1,2,4]triazolo[1,5-c]pyrimidine-8-carboxylate. MS (ESI) m/z calc'd for C$_{26}$H$_{34}$N$_7$O$_4$ [M+H$^+$] 508, found 508.

Step 2—Synthesis of Intermediate 7.1, (R,E)-tert-butyl 3-(5-((dimethylamino)methyleneamino)-8-(2-hydroxypropan-2-yl)-7-phenyl-[1,2,4]triazolo[1,5-c]pyrimidin-2-yl)piperidine-1-carboxylate A solution of (R,E)-methyl 2-(1-(tert-butoxycarbonyl)piperidin-3-yl)-5-((dimethylamino)methyleneamino)-7-phenyl-[1,2,4]triazolo[1,5-c]pyrimidine-8-carboxylate (507 mg, 1.00 mmol) in THF (5 mL) was cooled to −30° C. Methylmagnesium bromide (1 M in THF, 1.50 mL, 1.50 mmol) was then added dropwise, and the resulting mixture was stirred at −30° C. for 3 h. The reaction mixture was diluted with MeOH (10 mL) and concentrated. The resulting crude residue was purified by reversed-phase HPLC [Method B] to provide (R,E)-tert-butyl 3-(5-((dimethylamino)methyleneamino)-8-(2-hydroxypropan-2-yl)-7-phenyl-[1,2,4]triazolo[1,5-c]pyrimidin-2-yl)piperidine-1-carboxylate. MS (ESI) m/z calc'd for C$_{27}$H$_{38}$N$_7$O$_3$ [M+H$^+$] 508, found 508.

Step 3—Synthesis of Intermediate 7.2, (R)-7-phenyl-2-(piperidin-3-yl)-8-(prop-1-en-2-yl)-[1,2,4]triazolo[1,5-c]pyrimidin-5-amine A mixture of (R,E)-tert-butyl 3-(5-((dimethylamino)methyleneamino)-8-(2-hydroxypropan-2-yl)-7-phenyl-[1,2,4]triazolo[1,5-c]pyrimidin-2-yl)piperidine-1-carboxylate (507 mg, 1.00 mmol), TFA (5 mL) and DCM (5 mL) was stirred at room temperature for 2 h. Sat. aq. NaHCO$_3$ was then added until a pH of greater than 7 was achieved. The reaction mixture was extracted with EtOAc (3×30 mL), and the combined organic layers were dried over anhydrous Na$_2$SO$_4$, filtered, and concentrated to provide (R)-7-phenyl-2-(piperidin-3-yl)-8-(prop-1-en-2-yl)-[1,2,4]triazolo[1,5-c]pyrimidin-5-amine, which was used in the subsequent reaction without additional purification. MS (ESI) m/z calc'd for C$_{19}$H$_{23}$N$_6$ [M+H$^+$] 335, found 335.

Step 4—Preparation of Example 7.3, (R)-7-phenyl-8-(prop-1-en-2-yl)-2-(1-(2,2,2-trifluoroethyl)piperidin-3-yl)-[1,2,4]triazolo[1,5-c]pyrimidin-5-amine A mixture of (R)-7-phenyl-2-(piperidin-3-yl)-8-(prop-1-en-2-yl)-[1,2,4]triazolo[1,5-c]pyrimidin-5-amine (20 mg, 0.06 mmol), 2,2,2-trifluoroethyl trifluoromethanesulfonate (42 mg, 0.180 mmol), potassium carbonate (13 mg, 0.09 mmol), and DMF (2 mL) was stirred at 45° C. for 2 h. The reaction mixture was then diluted with water (10 mL) and extracted with EtOAc (3×15 mL). The combined organic layers were dried over anhydrous Na$_2$SO$_4$, filtered, and concentrated. The resulting crude residue was purified by reversed-phase HPLC [Method B] to provide (R)-7-phenyl-8-(prop-1-en-2-yl)-2-(1-(2,2,2-trifluoroethyl)piperidin-3-yl)-[1,2,4]triazolo[1,5-c]pyrimidin-5-amine (Example 7.3). MS (ESI) m/z calc'd for C$_{21}$H$_{24}$F$_3$N$_6$ [M+H$^+$] 417, found 417. A2a IC$_{50}$ 65.8 nM (B).

Preparation of Examples 8.2-1, 8.2-2, 8.3-1, 8.3-2, (1-R or S,3-R or S)-3-(5-amino-8-methyl-7-(oxazol-2-yl)-[1,2,4]triazolo[1,5-c]pyrimidin-2-yl)-1-methyl-cyclohexan-1-ol

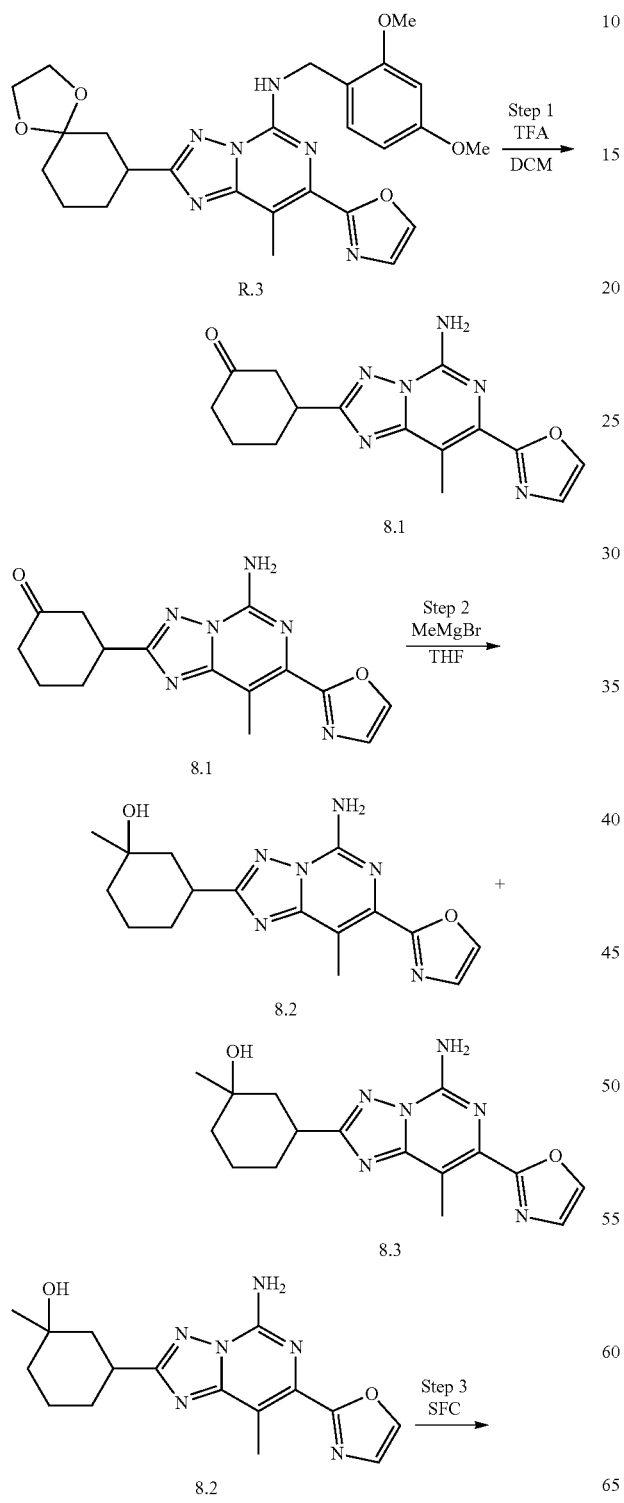

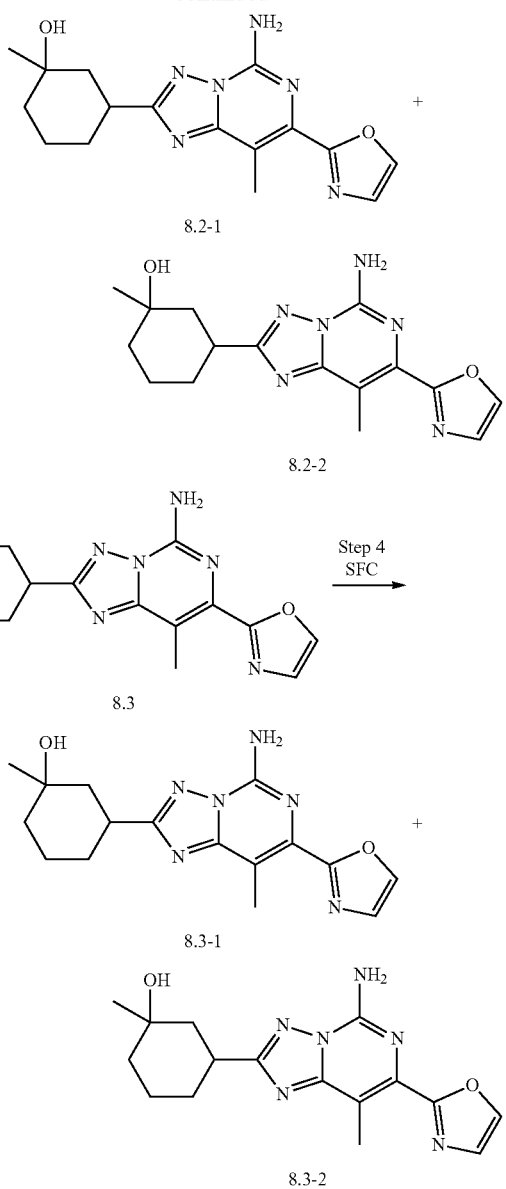

Step 1—Synthesis of Intermediate 8.1, 3-(5-amino-8-methyl-7-(oxazol-2-yl)-[1,2,4]triazolo[1,5-c]pyrimidin-2-yl)cyclohexanone A stirred solution of N-(2,4-dimethoxybenzyl)-8-methyl-7-(oxazol-2-yl)-2-(1,4-dioxaspiro[4.5]decan-7-yl)-[1,2,4]triazolo[1,5-c]pyrimidin-5-amine (265 mg, 0.523 mmol) in DCM (3 mL) was treated with TFA (3.00 mL, 38.9 mmol). The reaction mixture was then stirred at 50° C. for 1 h. The reaction was then concentrated, and the residue was diluted with DCM (20 mL) and washed with sat. aq. NaHCO$_3$ (10 mL). The organic layer was concentrated and the resulting crude residue was purified by silica gel chromatography (gradient elution: 0-5% MeOH/DCM) to provide 3-(5-amino-8-methyl-7-(oxazol-2-yl)-[1,2,4]triazolo[1,5-c]pyrimidin-2-yl) cyclohexanone. MS (ESI) m/z calc'd for $C_{15}H_{17}N_6O_2[M+H]^+$ 313.1, found 313.2.

Step 2—Synthesis of Intermediates 8.2 & 8.3, racemic 3-(5-amino-8-methyl-7-(oxazol-2-yl)-[1,2,4]triazolo[1,5-c]pyrimidin-2-yl)-1-methylcyclohexanol and racemic diastereomer A stirred solution of 3-(5-amino-8-methyl-7-(oxazol-2-yl)-[1,2,4]triazolo[1,5-c]pyrimidin-2-yl)cyclohexanone (120 mg, 0.384 mmol) in THF (5 mL) was treated with methylmagnesium bromide (3 M in Et$_2$O, 1.00 mL, 3.00 mmol) at 0° C. The reaction was then stirred at 0° C. for 3 h. The reaction was quenched with sat. aq. NH$_4$Cl (5 mL) and extracted with DCM (2×10 mL). The combined organic layers were washed with brine (10 mL), dried over anhydrous Na$_2$SO$_4$, filtered, and concentrated. The crude residue was purified by reversed-phase HPLC [Method B] to provide two diastereomers (8.2 and 8.3) of 3-(5-amino-8-methyl-7-(oxazol-2-yl)-[1,2,4]triazolo[1,5-c]pyrimidin-2-yl)-1-methylcyclohexanol with unassigned relative stereochemistry. 8.2: MS (ESI) m/z calc'd for C$_{16}$H$_{20}$N$_6$O$_2$ [M+H]$^+$ 329.2, found 329.2. 8.3: MS (ESI) m/z calc'd for C$_{16}$H$_{21}$N$_6$O$_2$ [M+H]$^+$ 329.2, found 329.2.

Step 3—Resolution of 8.2

Racemic 3-(5-amino-8-methyl-7-(oxazol-2-yl)-[1,2,4]triazolo[1,5-c]pyrimidin-2-yl)-1-methylcyclohexanol was purified by CHIRAL-Prep SFC [Column: Phenomenex-Cellulose-2, 250×30 mm (5 μm), gradient elution: 5-40% (0.1% Ethanolamine in i-PrOH)/CO$_2$ in 5.5 min and hold 40% (0.1% Ethanolamine in i-PrOH)/CO$_2$ for 3 min, then 5% (0.1% Ethanolamine in i-PrOH)/CO$_2$ for 1.5 min; Flow rate: 70 mL/min, Column temp: 40° C., 220 nM; First Eluting Peak (Example 8.2-1); Second Eluting Peak (Example 8.2-2)].

Example 8.2-1

MS (ESI) m/z calc'd for C$_{16}$H$_{21}$N$_6$O$_2$ [M+H]$^+$ 329.2. $^1$H NMR (400 MHz, CDCl$_3$) δ 7.85 (s, 1H), 7.38 (s, 1H), 5.92 (br s, 2H), 3.22-3.34 (m, 1H), 2.86 (s, 3H), 1.97-2.12 (m, 3H), 1.87-1.95 (m, 1H), 1.75-1.82 (m, 1H), 1.67 (br dd, J=4.2, 8.55 Hz, 3H), 1.35 (s, 3H). A2a IC$_{50}$ 30.6 nM (A), A2b IC$_{50}$ 5554 nM.

Example 8.2-2

MS (ESI) m/z calc'd for C$_{16}$H$_{21}$N$_6$O$_2$ [M+H]$^+$ 329.2, found 329.2. $^1$H NMR (400 MHz, CDCl$_3$) δ 7.85 (s, 1H), 7.38 (s, 1H), 5.91 (br s, 2H), 3.23-3.35 (m, 1H), 2.86 (s, 3H), 1.97-2.13 (m, 3H), 1.91 (br dd, J=3.8, 7.67 Hz, 1H), 1.71-1.84 (m, 2H), 1.67-1.71 (m, 2H), 1.35 (s, 3H). A2a IC$_{50}$ 227.0 nM (A), A2b IC$_{50}$ 7310 nM.

Step 4—Resolution of 8.3

Racemic 3-(5-amino-8-methyl-7-(oxazol-2-yl)-[1,2,4]triazolo[1,5-c]pyrimidin-2-yl)-1-methylcyclohexanol was purified by CHIRAL-Prep SFC [Column: Phenomenex-Amylose-1, 250×30 mm (5 μm), gradient elution: 5-40% (0.1% Ammonia in EtOH)/CO$_2$ in 5 min and hold 40% (0.1% Ammonia in EtOH)/CO$_2$ for 2.5 min, then 5% (0.1% Ammonia in EtOH)/CO$_2$ for 2.5 min; Flow rate: 50 mL/min, Column temp: 35° C., 220 nM; First Eluting Peak (Example 8.3-1); RT2: Second Eluting Peak (Example 8.3-2)].

Example 8.3-1

MS (ESI) m/z calc'd for C$_{16}$H$_{21}$N$_6$O$_2$ [M+H]$^+$ 329.2, found 329.2. $^1$H NMR (500 MHz, CDCl$_3$) δ 7.84 (s, 1H), 7.38 (s, 1H), 5.91 (br s, 2H), 3.40 (tt, J=3.6, 12.51 Hz, 1H), 2.87 (s, 3H), 2.14-2.21 (m, 1H), 2.09 (br d, J=13.8 Hz, 1H), 1.79-1.90 (m, 2H), 1.72-1.78 (m, 2H), 1.58 (dd, J=3.4, 12.74 Hz, 1H), 1.44-1.52 (m, 1H), 1.32 (s, 3H). A2a IC$_{50}$ 7.9 nM (A), A2b IC$_{50}$ 5556 nM.

Example 8.3-2

MS (ESI) m/z calc'd for C$_{16}$H$_{21}$N$_6$O$_2$ [M+H]$^+$ 329.2, found 329.2. $^1$H NMR (400 MHz, CDCl$_3$) δ 7.84 (s, 1H), 7.38 (s, 1H), 5.98 (br s, 2H), 3.40 (tt, J=3.6, 12.44 Hz, 1H), 2.86 (s, 3H), 2.06-2.21 (m, 2H), 1.81-1.92 (m, 2H), 1.43-1.65 (m, 4H), 1.32 (s, 3H). A2a IC$_{50}$ 0.9 nM (A), A2b IC$_{50}$ 64.5 nM.

Table 12 sets forth example compounds of the invention which were prepared according to Scheme 8 and General Scheme 5 above, using intermediates R.7, R.8, N.5, or N.6. The compounds were generally purified by silica gel chromatography, reversed-phase prep-HPLC and SFC. Where isomers were separated by SFC, SFC conditions are provided, following the table.

TABLE 12

| Example | Structure Name | Observed m/z [M + H]$^+$ | A2a IC50 (nM) A2b IC50 (nM) |
|---|---|---|---|
| 8.4 | (1R,3S and 1S,3R) or (1R,3R and 1S,3S)-3-(8-amino-5-methyl-6-(oxazol-2-yl)-[1,2,4]triazolo[1,5-a]pyrazin-2-yl)-1-methylcyclohexan-1-ol | 329.2 | 6.7 (A) 411.3 |

TABLE 12-continued

| Example | Structure Name | Observed m/z [M + H]+ | A2a IC50 (nM) A2b IC50 (nM) |
|---|---|---|---|
| 8.5 | (1R,3S and 1S,3R) or (1R,3R and 1S,3S)-(8-amino-5-methyl-6-(oxazol-2-yl)-[1,2,4]triazolo[1,5-a]pyrazin-2-yl)-1-methylcyclohexan-1-ol | 329.2 | 265.4 (A) 9136 |
| 8.6 | (1R,3S and 1S,3R) or (1R,3R and 1S,3S)-(8-amino-5-methyl-6-(oxazol-2-yl)-[1,2,4]triazolo[1,5-a]pyrazin-2-yl)-1-methylcyclopentan-1-ol | 315.1 | 6.5 (A) 141.8 |
| 8.7 | (1R,3S and 1S,3R) or (1R,3R and 1S,3S)-3-(8-amino-5-methyl-6-(oxazol-2-yl)-[1,2,4]triazolo[1,5-a]pyrazin-2-yl)-1-methylcyclopentan-1-ol | 315.1 | 142.7 (A) 2592 |
| 8.8 | (1R,3S and 1S,3R) or (1R,3R and 1S,3S)-3-(8-amino-6-(3-fluorophenyl)-5-methyl-[1,2,4]triazolo[1,5-a]pyrazin-2-yl)-1-methylcyclopentan-1-ol | 342.2 | 70.5 (A) 350.2 |
| 8.9 | (1R,3S and 1S,3R) or (1R,3R and 1S,3S)-3-(8-amino-6-(3-fluorophenyl)-5-methyl-[1,2,4]triazolo[1,5-a]pyrazin-2-yl)-1-methylcyclopentan-1-ol | 342.2 | 357.2 (A) 2087 |

TABLE 12-continued

| Example | Structure Name | Observed m/z [M + H]+ | A2a IC50 (nM) A2b IC50 (nM) |
|---|---|---|---|
| 8.10-1 | (1R,3S or 1S,3R or 1R,3R or 1S,3S)-1-3-(8-amino-6-(3-fluorophenyl)-5-methyl-[1,2,4]triazolo[1,5-a]pyrazin-2-yl)-1-methylcyclohexan-1-ol | 356.2 | 175.4 (A) 2639 |
| 8.10-2 | (1R,3S or 1S,3R or 1R,3R or 1S,3S)-1-3-(8-amino-6-(3-fluorophenyl)-5-methyl-[1,2,4]triazolo[1,5-a]pyrazin-2-yl)-1-methylcyclohexan-1-ol | 356.2 | 363.2 (A) 2540 |
| 8.11-1 | (1R,3S or 1S,3R or 1R,3R or 1S,3S)-1-3-(8-amino-6-(3-fluorophenyl)-5-methyl-[1,2,4]triazolo[1,5-a]pyrazin-2-yl)-1-methylcyclohexan-1-ol | 356.2 | 132.3 (A) 10000 |
| 8.11-2 | (1R,3S or 1S,3R or 1R,3R or 1S,3S)-1-3-(8-amino-6-(3-fluorophenyl)-5-methyl-[1,2,4]triazolo[1,5-a]pyrazin-2-yl)-1-methylcyclohexan-1-ol | 356.2 | 13.5 (A) 238.5 |

Example 8.10-1/8.10-2

Racemic 3-(8-amino-6-(3-fluorophenyl)-5-methyl-[1,2,4]triazolo[1,5-a]pyrazin-2-yl)-1-methylcyclohexan-1-ol was resolved by CHIRAL-Prep SFC [Column: DAICEL CHIRALPAK AD-H, 250×30 mm; gradient elution: 5-40% (0.1% Ammonia in i-PrOH)/$CO_2$ in 5 min and hold 40% (0.1% Ammonia in i-PrOH)/$CO_2$ for 2.5 min, followed by 5% (Ammonia in i-PrOH)/$CO_2$ for 2.5 min; flow rate: 50 mL/min; 220 nm; first eluting peak (Example 8.10-1); second eluting peak (Example 8.10-2)].

Example 8.11-1/8.11-2

Racemic 3-(8-amino-6-(3-fluorophenyl)-5-methyl-[1,2,4]triazolo[1,5-a]pyrazin-2-yl)-1-methylcyclohexan-1-ol was resolved by CHIRAL-Prep SFC [Column: DAICEL CHIRALPAK AD-H, 250×30 mm; gradient elution: 5-40% (0.1% Ammonia in i-PrOH)/$CO_2$ in 5 min and hold 40% (0.1% Ammonia in i-PrOH)/$CO_2$ for 2.5 min, followed by 5% (Ammonia in i-PrOH)/$CO_2$ for 2.5 min; flow rate: 50 mL/min; 220 nm; RT1: 5.5 min (Example 8.11-1); RT2: 6.0 min (Example 8.11-2)].

Preparation of Example 9.1, (R and S)-8-methyl-7-(oxazol-2-yl)-2-(pyrrolidin-3-yl)-[1,2,4]triazolo[1,5-a]pyrimidin-5-amine, TFA Salt Scheme 9

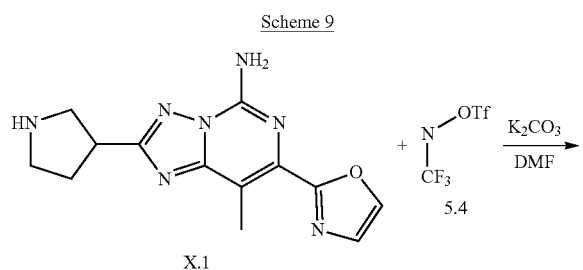

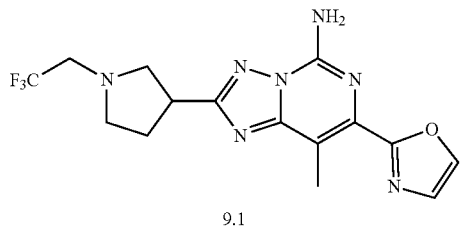

8-Methyl-7-(oxazol-2-yl)-2-(pyrrolidin-3-yl)-[1,2,4]triazolo[1,5-c]pyrimidin-5-amine (50 mg, 0.175 mmol) was dissolved in DMF (6 mL) and the resulting mixture was treated with potassium carbonate (73 mg, 0.526 mmol) and 2,2,2-trifluoroethyltrifluoromethanesulfonate (163 mg, 0.701 mmol). The reaction mixture was then stirred at 20° C. for 12 h, and then concentrated. The crude residue was purified by reversed-phase HPLC [Method A] to provide (R and S)-8-methyl-7-(oxazol-2-yl)-2-(1-(2,2,2-trifluoroethyl)pyrrolidin-3-yl)-[1,2,4]triazolo[1,5-c]pyrimidin-5-amine, TFA salt (Example 9.1). MS (ESI) m/z calc'd for $C_{15}H_{17}F_3N_7O$ [M+H$^+$] 368.1, found 368.2. $^1$H NMR (500 MHz, CDCl$_3$) δ 7.85 (s, 1H), 7.39 (s, 1H), 6.09 (br s, 2H), 3.95-3.86 (m, 1H), 3.72 (t, J=9.16 Hz, 1H), 3.60-3.48 (m, 2H), 3.45-3.38 (m, 2H), 3.20-3.13 (m, 1H), 2.84 (s, 3H), 2.59-2.51 (m, 1H), 2.45-2.37 (m, 1H). A2a IC$_{50}$ 32.3 nM (A), A2b IC$_{50}$ 618.0 nM.

Table 13 sets forth example compounds of the invention which were prepared according to Scheme 9, using intermediate W.1 and 2,2-difluorobromoethane in the presence of sodium iodide. Asterisk (*) indicates that A2b data is not available.

TABLE 13

| Example | Structure Name | Observed m/z [M + H]$^+$ | A2a IC50 (nM) A2b IC50 (nM) |
|---|---|---|---|
| 9.2 | | 359 | 10.9 (B) * |

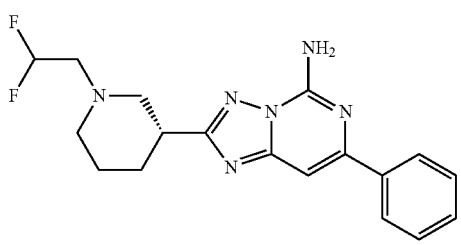 [SMILES: Nc1nc(-c2ccccc2)cc2nc([C@@H]3CCCN(CC(F)F)C3)nn12]

(R)-2-(1-(2,2-difluoroethyl)piperidin-3-yl)-7-phenyl-[1,2,4]triazolo[1,5-c]pyrimidin-5-amine

141

Preparation of Example 10.6, 2-(1,3-trans)-3-(6-(2-aminopropan-2-yl)pyridin-3-yl)cyclobutyl)-8-methyl-7-(oxazol-2-yl)-[1,2,4]triazolo[1,5-c]pyrimidin-5-amine

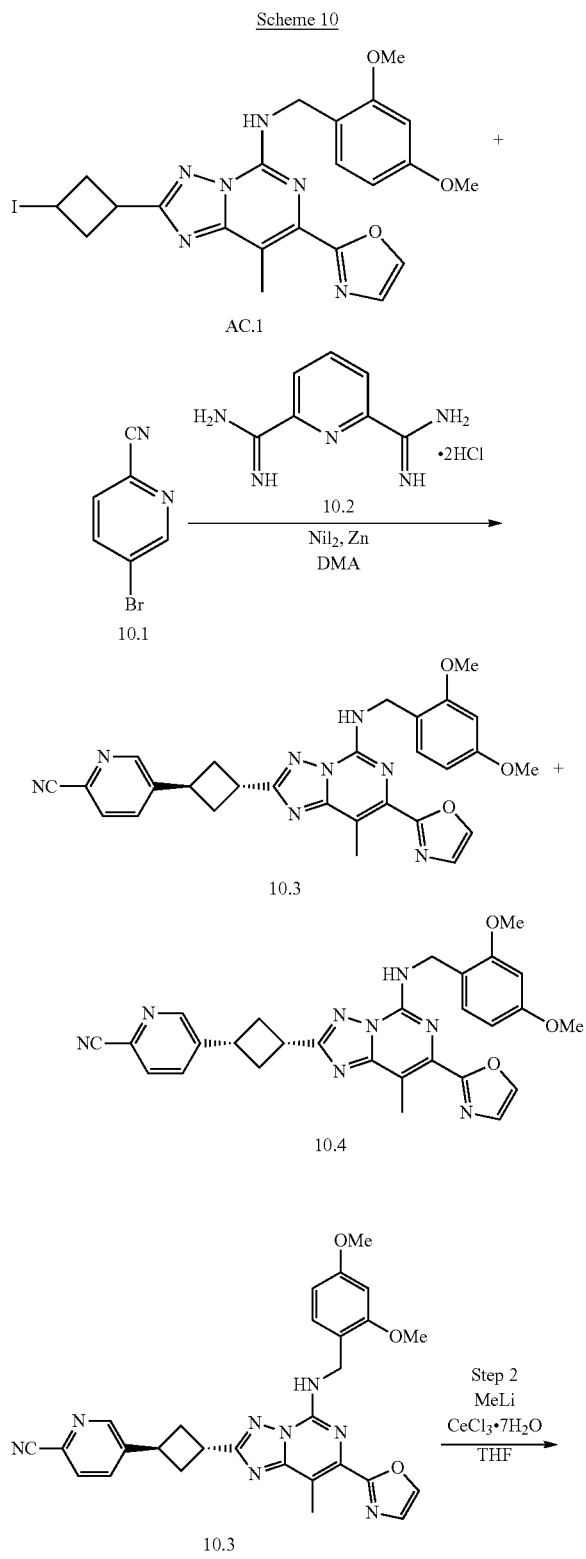

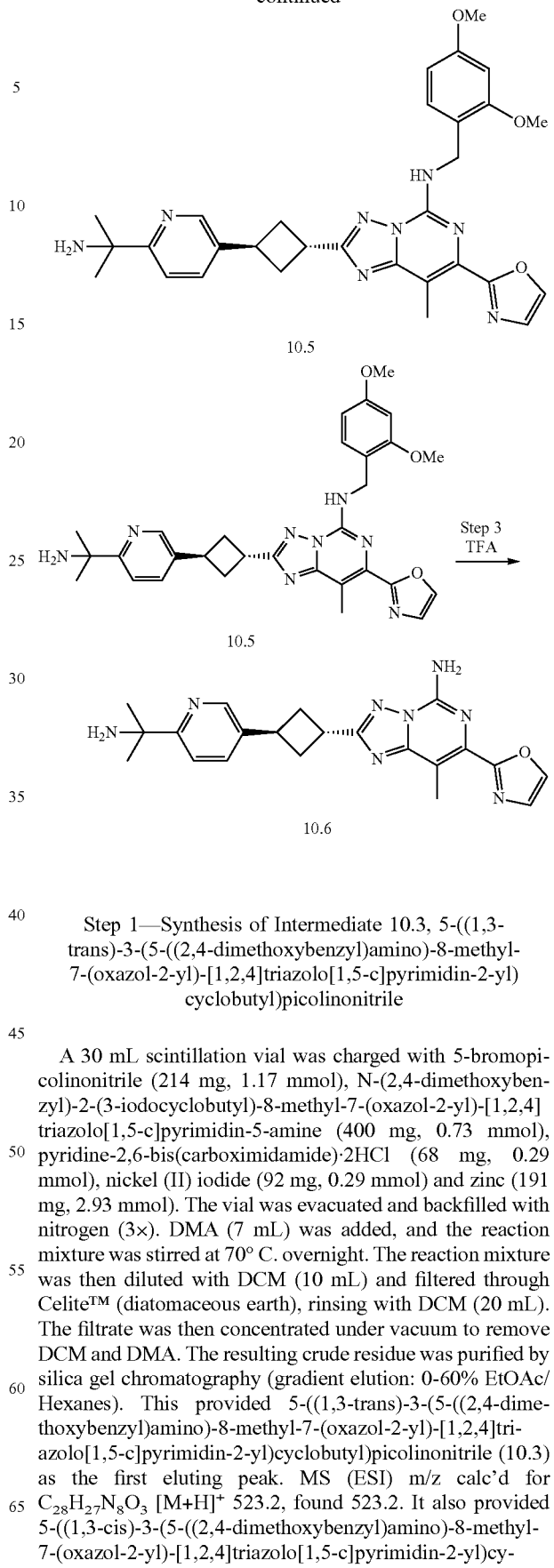

Step 1—Synthesis of Intermediate 10.3, 5-((1,3-trans)-3-(5-((2,4-dimethoxybenzyl)amino)-8-methyl-7-(oxazol-2-yl)-[1,2,4]triazolo[1,5-c]pyrimidin-2-yl)cyclobutyl)picolinonitrile A 30 mL scintillation vial was charged with 5-bromopicolinonitrile (214 mg, 1.17 mmol), N-(2,4-dimethoxybenzyl)-2-(3-iodocyclobutyl)-8-methyl-7-(oxazol-2-yl)-[1,2,4]triazolo[1,5-c]pyrimidin-5-amine (400 mg, 0.73 mmol), pyridine-2,6-bis(carboximidamide)·2HCl (68 mg, 0.29 mmol), nickel (II) iodide (92 mg, 0.29 mmol) and zinc (191 mg, 2.93 mmol). The vial was evacuated and backfilled with nitrogen (3×). DMA (7 mL) was added, and the reaction mixture was stirred at 70° C. overnight. The reaction mixture was then diluted with DCM (10 mL) and filtered through Celite™ (diatomaceous earth), rinsing with DCM (20 mL). The filtrate was then concentrated under vacuum to remove DCM and DMA. The resulting crude residue was purified by silica gel chromatography (gradient elution: 0-60% EtOAc/Hexanes). This provided 5-((1,3-trans)-3-(5-((2,4-dimethoxybenzyl)amino)-8-methyl-7-(oxazol-2-yl)-[1,2,4]triazolo[1,5-c]pyrimidin-2-yl)cyclobutyl)picolinonitrile (10.3) as the first eluting peak. MS (ESI) m/z calc'd for $C_{28}H_{27}N_8O_3$ [M+H]$^+$ 523.2, found 523.2. It also provided 5-((1,3-cis)-3-(5-((2,4-dimethoxybenzyl)amino)-8-methyl-7-(oxazol-2-yl)-[1,2,4]triazolo[1,5-c]pyrimidin-2-yl)cyclobutyl)picolinonitrile (10.4) as the second eluting peak. MS (ESI) m/z calc'd for $C_{28}H_{27}N_8O_3$ [M+H]$^+$ 523.2, found 523.3.

Step 2—Synthesis of Intermediate 10.5, 2-((1,3-trans)-3-(6-(2-aminopropan-2-yl)pyridin-3-yl)cyclobutyl)-N-(2,4-dimethoxybenzyl)-8-methyl-7-(oxazol-2-yl)-[1,2,4]triazolo[1,5-c]pyrimidin-5-amine A 20 mL scintillation vial equipped with a stir bar was charged with cerium(III) chloride heptahydrate (378 mg, 1.01 mmol). The vial was placed in a 150° C. heating block and stirred overnight under vacuum to remove water. The vial was backfilled with argon, cooled to 25° C., and THF (1.7 mL) was added. The resulting suspension was stirred vigorously at 25° C. for 1 h, then cooled to −78° C. and stirred for 10 min. Methyllithium (3 M in dimethoxymethane, 0.33 mL, 1.01 mmol) was then added dropwise, and the mixture was stirred for 1 h at −78° C. A solution of 5-((1,3-trans)-3-(5-((2,4-dimethoxybenzyl)amino)-8-methyl-7-(oxazol-2-yl)-[1,2,4]triazolo[1,5-c]pyrimidin-2-yl)cyclobutyl)picolinonitrile (53 mg, 0.101 mmol) in THF (1 mL) was then added dropwise, and the reaction mixture was stirred for 1 h at −78° C. The reaction was then quenched at this temperature with sat. aq. NH$_4$Cl (5 mL), then allowed to warm to 25° C. DCM (15 mL) was added and the layers were separated. The aq. layer was extracted with DCM (4×15 mL), and the combined organic layers were dried over anhydrous Na$_2$SO$_4$, filtered, and concentrated to provide 2-((1,3-trans)-3-(6-(2-aminopropan-2-yl)pyridin-3-yl)cyclobutyl)-N-(2,4-dimethoxybenzyl)-8-methyl-7-(oxazol-2-yl)-[1,2,4]triazolo[1,5-c]pyrimidin-5-amine, which was used directly in the subsequent reaction without further purification. MS (ESI) m/z calc'd for $C_{30}H_{35}N_8O_3$ [M+H]$^+$ 555.3, found 555.3.

Step 3—Preparation of Example 10.6, 2-((1,3-trans)-3-(6-(2-aminopropan-2-yl)pyridin-3-yl)cyclobutyl)-8-methyl-7-(oxazol-2-yl)-[1,2,4]triazolo[1,5-a]pyrimidin-5-amine A 20 mL scintillation vial equipped with a stir bar was charged with 2-(3-(6-(2-aminopropan-2-yl)pyridin-3-yl)cyclobutyl)-N-(2,4-dimethoxybenzyl)-8-methyl-7-(oxazol-2-yl)-[1,2,4]triazolo[1,5-c]pyrimidin-5-amine (50 mg, 0.09 mmol). TFA (0.9 mL) was then added, and the resulting mixture was stirred at 45° C. for 90 min. Upon completion, the reaction was concentrated. The crude residue was taken up in DMSO (2 mL), filtered, and purified by reversed-phase HPLC [Method B]. This provided 2-((1,3-trans)-3-(6-(2-aminopropan-2-yl)pyridin-3-yl)cyclobutyl)-8-methyl-7-(oxazol-2-yl)-[1,2,4]triazolo[1,5-c]pyrimidin-5-amine (Example 10.6). MS (ESI) m/z calc'd for $C_{21}H_{25}N_8O$ [M+H]$^+$ 405.2, found 405.3. $^1$H NMR (600 MHz, MeOD-d$_4$) δ 8.50 (d, J=2.1 Hz, 1H), 8.12 (s, 1H), 7.86 (dd, J=8.2, 2.1 Hz, 1H), 7.58 (d, J=8.2 Hz, 1H), 7.45 (s, 1H), 4.01 (p, J=8.4 Hz, 1H), 3.92-3.86 (m, 1H), 2.99-2.93 (m, 2H), 2.79 (s, 3H), 2.75 (dt, J=12.4, 9.4 Hz, 2H), 1.55 (s, 6H). A2a IC$_{50}$ 15.7 nM (A).
Reverse Phase Prep-HPLC Methods:
Method A—TFA Modifier
C18 reversed-phase Prep-HPLC (gradient elution, MeCN/H$_2$O/0.1% TFA). Electrospray (ESI) Mass-triggered fraction collection was employed using positive ion polarity scanning to monitor for the target mass.

Method B—Basic Modifier
C18 reversed-phase Prep-HPLC (gradient elution, MeCN/H$_2$O/basic modifier—either 0.1% NH$_4$OH or 0.05% NH$_4$HCO$_3$). Electrospray (ESI) Mass-triggered fraction collection was employed using positive ion polarity scanning to monitor for the target mass.

What is claimed is:
1. A compound having a structural Formula (IA) or Formula (IB):

(IA)

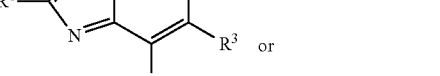

(IB)

or a pharmaceutically acceptable salt thereof, wherein:
$R^1$ is a moiety selected from (C$_3$-C$_7$)cycloalkyl and C-linked 4-7 membered monocyclic heterocycloalkyl comprising 1 or 2 ring nitrogen atoms,
wherein said (C$_3$-C$_7$)cycloalkyl, said C-linked 4-7 membered monocyclic heterocycloalkyl comprising 1 or 2 ring nitrogen atoms,
wherein each $R^{1A}$ group is independently selected from: F, Cl, OH, oxo, (C$_1$-C$_6$)alkyl, O(C$_1$-C$_6$)alkyl, (C$_1$-C$_6$) alkyl-OH, (C$_1$-C$_6$)haloalkyl, —O(C$_1$-C$_6$)haloalkyl, (C$_3$-C$_6$)cycloalkyl, C(O)(C$_3$-C$_6$)cycloalkyl, phenyl, and heteroaryl,
wherein said heteroaryl of $R^{1A}$ is unsubstituted or substituted with 1, 2, or 3 $R^{1A1}$ groups,
wherein each $R^{1A1}$ group is independently selected from: F, Cl, oxo, (C$_1$-C$_6$)alkyl, (C$_1$-C$_6$)haloalkyl, (C$_1$-C$_6$)alkyl-OH, O(C$_1$-C$_6$)alkyl, O(C$_1$-C$_6$)haloalkyl, (C1-C6)alkyl-CH((C$_3$-C$_6$)cycloalkyl)OH, (C$_1$-C$_6$)alkyl-C(O)N(R$^{1N}$)$_2$, and (C$_4$-C$_6$)heterocycloalkyl,
wherein said (C$_1$-C$_6$)alkyl and the (C$_1$-C$_6$)alkyl portions of each of said O—(C$_1$-C$_6$)alkyl and said (C$_1$-C$_6$)alkyl-C(O)N(R$^{1N}$)$_2$ are optionally further substituted with from 1 to 3 $R^{1A2}$ groups,
wherein each $R^{1A2}$ group is independently selected from OH, (C$_3$-C$_6$)cycloalkyl, (C$_3$-C$_6$)cycloalkyl-OH, heterocycloalkyl, heteroaryl, N(R$^{1N}$)$_2$; and
each R$^{1N}$ is independently selected from H and (C$_1$-C$_6$) alkyl;
$R^2$ is selected from H, (C$_1$-C$_6$)alkyl, (C$_2$-C$_6$)alkenyl, and (C$_3$-C$_4$)cycloalkyl,
wherein each said (C$_1$-C$_6$)alkyl and (C$_3$-C$_4$)cycloalkyl of $R^2$ is unsubstituted or substituted with 1, 2, or 3 $R^{2A}$ groups,
wherein each $R^{2A}$ group is independently selected from F, Cl, OH, oxo, (C$_1$-C$_6$)alkyl, O(C$_1$-C$_6$)alkyl, (C$_1$-C$_6$) alkyl-OH, and (C$_1$-C$_6$)haloalkyl, and
$R^3$ is selected from phenyl and heteroaryl, wherein said phenyl and said heteroaryl are unsubstituted or substituted with 1, 2, or 3 $R^{3A}$ groups, wherein each $R^{3A}$ group is independently selected from the group consisting of F, Cl, OH, CN, $(C_1$-$C_6)$alkyl, $(C_1$-$C_6)$haloalkyl, O—$(C_1$-$C_6)$alkyl, and O—$(C_1$-$C_6)$haloalkyl;

provided that, in Formula (IA), when $R^1$ is cyclopropyl which is substituted with phenyl, then each $R^{3A}$ group is independently selected from the group consisting of F, Cl, OH, $(C_1$-$C_6)$alkyl, $(C_1$-$C_6)$haloalkyl, O$(C_1$-$C_6)$alkyl, and O$(C_1$-$C_6)$haloalkyl, and further provided that, in Formula (IA), $R^2$ is selected from H, $(C_1$-$C_6)$alkyl, and $(C_2$-$C_6)$alkenyl, wherein each said $(C_1$-$C_6)$alkyl and cyclobutyl of $R^2$ is unsubstituted or substituted with 1, 2, or 3 $R^{2A}$ groups.

2. The compound of claim 1, or a pharmaceutically acceptable salt thereof, wherein
$R^1$ is selected from pyrrolidinyl, piperidinyl, cyclopropyl, cyclobutyl, cyclopentyl, and cyclohexyl, wherein each said group is unsubstituted or substituted with 1, 2, or 3 $R^{1A}$ groups.

3. The compound of claim 2, or a pharmaceutically acceptable salt thereof,
wherein
each $R^{1A}$ (when present) is independently selected from: F, OH, oxo, $CH_3$, $CF_3$, $CHF_2$, $CH_2CHF_2$, $CH_2CF_3$, $C(CH_3)_2OH$,
$OCHF_2$,
C(O)cyclopropyl,
pyrazolyl,
pyrazolyl substituted with 1, 2, or 3 substituents independently selected from $CH_3$, $CH_2CH_3$, $CH(CH_3)_2$, $CH_2CF_3$, $CH(CH_3)C(CH_3)_2OH$, $CH_2C(CH_3)_2OH$, $CH_2$(cyclobutyl)OH, $C(CH_3)_2C(O)NHCH_3$, tetrahydropyranyl,
pyridinyl, and
pyridinyl substituted with 1, 2, or 3 substituents independently selected from F, Cl, $CH_3$, $OCHF_2$, oxo, and $CHF_2$.

4. The compound of claim 1, or a pharmaceutically acceptable salt thereof, wherein
$R^1$ is selected from:
pyrrolidinyl which is unsubstituted or substituted with 1, 2, or 3 $R^{1A}$ groups, wherein each $R^{1A}$ group is independently selected from F, $CH_2CF_3$, —C(O)cyclopropyl, pyrazolyl, and pyrazolyl substituted with $CH_2C(CH_3)OH$,
piperidinyl which is unsubstituted or substituted with 1, 2, or 3 $R^{1A}$ groups, wherein each $R^{1A}$ group is independently selected from $CH_3$, $CH_2CF_3$, pyrazolyl, and pyrazolyl substituted with 1, 2, or 3 substituents independently selected from —$CH_3$,—$CH_2CH_3$, —CH$(CH_3)_2$, tetrahydropyranyl, $CH_2CF_3$, $CH_2$(cyclobutyl)OH, $CH_2C(CH_3)_2OH$, $CH(CH_3)C(CH_3)_2OH$, and $C(CH_3)_2C(O)NHCH_3$,
cyclopropyl which is unsubstituted or substituted with 1 or 2 $R^{1A}$ groups, wherein each $R^{1A}$ group is independently selected from —$C(CH_3)_2OH$, pyridinyl, and pyridinyl substituted with 1, 2, or 3 substituents independently selected from F, Cl, and $CH_3$,
cyclobutyl which is unsubstituted or substituted with 1, 2, or 3 $R^{1A}$ groups, wherein each $R^{1A}$ group is independently selected from OH, $CH_3$, and pyridyl, wherein said pyridyl is optionally substituted with $R^{1A1}$, wherein said $R^{1A}$ 1 is selected from $(C_1$-$C_6)$alkyl-OH and $(C_1$-$C_6)$alkyl-$NH_2$,
cyclopentyl which is unsubstituted or substituted with 1, 2, or 3 $R^{1A}$ groups, wherein each $R^{1A}$ group is independently selected from OH, and $CH_3$, and cyclohexyl which is unsubstituted or substituted with 1, 2, or 3 $R^{1A}$ groups, wherein each $R^{1A}$ group is independently selected from OH, and $CH_3$.

5. The compound of claim 1, or a pharmaceutically acceptable
salt thereof, wherein:
in Formula (IA), $R^2$ is selected from H, methyl, propyl, and propenyl, wherein each said methyl, propyl, and propenyl are unsubstituted or substituted with 1, 2, or 3 $R^{2A}$ groups; and
in Formula (IB), $R^2$ is selected from H, methyl, propyl, propenyl, and cyclopropyl, wherein each said methyl, propyl, propenyl, and cyclopropyl are unsubstituted or substituted with 1, 2, or 3 $R^{2A}$ groups.

6. The compound of claim 5, or a pharmaceutically acceptable salt thereof,
wherein:
each $R^{2A}$ is selected from H, F, Cl, OH, oxo, $(C_1$-$C_6)$alkyl, $O(C_1$-$C_6)$alkyl, $(C_1$-$C_6)$haloalkyl, $O(C_1$-$C_6)$haloalkyl, and $(C_1$-$C_6)$alkyl-OH.

7. The compound of claim 1, or a pharmaceutically acceptable
salt thereof, wherein:
in Formula (IA), $R^2$ is selected from H, methyl, $C(CH_3)_2OH$, and propenyl, and
in Formula (IB), $R^2$ is selected from H, methyl, $C(CH_3)_2OH$, propenyl, and cyclopropyl.

8. The compound of claim 1, or a pharmaceutically acceptable
salt thereof, wherein:
$R^3$ is selected from phenyl, oxazolyl, pyrazolyl, pyridinyl, and thiazoyl, wherein said phenyl, oxazolyl, pyrazolyl, pyridinyl, and thiazoyl are unsubstituted or substituted with 1, 2, or 3 $R^{3A}$ groups.

9. The compound of claim 8, or a pharmaceutically acceptable
salt thereof, wherein:
in Formula (IA), each $R^{3A}$ group is independently selected from F, Cl, OH, $CH_3$, $CF_3$, $OCH_3$, and $OCHF_2$; and
in Formula (IB), each $R^{3A}$ group is independently selected from F, Cl, OH, CN, $CH_3$, $CF_3$, $OCH_3$, and $OCHF_2$.

10. The compound of claim 1, or a pharmaceutically acceptable
salt thereof, wherein
$R^1$ is selected from:
pyrrolidinyl which is unsubstituted or substituted with 1, 2 or 3 $R^{1A}$ groups, wherein each $R^{1A}$ group is independently selected from F, $CH_2CF_3$, C(O)cyclopropyl, pyrazolyl, and pyrazolyl substituted with —$CH_2C$($CH_2$)OH,
piperidinyl which is unsubstituted or substituted with 1, 2, or 3 $R^{1A}$ groups, wherein each $R^{1A}$ group is independently selected from $CH_3$, $CH_2CF_3$, pyrazolyl, pyrazolyl substituted with 1, 2, or 3 substituents independently selected from $CH_3$, $CH_2CH_3$, $CH(CH_3)_2$, tetrahydropyranyl, $CH_2CF_3$, $CH_2$(cyclobutyl)OH, $CH_2C(CH_3)_2OH$, $CH(CH_3)C(CH_3)_2OH$, and $C(CH_3)_2C(O)NHCH_3$,
cyclopropyl which is unsubstituted or substituted with 1, 2 or 3 $R^{1A}$ groups, wherein each $R^{1A}$ group is independently selected from —$C(CH_3)_2OH$, pyridinyl, and pyridinyl substituted with 1, 2, or 3 substituents independently selected from F, Cl, and $CH_3$,
cyclobutyl which is unsubstituted or substituted with 1, 2, or 3 $R^{1A}$ groups, wherein each $R^{1A}$ group is independently selected from OH, and $CH_3$, cyclopentyl which is unsubstituted or substituted with 1, 2, or 3 $R^{1A}$ groups, wherein each $R^{1A}$ group is independently selected from OH, and $CH_3$, and cyclohexyl which is unsubstituted or substituted with 1, 2, or 3 $R^{1A}$ groups, wherein each $R^{1A}$ group is independently selected from OH, and $CH_3$;

$R^2$ is selected from H, methyl, $C(CH_3)_2OH$, and propenyl, and $R^3$ is selected from phenyl and oxazolyl, wherein said phenyl is unsubstituted or substituted with 1, 2, or 3 substituents independently selected from F and Cl.

11. The compound of claim 1, or a pharmaceutically acceptable salt thereof, wherein said compound is selected from:

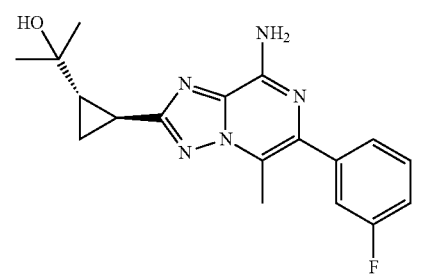

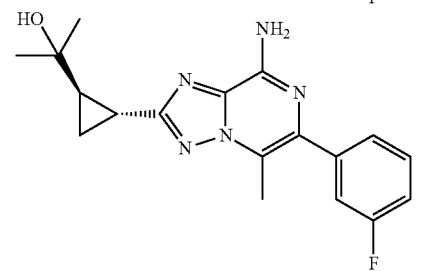

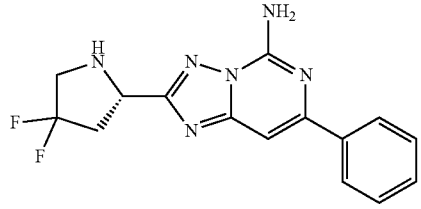

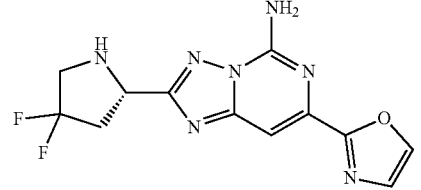

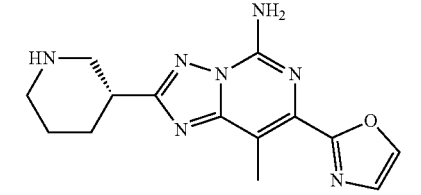

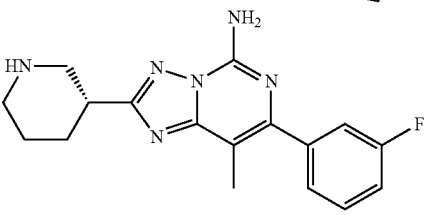

-continued

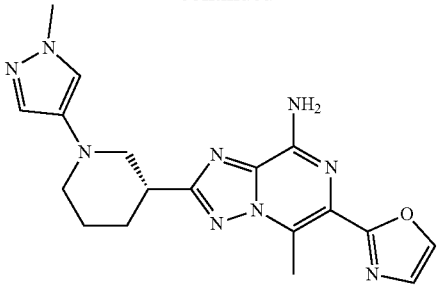

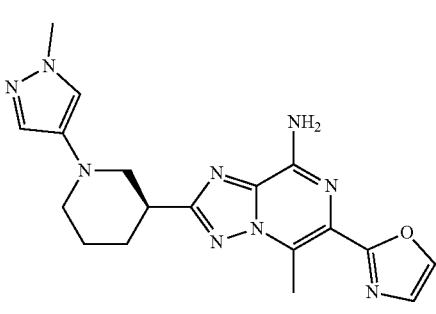

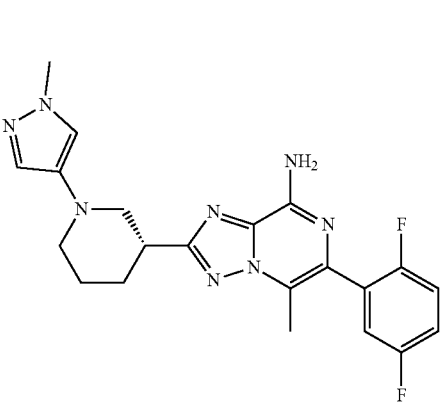

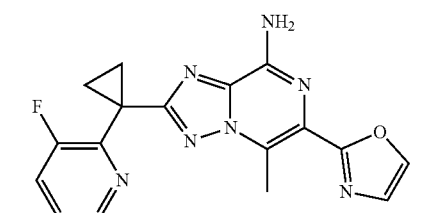

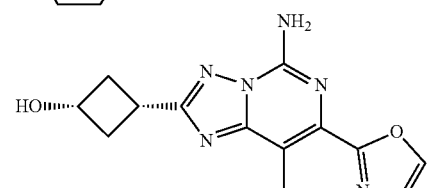

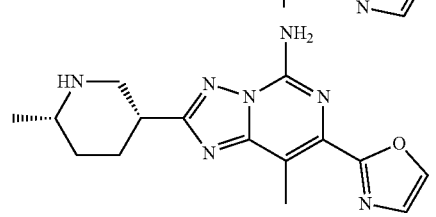

149
-continued
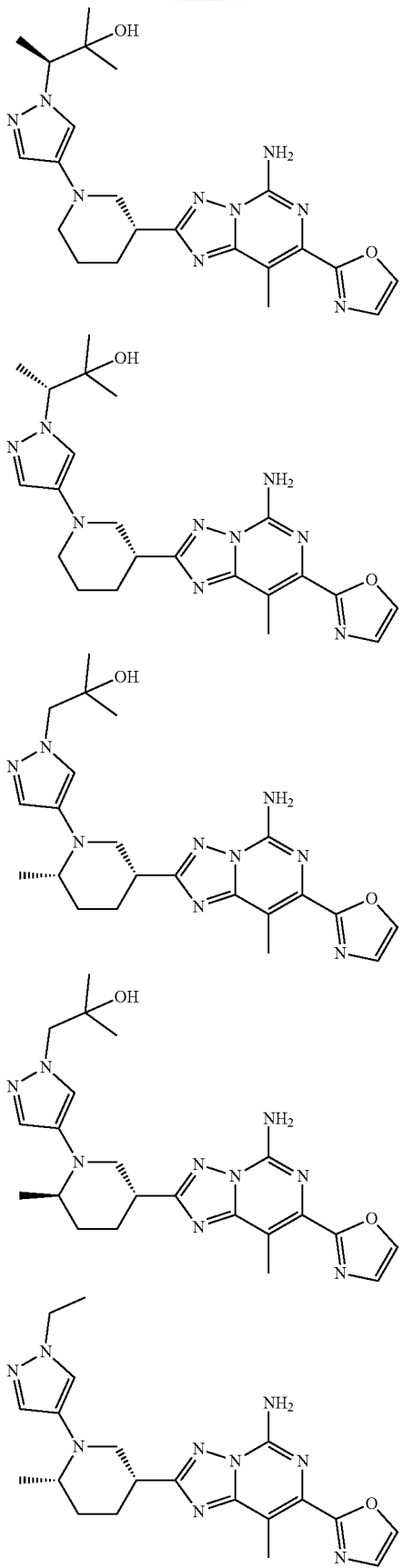
150
-continued
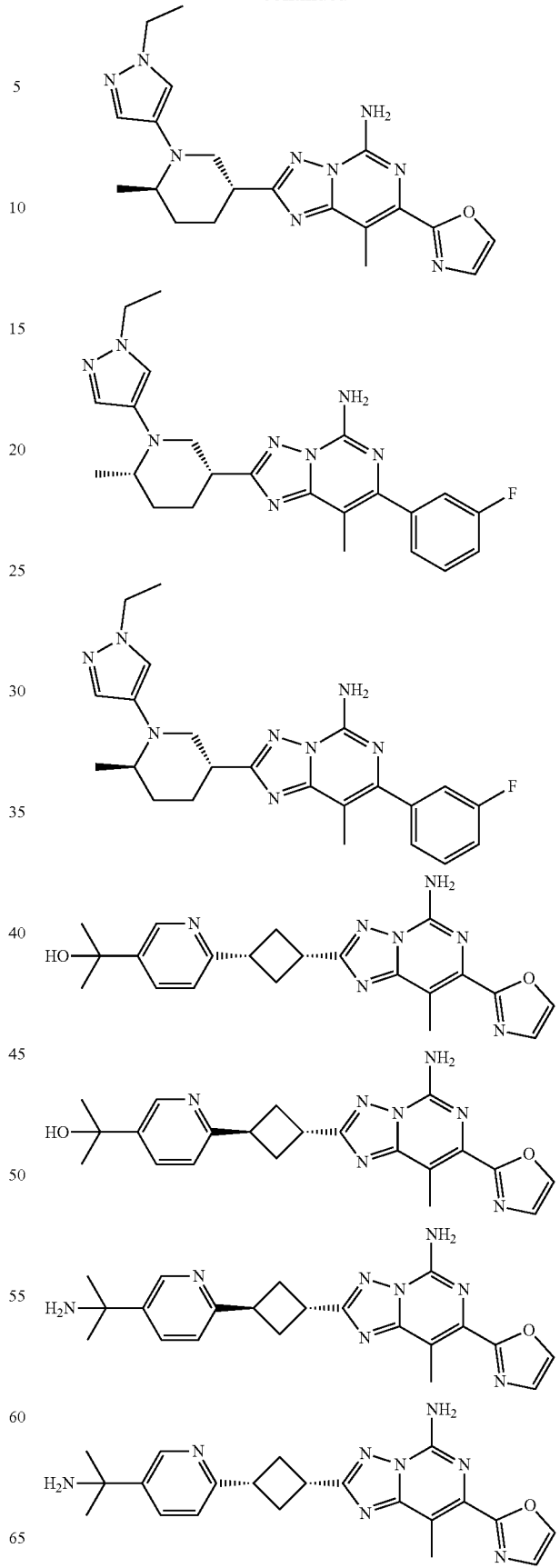

151
-continued
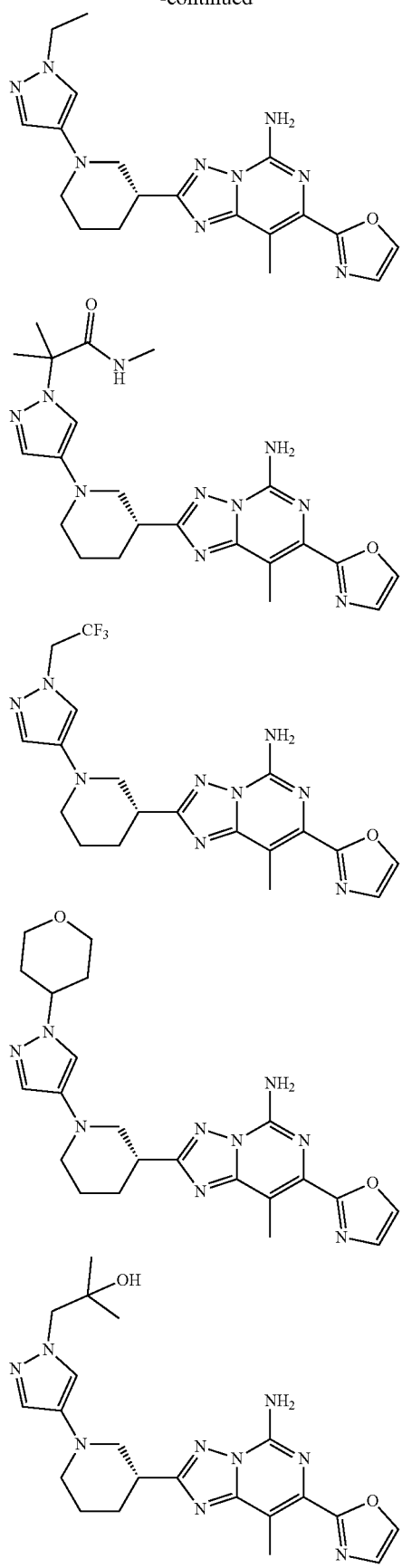
152
-continued
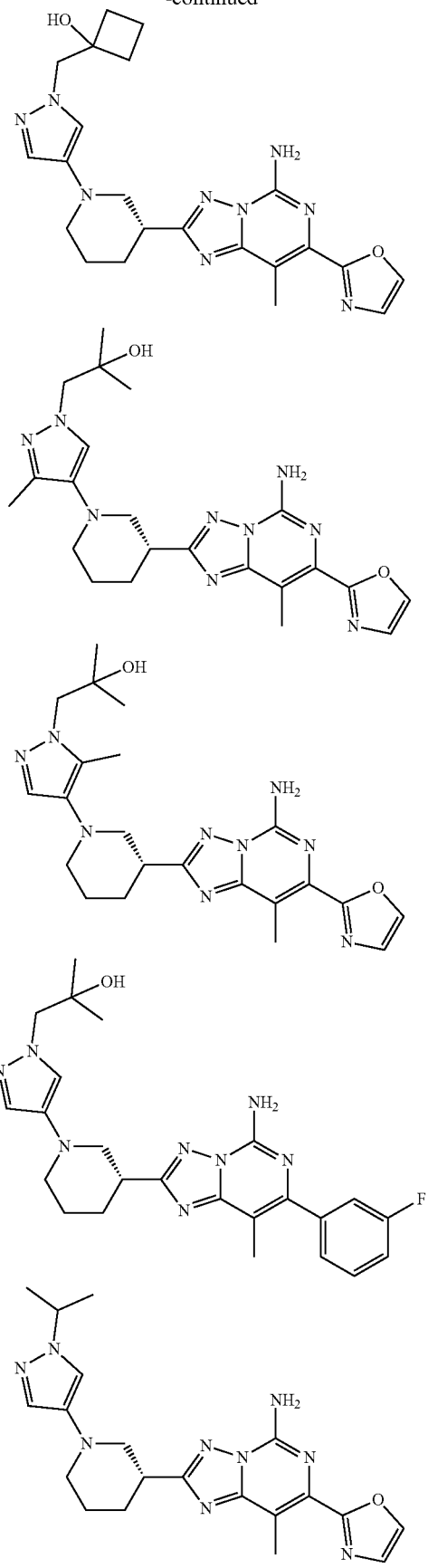

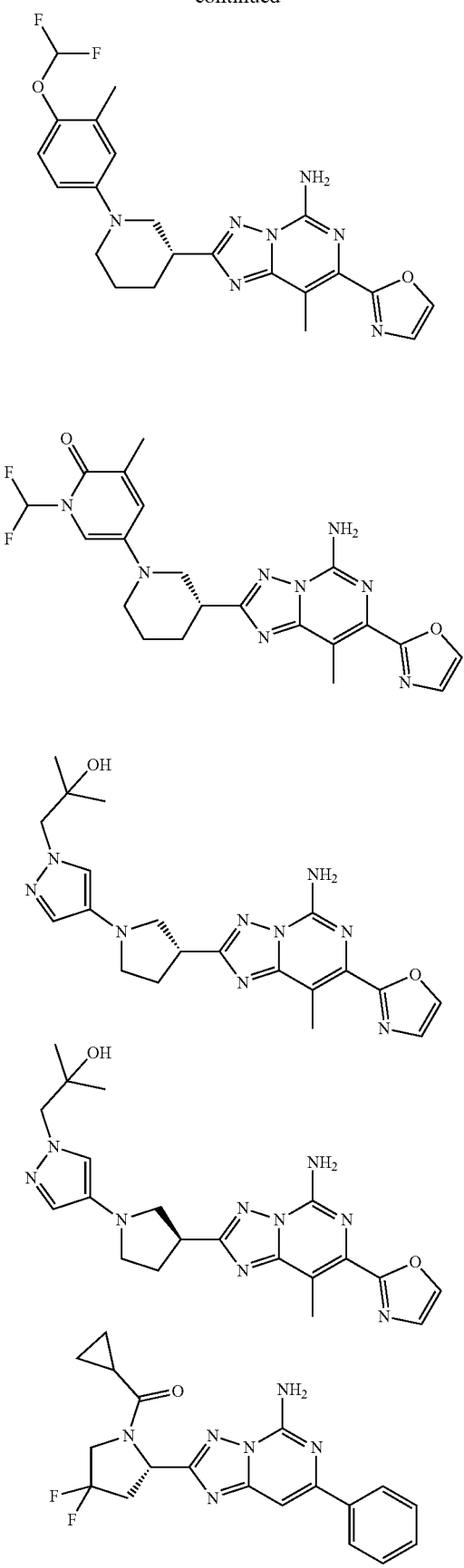
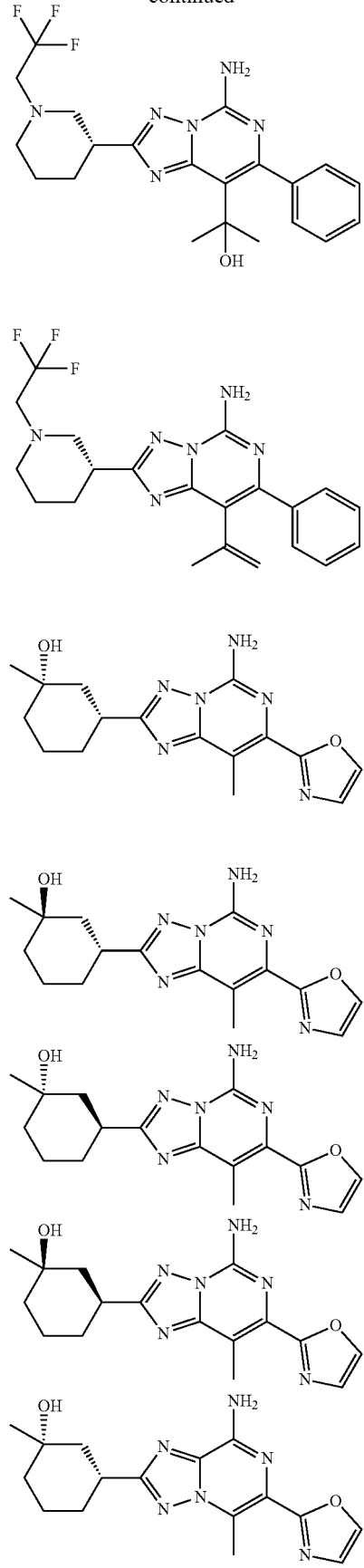

-continued
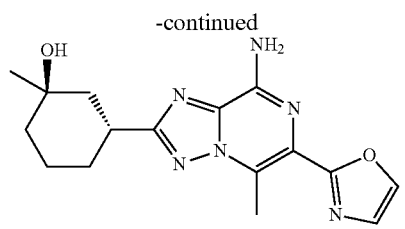
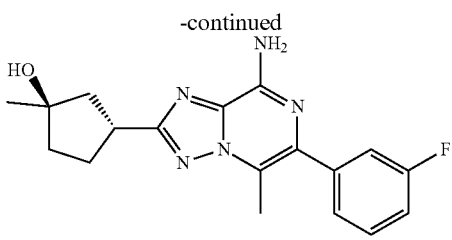
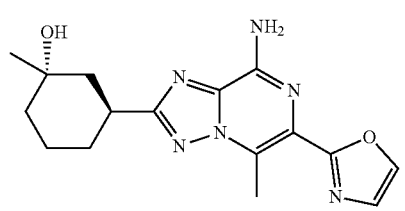
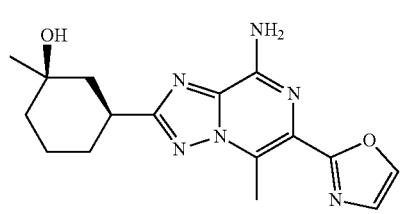
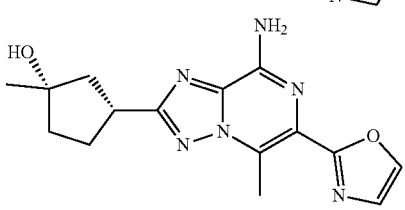
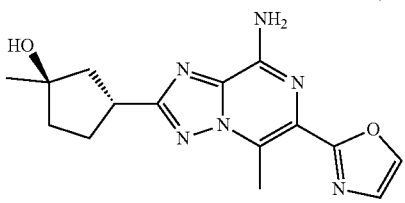
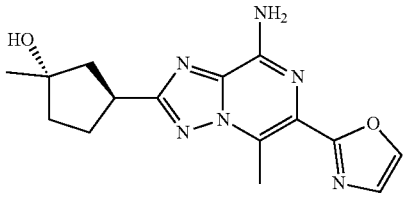
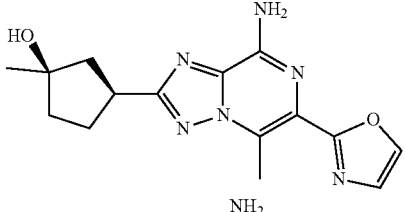
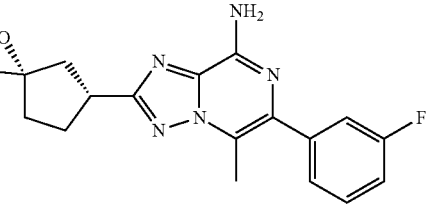

-continued

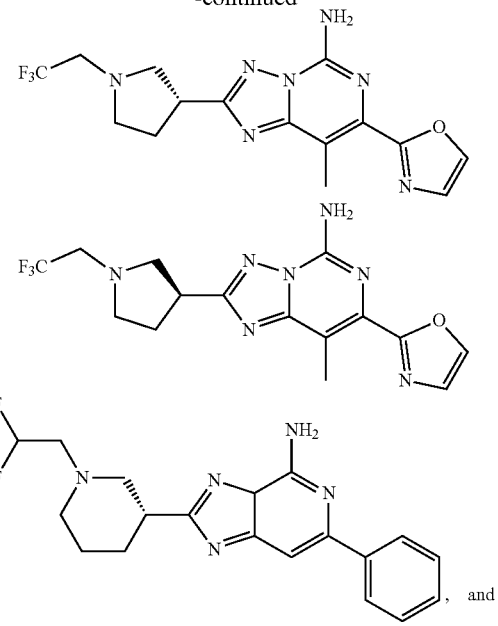

-continued

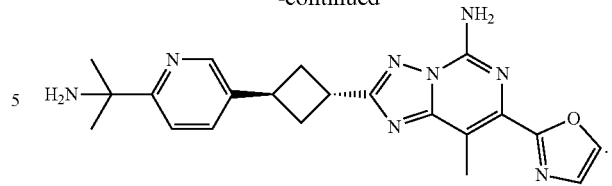

12. A pharmaceutical composition comprising a compound of claim 1, or a pharmaceutically acceptable salt thereof, and a pharmaceutically acceptable carrier.

13. The compound of claim 1, or a pharmaceutically acceptable salt thereof, wherein in Formula (IA),
   $R^1$ is a C-linked 4-7 membered monocyclic heterocycloalkyl comprising 1 or 2 ring nitrogen atoms, wherein said monocyclic heterocycloalkyl is unsubstituted or substituted with 1, 2, or 3 $R^{1A}$ groups.

14. The compound of claim 13, or a pharmaceutically acceptable salt thereof, wherein $R^1$ is pyrrolidinyl or piperidinyl, each unsubstituted or substituted with 1, 2, or 3 $R^{1A}$ groups.

* * * * *